United States Patent
Ishihara et al.

(10) Patent No.: US 6,516,031 B1
(45) Date of Patent: *Feb. 4, 2003

(54) MOTION VECTOR DETECTING DEVICE

(75) Inventors: Kazuya Ishihara, Tokyo (JP); Atsuo Hanami, Tokyo (JP); Tetsuya Matsumura, Tokyo (JP); Satoshi Kumaki, Tokyo (JP); Hiroshi Segawa, Tokyo (JP); Yoshinori Matsuura, Tokyo (JP); Stefan Scotzniovsky, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,504

(22) Filed: May 27, 1998

(30) Foreign Application Priority Data

Dec. 2, 1997 (JP) ............................................. 9-331451

(51) Int. Cl.$^7$ ................................................. H04N 7/32
(52) U.S. Cl. ................................................. 375/240.16
(58) Field of Search ............................ 348/384, 390, 348/402, 407, 409–413, 415, 416, 420, 699; 375/240.12, 240.13, 240.14, 240.15, 240.16, 240.24; 382/232, 236, 238; H04N 7/32

(56) References Cited

U.S. PATENT DOCUMENTS

| 5,398,078 A |   | 3/1995  | Masuda et al. |
|---|---|---|---|
| 5,400,087 A |   | 3/1995  | Uramoto et al. |
| 5,619,268 A | * | 4/1997  | Kobayashi et al. ......... 348/699 |
| 5,648,819 A | * | 7/1997  | Tranchard ................... 348/416 |
| 5,784,108 A | * | 7/1998  | Skaletzky et al. .......... 348/415 |
| 5,822,007 A | * | 10/1998 | Knee et al. ................. 348/416 |
| 5,838,828 A | * | 11/1998 | Mizuki et al. .............. 382/236 |
| 5,949,486 A | * | 9/1999  | Ishihara et al. ............. 348/416 |
| 5,987,178 A | * | 11/1999 | Anesko et al. .............. 348/699 |

FOREIGN PATENT DOCUMENTS

EP   0 713 339 A2   5/1996

* cited by examiner

Primary Examiner—Richard Lee
(74) Attorney, Agent, or Firm—Burns, Doane, Swecker & Mathis, LLP

(57) ABSTRACT

Element processors (PE00 to PE33) included in a processor array (7) store pixel values of a search window, shifting them forward. Further, only hatched element processors (PE00, PE02, PE11, PE13, PE20, PE22, PE31, PE33) store pixel values of a template block, and compare them with the pixel values in the search to evaluate a similarity of pixel values. In other words, the pixel values of the template block are skipped and the pixel values which are left after skipping are compared. Therefore, it is possible to cut a hardware volume.

16 Claims, 35 Drawing Sheets

| | | |
|---|---|---|
| ⊘ FILTER FACTOR FOR PIXEL ON THE LEFT END | : | 0 : 3 : 1 |
| ○ FILTER FACTOR FOR INSIDE PIXEL | : | 1 : 2 : 1 |
| ⊘ FILTER FACTOR FOR PIXEL ON THE RIGHT END | : | 1 : 3 : 0 |

C on THE LEFT END → $F = \dfrac{0 \cdot L + 3 \cdot C + 1 \cdot R}{4} = \dfrac{3C+R}{4}$ C INSIDE → $F = \dfrac{1 \cdot L + 2 \cdot C + 1 \cdot R}{4} = \dfrac{L+2C+R}{4}$ C on THE RIGHT END → $F = \dfrac{1 \cdot L + 3 \cdot C + 0 \cdot R}{4} = \dfrac{L+3C}{4}$

FIG. 13
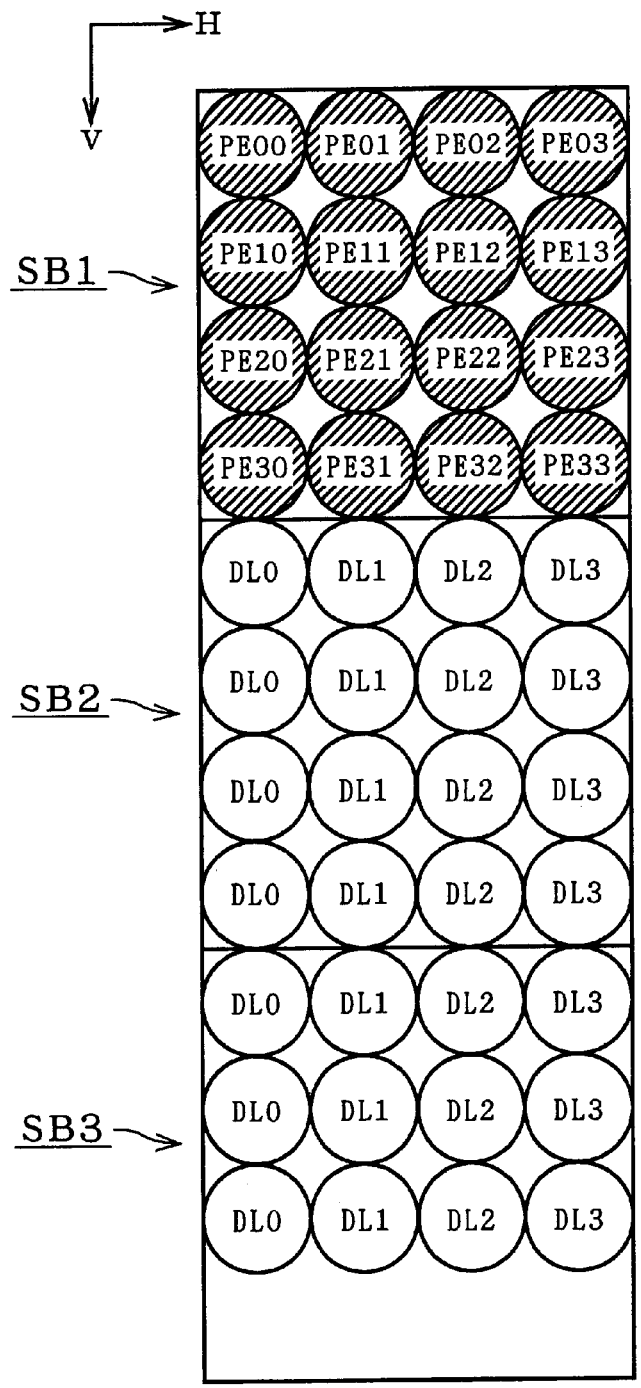
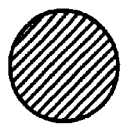 SEARCH WINDOW REGISTER A
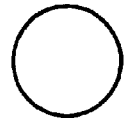 DATA BUFFERS DL0 – DL3

F I G. 2 0
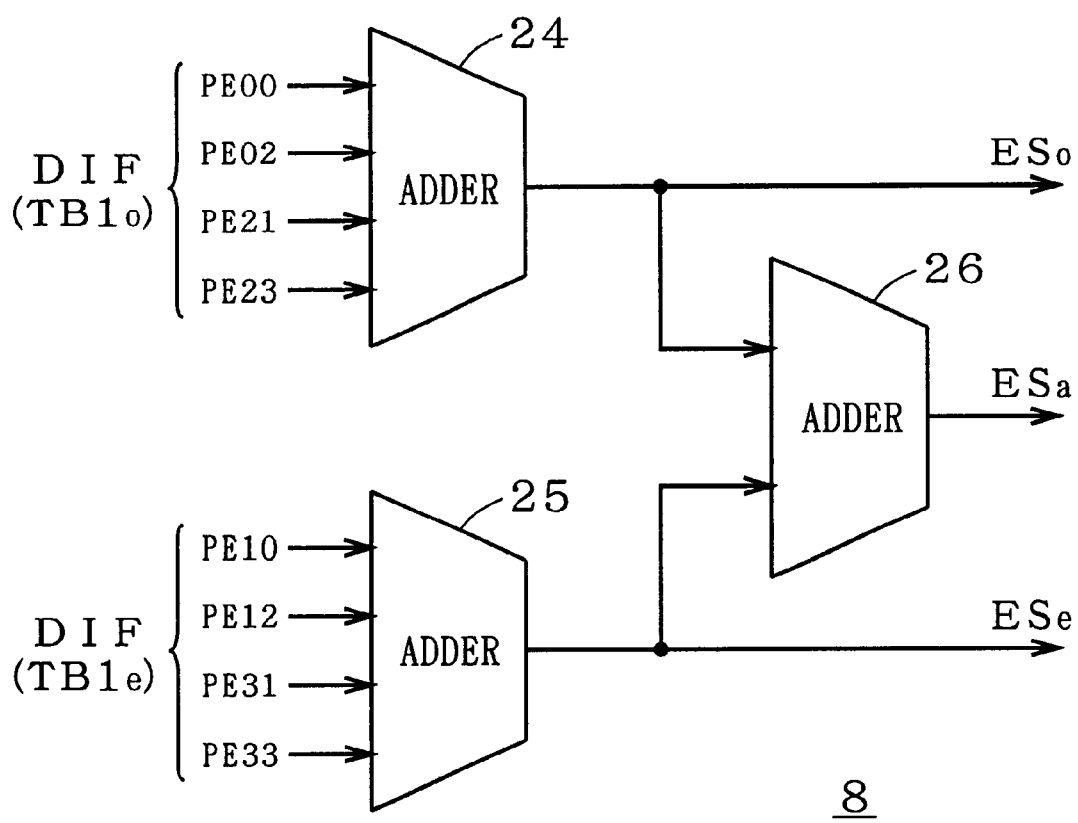

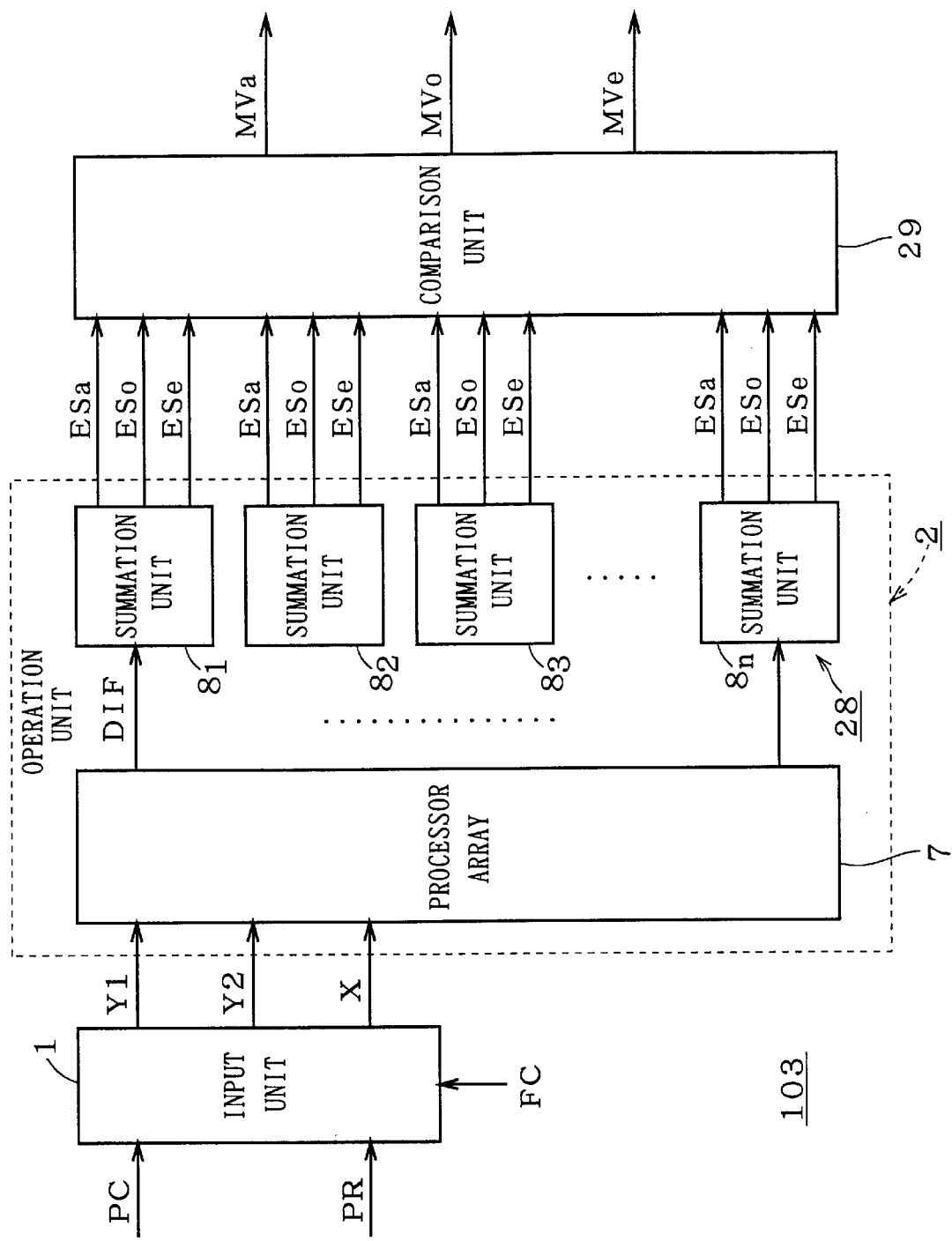
F I G. 26

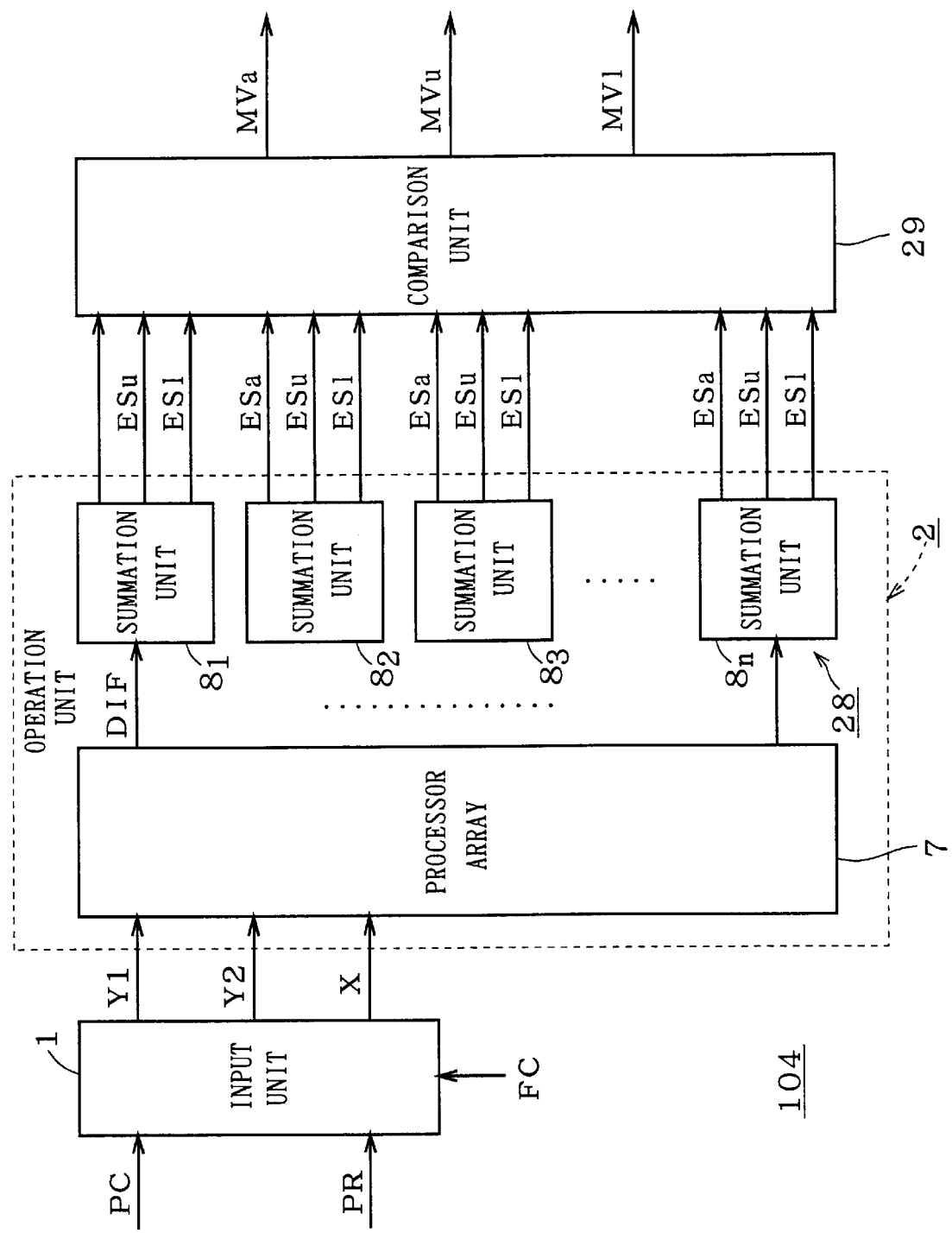
F I G. 30

MOTION VECTOR DETECTING DEVICE

BACKGROUND OF THE INVENTION

1. Field of the Invention

The present invention relates to a motion vector detecting device favorably used in an image coding apparatus according to MPEG (Moving Picture Experts Group), and more particularly to an improvement for reducing a hardware volume.

2. Description of the Background Art

To transmit or store signals representing an image, i.e., image signals, having a large amount of data, an image compression technique for reducing the amount of data is essential. The image signal, in general, includes considerable redundancy resulting from correlation between adjacent pixels and human perceptional characteristics. The image compression technique for suppressing the redundancy to reduce the amount of data is termed high-efficiency coding. In the present specification, to avoid useless complicate description, an image signal representing an image and an image itself are equally represented as "image" if not leading to confusion.

As one of such high-efficiency coding systems known is an inter-frame predictive coding system. In this inter-frame predictive coding system, a predictive error, which is a difference between a current image (frame or field) to be coded and a reference image (frame or field) to be referred to, being the preceding or following data in terms of time, is calculated for each pixel of the same position. The predictive error as calculated is thereafter used for coding.

In this system, it is advantageously possible to perform a coding of an image having small movements at high efficiency, due to high correlation between frames (fields). As to an image having large movements, however, errors are disadvantageously increased due to small correlation between frames (fields), leading to an increase in amount of data to be transmitted or stored.

Further, as a system to solve the aforementioned problem known is a motion compensated inter-frame (or inter-field) predictive coding system. In this system, prior to calculation of the predictive error, a motion vector is calculated by comparison of pixel values between the current image and the reference image. The motion vector refers to a vector representing magnitude and direction of an inter-frame (or inter-field) local movement of an image.

A local image in the reference image is moved in accordance with the motion vector as calculated, and then used as a predictive image for the calculation of the predictive error. Specifically, the predictive error is calculated by comparing the predictive image obtained by motion-compensating the reference image with the current image. Then, the predictive error as calculated is used for the coding. The motion vector along with a coding signal corresponding to the predictive error is transmitted or stored as an image signal after compression.

Thus, the motion compensated inter-frame (or inter-field) predictive coding system has an advantage of achieving a high compression efficiency of an image, even if having a large movement, since the inter-frame (or inter-field) predictive coding is performed by adopting the motion compensation using a motion vector.

The detection of the motion vector (predictive image) in the inter-frame (or inter-field) predictive coding system, however, requires enormous amounts of operations, as shown in the document (Mitsubishi Denki Gihou: Vol. 69, No. 3, pp. 12 to 16 (1995), "A Motion-Estimation LSI with Half-Pixel Precision") and as a result, there is a problem of requiring enormous amounts of hardware to implement a wide-range search of motion vectors.

SUMMARY OF THE INVENTION

The present invention is directed to a motion vector detecting device for searching a predictive block included in a reference image, for which a predictive error should be obtained by comparison with a template block included in a current image, and detecting a motion vector indicating a displacement between the template block and the predictive block. According to a first aspect of the present invention, the motion vector detecting device comprises: an operation unit for calculating estimation values each indicating an overall similarity of pixel values between the template block and a displacement block every time when the displacement block is moved in a search window after skipping pixels of the template block and the displacement block, the displacement block having the same size as the template block and included in the search window, and the search window being defined in the reference image as a region including a block corresponding to the template block; a comparison unit for searching a minimum value among the estimation values on the template block and outputting the motion vector corresponding to a displacement block providing the minimum value, which is defined as the predictive block; and an input unit for supplying the pixel values of the template block and the pixel values of the search window to the operation unit.

According to a second aspect of the present invention, in the motion vector detecting device of the first aspect, the input unit comprises a filter unit for performing a filtering of the current image and the reference image and supplying the pixel values of the template block and the pixel values of the search window to the operation unit.

According to a third aspect of the present invention, in the motion vector detecting device of the first aspect, the input unit comprises a filter unit for performing a filtering of the current image and the reference image in an on/off selectable manner in response to an externally-received control signal and supplying the pixel values of the template block and the pixel values of the search window to the operation unit.

According to a fourth aspect of the present invention, in the motion vector detecting device of the second aspect, the filter unit performs the filtering by converting a pixel value of an object pixel to be filtered into a weighted mean of pixel values of a plurality of consecutive pixels along a horizontal scanning-line direction including the object pixel, with an weight to be added to pixels outside a block including the object pixel set zero.

According to a fifth aspect of the present invention, in the motion vector detecting device of the first aspect, the operation unit comprises a template-block storing unit for storing pixel values of all pixels included in the template block after skipping; a search-window storing unit for storing pixel values of all pixels included in the displacement block; an estimation-component-value operation unit for calculating estimation component values for all the pixels included in the template block after skipping, each of the estimation component values indicating a similarity between the pixel values stored in the template-block storing unit and the pixel values stored in the search-window storing unit on a pixel-by-pixel basis; a summation unit for synthesizing the estimation component values to calculate the estimation values, the search-window storing unit comprises search-window storing elements arranged in a matrix, the search-window storing elements being so cascaded and each storing a pixel value for one pixel as to move the displacement block in the search window by storing the pixel values of the search window in order, and the input unit supplies the pixel values of the template block to the template-block storing unit and supplies the pixel values of the search window to the search-window storing unit.

According to a sixth aspect of the present invention, in the motion vector detecting device of the fifth aspect, the template-block storing unit comprises a (n, m)-th template-block storing element for storing a pixel value for one pixel, where n=1 to N (N is an even number) and m=1 to M (M is an even number), the search-window storing unit comprises a (k, m)-th search-window storing element for storing a pixel value for one pixel, where k=1 to 2N and n=1 to M, in a plurality of columns of search-window storing elements and (1, m)-th to (2N, m)-th search window elements are cascaded in this order in any m-th column, the estimation-component-value operation unit comprises a (n, m)-th operation element for calculating an estimation component value for one pixel, where n=1 to N and n=1 to M, the operation unit further comprises a (n, m)-th selection element, where n=1 to N and n=1 to M, the (n, m)-th selection element selects a pixel value stored in either a (2n=1, m)-th or (2n, m)-th search-window storing element in response to an externally-received selection signal, and the (n, m)-th operation element calculates an estimation component value for one pixel indicating a similarity between a pixel value stored in the (n, m)-th template-block storing element and a pixel value selected by the (n, m)-th selection element.

According to a seventh aspect of the present invention, in the motion vector detecting device of the sixth aspect, the summation unit comprises a first summation element for calculating sums of the estimation component values calculated by the (n, m)-th operation element, where n=1 to N/2 and m is an odd number; a second summation element for calculating sums of the estimation component values calculated by the (n, m)-th operation element, where n=1 to N/2 and m is an even number; a third summation element for calculating sums of the estimation component values calculated by the (n, m)-th operation element, where n=N/2+1 to N and m is an odd number; a fourth summation element for calculating sums of the estimation component values calculated by the (n, m)-th operation element, where n=N/2+1 to N and m is an even number; first and second selectors for switchably selecting one and the other of the sums calculated by the second and third summation elements, respectively, in response to an externally-received selection indicating signal; a first adder for calculating sums of the sums calculated by the first summation element and the sums selected by the first selector; a second adder for calculating sums of the sums calculated by the fourth summation element and the sums selected by the selected selector; and a third adder for calculating sums of the sums calculated by the first and second adders, the comparison unit calculates the motion vector by regarding the sums calculated by the third adder as the estimation values and outputs the motion vector, and further searches a minimum value among the sums calculated by the first adder and outputs a vector indicating a displacement between a sub-displacement block providing the minimum value and a sub-template block as another motion vector, and searches a minimum value among the sums calculated by the second adder and outputs a vector indicating a displacement between a sub-displacement block providing the minimum value and a sub-template block as still another motion vector.

According to an eighth aspect of the present invention, in the motion vector detecting device of the fifth aspect, the template-block storing unit comprises a (n, m)-th template-block storing element for storing a pixel value for one pixel, where n=1 to N (N is an even number) and n=1 to M (M is an even number), the search-window storing unit comprises a (n, k)-th search-window storing element for storing a pixel value for one pixel, where k=1 to N and m=1 to 2M, in a plurality of columns of search-window storing elements and (1, k)-th to (N, k)-th search window elements are cascaded in this order in any k-th column, the estimation-component-value operation unit comprises a (n, m)-th operation element for calculating an estimation component value for one pixel, where n=1 to N and n=1 to M, the operation unit further comprises a (n, m)-th selection element, where n=1 to N and n=1 to M, the (n, m)-th selection element selects a pixel value stored in either a (n, 2m−1)-th or (n, 2m)-th search-window storing element in response to an externally-received selection signal, and the (n, m)-th operation element calculates an estimation component value for one pixel indicating a similarity between a pixel value stored in the (n, m)-th template-block storing element and a pixel value selected by the (n, m)-th selection element.

According to a ninth aspect of the present invention, in the motion vector detecting device of the eighth aspect, a first summation element for calculating sums of the estimation component values calculated by the (n, m)-th operation element, where n=1 to N/2, m is an odd number and n=1 to M; a second summation element for calculating sums of the estimation component values calculated by the (n, m)-th operation element, where n=1 to M/2, m is an even number and n=1 to M; a third summation element for calculating sums of the estimation component values calculated by the (n, m)-th operation element, where n=N/2+1 to N, m is an odd number, and n=1 to M; a fourth summation element for calculating sums of the estimation component values calculated by the (n, m)th operation element, where n=N/2+1 to N, m is an even number and n=1 to M; first and second selectors for switchably selecting one and the other of the sums calculated by the second and third summation elements, respectively, in response to an externally-received selection indicating signal; a first adder for calculating sums of the sums calculated by the first summation element and the sums selected by the first selector; a second adder for calculating sums of the sums calculated by the fourth summation element and the sums selected by the selected selector; and a third adder for calculating sums of the sums calculated by the first and second adders, the comparison unit calculates the motion vector by defining the sums calculated by the third adder as the estimation values and outputs the motion vector, and further searches a minimum value among the sums calculated by the first adder and outputs a vector indicating a displacement between a sub-displacement block providing the minimum value and a sub-template block as another motion vector, and searches a minimum value among the sums calculated by the second adder and outputs a vector indicating a displacement between a sub-displacement block providing the minimum value and a sub-template block as still another motion vector.

According to a tenth aspect of the present invention, in the motion vector detecting device of the fifth aspect, the template-block storing unit is defined as a first template-block storing unit, the estimation-component-value operation unit is defined as a first estimation-component-value operation unit, the summation unit is defined as a first summation unit and the comparison unit is defined as a first comparison unit, and the device further comprises: second to j-th (j≧2) template-block storing units each having the same configuration as the first template-block storing unit; second to j-th estimation-component-value operation units each having the same configuration as the first estimation-component-value operation unit; second to j-th summation units each having the same configuration as the first summation unit; and second to j-th comparison units each having the same configuration as the first comparison unit, any j-th (j=1 to J) template-block storing unit can store pixel values of all pixels included in one template block after skipping, any j-th estimation-component-value operation unit calculates estimation component values for all the pixels included in the one template block after skipping, each of the estimation component values indicating a similarity between the pixel values stored in the j-th template-block storing unit and the pixel values stored in the search-window storing unit on a pixel-by-pixel basis, any j-th summation unit calculates the estimation values on the one template block whose pixel values are stored in the j-th template-block storing unit by synthesizing the estimation component values calculated by the j-th estimation-component-value operation unit, the comparison unit searches a minimum value among the estimation values calculated by the j-th summation unit and outputs a vector indicating a displacement between a displacement block providing the minimum value and the one template block whose pixel values are stored in the j-th template-block storing unit as a motion vector on the one template block, and the input unit supplies pixel values of j template blocks which are different in position to the first to j-th template-block storing units, respectively, and defining a region including the j template blocks as the search window, supplies pixel values of the search window to the search-window storing unit.

Since the device of the first aspect calculates the estimation values between the template block and the displacement block using the pixels after skipping, it is possible to cut the hardware volume of the device.

Since the device of the second aspect calculates the estimation values based on the filtered pixel values, there is no great deterioration in detection accuracy of the motion vector even thought the pixels are skipped.

Since the device of the third aspect can perform the filtering in an on/off selectable manner, there is no need for separately providing a device performing the filtering and a device not performing the filtering and a kind of device can be used for multiple purposes.

Since the device of the fourth aspect performs the filtering by using weighted mean of pixel values of a plurality of consecutive pixels along the horizontal scanning-line direction i.e., the main scanning-line direction on a block-by-block basis, it is possible to simply constitute the input unit and further cut the hardware volume. Furthermore, it is possible to cut the time required for the filtering.

In the device of the fourth aspect, the move of the displacement block is achieved with a simple constitution of matrix of the search window storing elements. The template-block storing unit stores the pixel values of the template block after skipping while the search-window storing unit stores the pixel values of the search window for one displacement block without skipping. Therefore, it is possible to calculate the estimation value on the pixel values after skipping every time when the displacement block is moved in a range of one pixel. In other words, also in this respect, deterioration in detection accuracy of the motion vector due to skipping can be effectively suppressed.

In the device of the sixth aspect, since the estimation-component-value operation unit selects the pixels of the displacement block to be compared with the pixels of the template block in response to the selection signal, it is possible to change a skipping pattern. In other words, a device with a wide range of use is achieved.

Since the device of the seventh aspect can obtain the motion vector on the template block, and further obtain the motion vector on either the odd or upper template block as another motion vector and the motion vector on either the even or lower template block as still another template block in response to the selection indicating signal, an image coding device with high degree of freedom is achieved.

In the device of the eighth aspect, since the estimation-component-value operation unit selects the pixels of the displacement block to be compared with the pixels of the template block in response to the selection signal, it is possible to change the skipping pattern. In other words, a device with a wide range of use is achieved.

Since the device of the ninth aspect can obtain the motion vector on the template block, and further obtain the motion vector on either the odd or upper template block as another motion vector and the motion vector on either the even or lower template block as still another template block in response to the selection signal, an image coding device with high degree of freedom is achieved.

Since the device of the tenth aspect performs the simultaneous operation on a plurality of template blocks by sharing the search-window storing unit, it is possible to cut the time required for operation while suppressing an increase in hardware volume.

One object of the present invention is to provide a motion vector detecting device capable of reducing the hardware volume.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 is an illustrated description of an operation of the processor array in accordance with the first preferred embodiment of the present invention;

FIG. 20 is a block diagram of still another example of the summation unit in accordance with the first preferred embodiment of the present invention;

FIG. 26 is a block diagram of a device in accordance with a third preferred embodiment of the present invention;

FIG. 30 is a block diagram of a device in accordance with a fourth preferred embodiment of the present invention;

DESCRIPTION OF THE PREFERRED EMBODIMENTS

1. The First Preferred Embodiment

Now, the first preferred embodiment will be discussed.

<1-1. Overview of Device>

Figure 2:
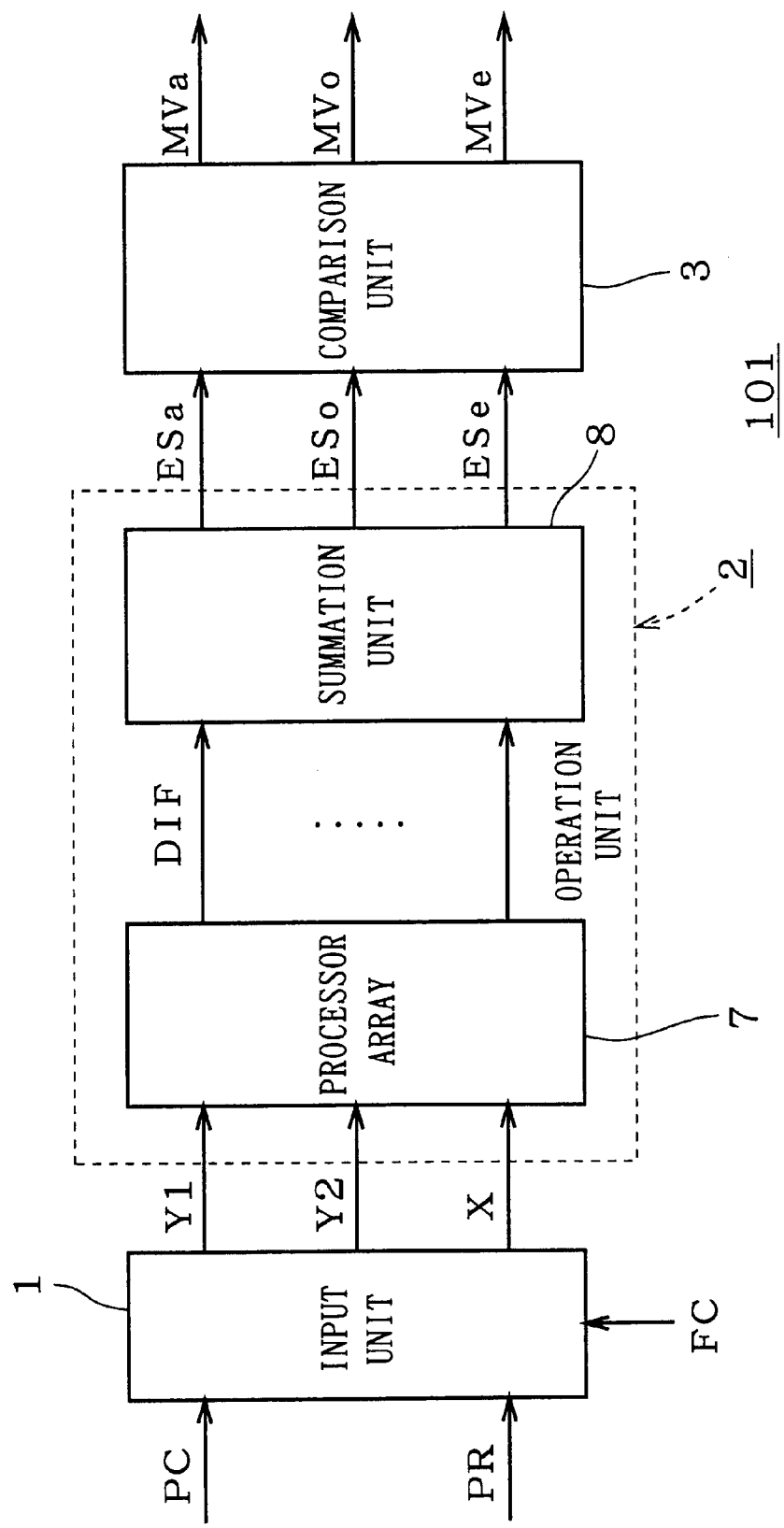
FIG. 2 is a block diagram of a device in accordance with the first preferred embodiment of the present invention.

FIG. 2 is a block diagram showing an overall constitution of a motion vector detecting device in accordance with the first preferred embodiment. A device 101 of FIG. 2 can be suitably used for an image compression apparatus performing an inter-frame predictive coding. Specifically, the device 101 receives a current image PC and a reference image PR as frame images. An input unit 1 provided in the device 101 performs filtering of the inputted current image PC and reference image PR as frame images and outputs template data X and search window data Y1 and Y2 with a predetermined timing. Whether the filtering is performed or not, in other words, on/off of filtering is selectable according to a filter control signal FC.

An operation unit 2 calculates three kinds of estimation values ESa, ESo, ESe for each template block and each displacement vector as a potential motion vector, based on the template data X and the search window data Y1 and Y2. The operation unit 2 comprises a processor array 7 for calculating an absolute differential value DIF, for example, for each displacement vector in a certain range for each template block and a summation unit 8 for calculating sums of the absolute differential values DIF as calculated, for example, to output the sums as the; estimation values ESa, ESo and ESe.

A comparison unit 3 searches respective minimum values of the estimation values ESa, ESo and ESe for each template block and determines three kinds of displacement vectors providing the respective minimum values as motion vectors. The comparison unit 3 outputs the three kinds of determined motion vectors MVa, MVo and MVe. Blocks corresponding to the motion vectors are predictive blocks for which predictive errors should be obtained by comparison with the template block.

<1-2. Input Unit>

Figure 3:
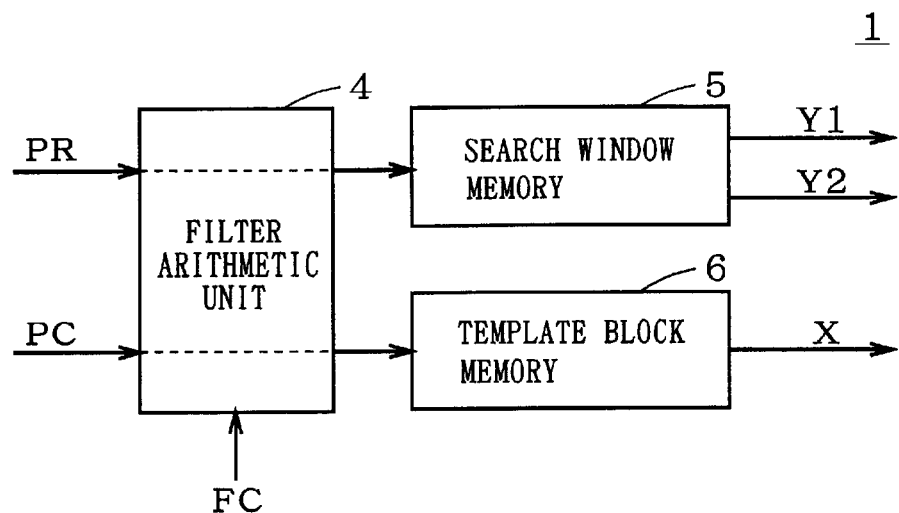
FIG. 3 is a block diagram of an input unit in accordance with the first preferred embodiment of the present invention.

FIG. 3 is a block diagram showing an internal constitution of the input unit 1. A filter arithmetic unit 4 performs filtering of the current image PC and the reference image PR. In response to the externally-received filter control signal FC, the filter arithmetic unit 4 performs the filtering in an on/off selectable manner. Specifically, when the filter control signal FC selects filtering, the filter arithmetic unit 4 performs filtering of both the current image PC and the reference image PR and outputs the filtered current image PC and reference image PR. On the other hand, when the filter control signal FC selects non-filtering, the filter arithmetic unit 4 performs filtering of neither the current image PC nor the reference image PR and outputs the current image PC and the reference image PR as they are.

In the motion vector detecting device, the current image PC and the reference image PR are divided into a lot of certain regions termed blocks, and various processings are performed on a block-by-block basis. The template block defining the template data X sequentially corresponds to one of a lot of blocks. Though one block is generally a region of 16×16 pixels, specifically, a region having 16 pixels in-a horizontal scanning-line direction which is a main scanning-line direction and 16 pixels in a vertical scanning-line direction which is a subsidiary scanning-line direction, each of the preferred embodiments of the present invention adopts a block of 4×4 pixels for simple description. By simple extension of an exemplary block consisting of 4×4 pixels, an exemplary block consisting of 16×16 pixels or other exemplary blocks may be realized.

A template block memory 6 subsequent to the filter arithmetic unit 4 temporarily stores the current image PC outputted from the filter arithmetic unit 4. The template block memory 6 has, for example, two memory spaces each available for data corresponding to one template block in the current block PC, i.e., the template data X, and stores the current image PC by the template data X alternately in the two memory spaces. The current images PC stored in the two memory spaces are alternately outputted for each template data X with a predetermined timing.

A search window memory 5 subsequent to the filter arithmetic unit 4 temporarily stores the reference image PR outputted from the filter arithmetic unit 4. The search window memory 5 stores, for example, data of the search window (the search range) of the reference image PR corresponding to one template block, i.e., the search window data Y1 and Y2 by certain ranges.

For example, the search window memory 5 has two memory spaces available for data corresponding to (one block in the horizontal scanning-line direction)×(all the blocks in the vertical scanning-line direction) in the search window corresponding to one template block, and alternately stores the search window data Y1 and Y2 by data corresponding to (1 block)×(all the block). The stored search window data Y1 and Y2 are outputted with a predetermined timing.

Figure 4:
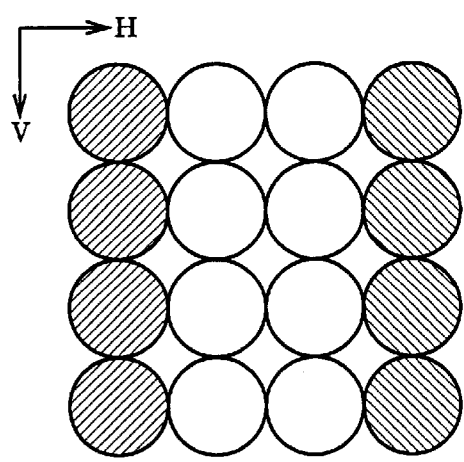
FIGS. 4 and 5 are illustrated descriptions of an operation of the input unit in accordance with the first preferred embodiment of the present invention.

FIG. 4 is an illustrated description of an operation on filtering performed by the filter arithmetic unit 4. The filter arithmetic unit 4 performs filtering on a block-by-block basis. The current image PC and the reference image PR are input to the input unit 1 on a block-by-block basis. Due to the filtering by block in the filter arithmetic unit 4, the arithmetic operation of the filter arithmetic unit 4 is simplified and as a result, it becomes possible to reduce the amount of circuit elements, i.e., hardware, constituting the filter arithmetic unit 4.

FIG. 4 shows one block of a matrix with 4 pixels in the horizontal scanning-line direction H and 4 pixels in the vertical scanning-line direction V. The filtering is performed by weighted mean operation. Specifically, a pixel value of an object pixel to be filtered is calculated as a weighted mean of a pixel value of the object pixel and a pixel value of its adjacent pixel. As the adjacent pixel selected is a pixel adjacent to the object pixel in the horizontal scanning-line direction H.

Since the filtering is performed on a block-by-block basis by weighted mean operation, there is a difference in filter factor between a pixel represented by a blank circle of FIG. 4, i.e., a pixel inside the block and a pixel represented by a hatched circle of FIG. 4, i.e., a pixel on an end portion (left end or right end) along the horizontal scanning-line direction H of the block. As shown in FIG. 4, the filter factor for the inside pixel is 1:2:1, that for the pixel on the left end is 0:3:1 and that for the pixel on the right end is 1:3:0.

Figure 5:
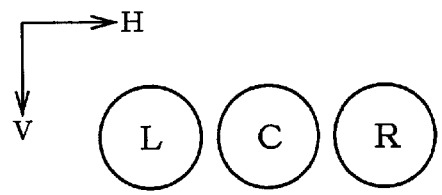

That is more clearly shown in FIG. 5. In general, by performing the weighted mean operation for the pixel values of an object pixel C to be filtered, an adjacent pixel L on the left side and an adjacent pixel R on the right side with the above filter factors as weights, a pixel value F of the object pixel C after the filtering can be calculated.

Therefore, when the pixel C is located on the left end, in other words, no pixel L exist, according to the exemplary filter factor of FIG. 4, the value F is calculated as F=(3C+R)/4. By contrast, when the pixel C is located inside the block, in other words, both the pixels L and R exist, the value F is calculated as F=(L+2C+R)/4. Further, when the pixel C is located on the right end, in other words, no pixel R exists, the value F is calculated as F=(L+3C)/4.

<1-3. Processor Array>

The processor array 7 provided in the operation unit 2 comprises a plurality of element processors disposed in a form of array. The element processors provided in the processor array 7 as a whole store the template data X corresponding to one template block. Then, each of the element processors calculates an estimation component value (e.g., absolute differential value DIF) indicating a similarity for each pixel between the data of the block corresponding to one displacement vector in the search window corresponding to the template block, i.e., the data of the displacement block and the template data X.

The summation unit 8 calculates a similarity of the pixel value for the whole block between the data of the displacement block and the template data X, i.e., an estimation value indicating an overall similarity, for example, by adding the estimation component values outputted from the element processors in a predetermined order. Therefore, the estimation value represents the degree of similarity on a block-by-block basis between the current image PC and the reference image PR in terms of quantity.

The estimation component values and the estimation value are calculated individually for each of all the displacement blocks corresponding to all the displacement vectors in the search window. Based on the estimation values for all the displacement blocks, the comparison unit 3 calculates the motion-vector for one template block. In the processor array 7, the template data X for one template block are held, not being updated, during the cycle for obtaining the motion vector corresponding to the template block (motion-vector operation cycle).

Further, the data of one displacement in the search window compared with the template data X of one template block, i.e., the data of the displacement block corresponding to one displacement vector, are shifted by one pixel correspondingly to sequential updates of the displacement vector. Specifically, the search window data Y1 and Y2 are inputted to the processor array 7, shifting by one pixel every cycle for calculating the estimation component value or the estimation value (estimation-value operation cycle) to be repeated in one motion-vector operation cycle.

Figure 6:
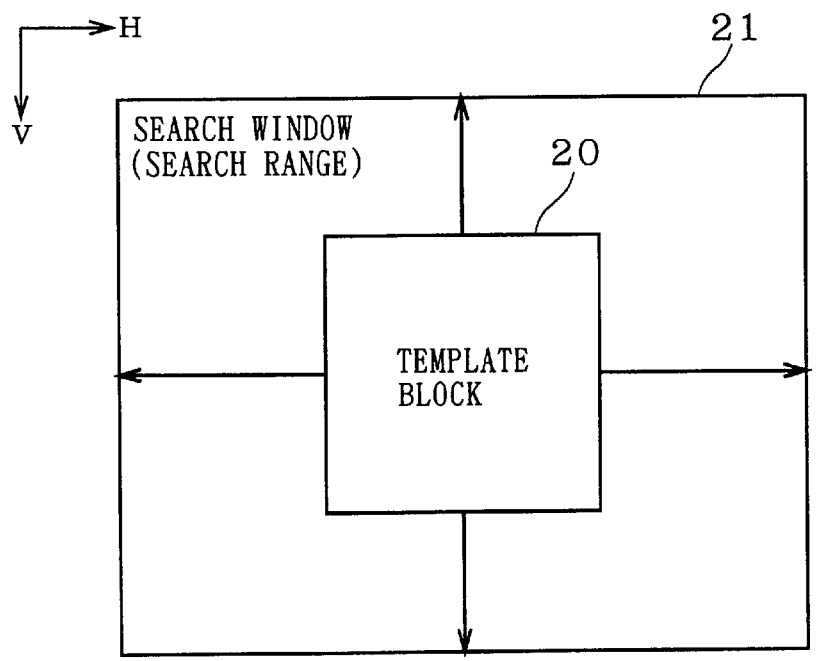
FIG. 6 is an illustrated description of an operation of the device in accordance with the first preferred embodiment of the present invention.

FIG. 6 is a conceptional illustration of the template block and search window. A template block 20 corresponds to one of the blocks into which the current image PC is divided. A search window 21 is defined as a region accommodating a plurality of displacement blocks corresponding to the template block 20 in the reference image PR.

In an example of the template block 20 consisting of 4×4 pixels, the search window 21 is defined, for example, as a region obtained by expanding a block corresponding to the template block 20 by 4 pixels on the left side, 3 pixels on the right side, 4 pixels on the upper side and 3 pixels on the lower side. Specifically, in this example, a region to be searched is in a range from −4 to +3 pixels in both the horizontal and vertical scanning-line directions H and V. Therefore, in this example, the search window 21 consists of 12×12 pixels (corresponding to 9 blocks) in consideration of block boundaries.

Figure 7:
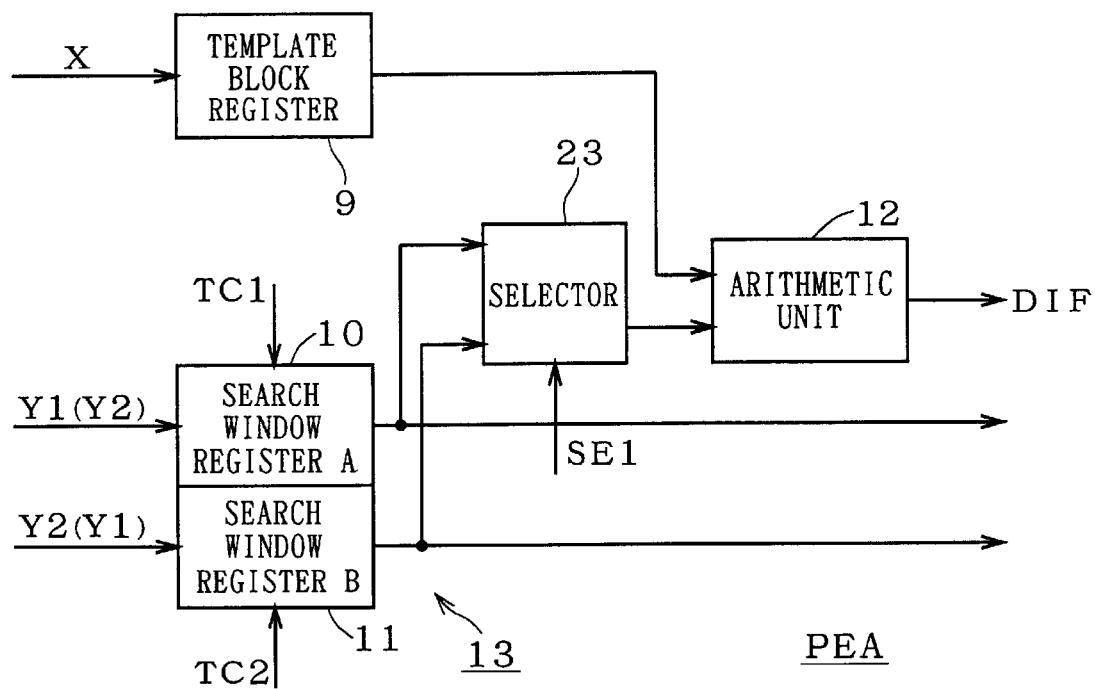
FIG. 7 is a block diagram of an element processor in accordance with the first preferred embodiment of the present invention.
Figure 8:
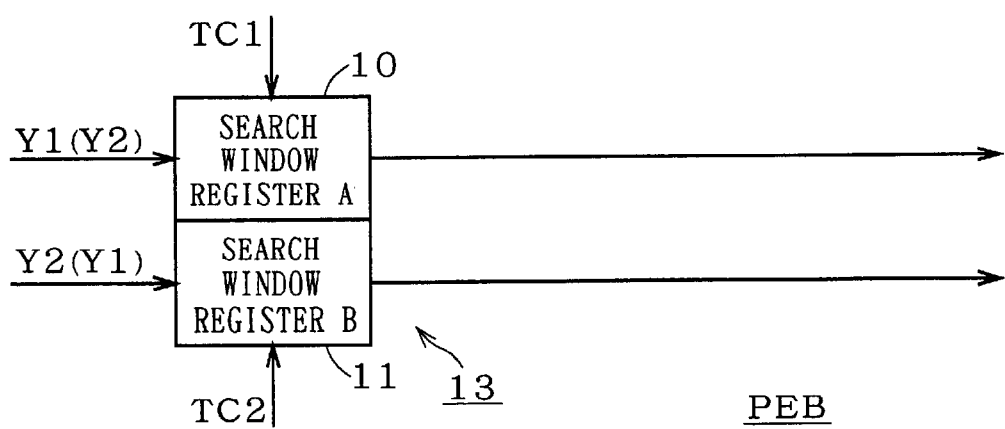
FIG. 8 is a block diagram of another element processor in accordance with the first preferred embodiment of the present invention.

FIGS. 7 and 8 are block diagrams showing a constitution of the element processor included in the processor array 7. There are two kinds of element processors, an element processor PEA temporarily termed "A-type" including an arithmetic unit and an element processor PEB temporarily termed "B-type" including no arithmetic unit. As shown in FIG. 7, the A-type element processor PEA comprises a template block register 9, a group of search windows 13, a selector 23 and an arithmetic unit 12. The group of search windows 13 includes two search window registers 10 and 11.

The template block register 9 stores one pixel data in the template data X corresponding to one template block, in other words, a pixel value for one pixel included in one template block. The search window registers 10 and 11 store one pixel data of one and the other of the search window data Y1 and Y2, respectively.

The search window registers 10 and 11 are temporarily termed "search window register A" and "search window register B", respectively. The search window registers 10 and 11 have the same configuration and store newly-inputted pixel values in synchronization with externally-applied transfer clocks TC1 and TC2, respectively. In other words, each of the search window registers 10 and 11 works as a one-pixel shift register and updates the stored pixel value in synchronization with the transfer clock TC1 or TC2. Since two kinds of transfer clocks TC1 and TC2 are separately inputted to the search window registers 10 and 11, it is possible to perform an independent transfer control of the two search window registers 10 and 11.

The selector 23 selects one of the pixel values outputted from the search window registers 10 and 11 in response to an, externally-received selection signal SE1 and outputs the one. The arithmetic unit 12 compares the pixel value stored in the template block register 9 with the pixel value outputted from the selector 23, calculates the estimation component value and outputs it. As the estimation component value, for example, the absolute differential value DIF of the two pixel values, which requires the simplest arithmetic operation, is calculated. An example of calculating the absolute differential value DIF as the estimation component value will be discussed below.

On the other hand, as shown in FIG. 8, the B-type element processor PEB comprises the search windows 10 and 11 and no template block register 9, selector 23 or arithmetic unit 12. In the processor array 7, both the element processors PEA and PEB are arranged in accordance with a predetermined rule. As a result, calculation of the absolute differential value DIF is performed for pixels after skipping based on a predetermined pattern, not for all the pixels in one template block 20.

Figure 1:
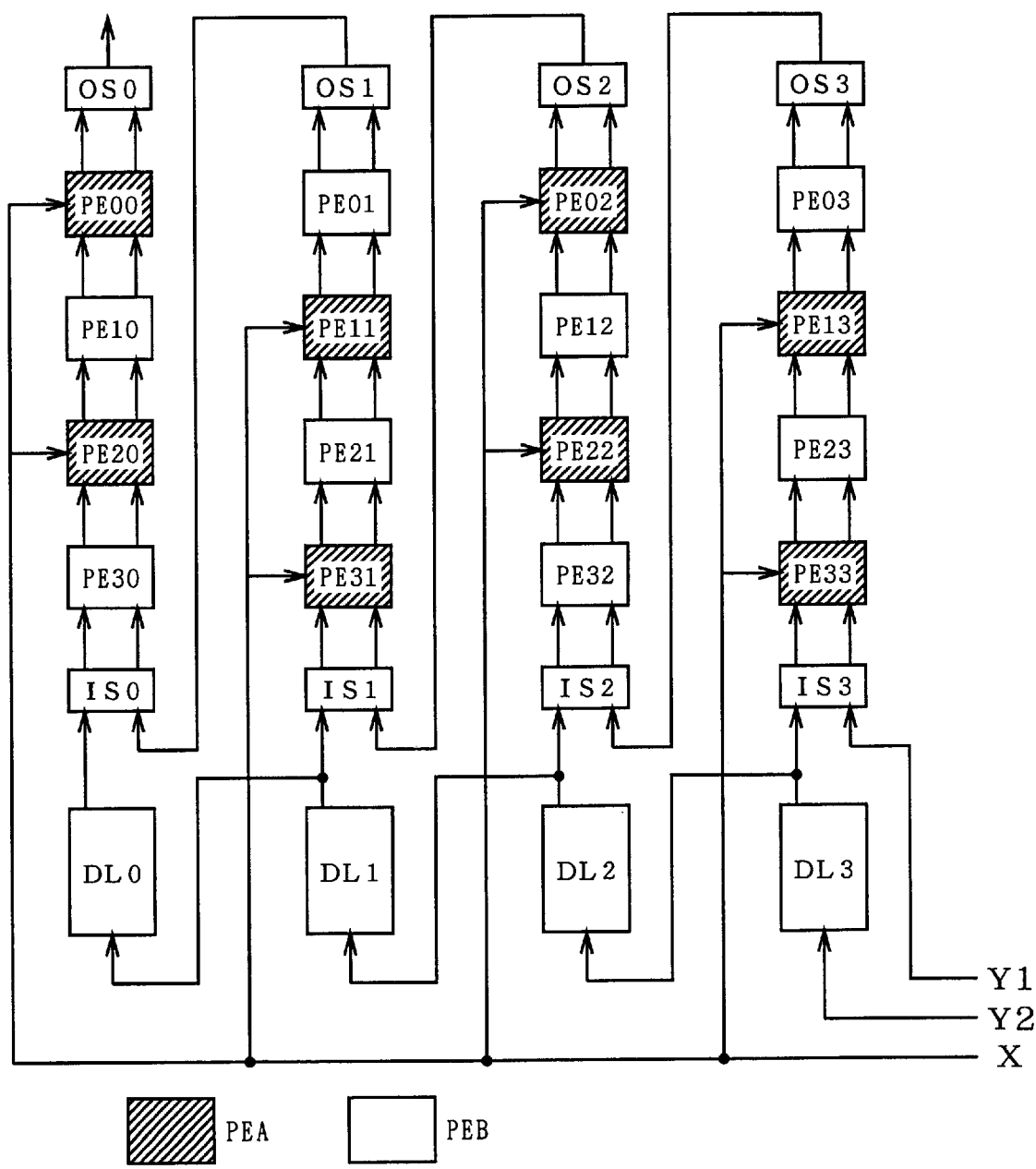
FIG. 1 is a block diagram of a processor array in accordance with a first preferred embodiment of the present invention.

FIG. 1 is a block diagram showing an internal configuration of the processor array 7. As shown in FIG. 1, the processor array 7 comprises 16 element processors PE00 to PE33 arranged in a matrix with 4 rows and 4 columns, data buffers DL0 to DL3 connected through selectors IS1 to IS3 to the element processors PE30 to PE33 located at the lowest positions of the respective columns and selectors OS0 to OS3 connected to the highest positions of the respective columns.

The data buffers DL0 to DL3 work as shift registers or FIFOs. Each of the selectors IS1 to IS3 selectively inputs the pixel value to one or the other of the search windows 10 and 11 included in the subsequent element processors PE30 to PE33. Each of the selectors OS0 to OS3 selectively receives the pixel value from one- or the other of the search windows 10 and 11 included in the preceding element processors PE00 to PE03 and outputs it.

In FIG. 1, only the A-type element processors PEA having the arithmetic unit 12 are hatched. The template block register 9 included in each of the element processors PEA is connected to a bus. Through this bus, at every head of the motion-vector operation cycle, a new pixel value of the template data X is distributed to the template block register 9 and stored therein.

The template block register 9 to be given the pixel value of the template data X is selected by a selection signal not shown. Specifically, each of many template block registers 9 is sequentially selected and each of many pixel values in the template data X is sequentially stored one by one into the selected template block register 9.

Among the element processors PE0x to PE3x included in one column (the x-th column; x=0 to 3), as to the groups of search window registers 13, the search window registers 10 are cascaded and the search window registers 11 are cascaded. In other words, among the element processors PE0x to PE3x included in one column, the pixel values included in the search window data Y1 or Y2 are transmitted from the lower side to the upper side of the figure along the cascaded search window registers 10 or the cascaded search window registers 11.

In a transfer of the pixel value between the adjacent columns, the pixel values stored in the search window register 10 or 11 included in the element processors PE01 to PE03 located at the highest positions of the figure are transmitted through the selectors OS1 to OS3 and the selectors IS1 to IS2 selectively to either the search window register 10 or 11 included in the adjacent element processors PE30 to PE32, respectively.

The outputs from the data buffers DL0 to DL3 are transmitted through the selectors IS1 to IS3 selectively to either the search window register 10 or 11 included in the element processors PE30 to PE33 located at the lowest positions of the columns, respectively. At this time, the outputs from the data buffers DL1 to DL3 are also inputted to the adjacent data buffers DL0 to DL2, respectively. To the search window register 10 or 11 included in the element processor PE33 located at the lowest position on the rightmost column, the search window data Y1 outputted from the input unit 1 are inputted through the selector IS3. To the data buffer DL3 located on the rightmost column, the search window data Y2 outputted from the input unit 1 are inputted.

The data buffers DL0 to DL3, which work as shift registers as mentioned earlier, output the inputted pixel values in a first-in first-out (FIFO) mode. Though not shown, the transfer clocks are inputted to the data buffers DL0 to DL3. Then, the data buffers DL0 to DL3 sequentially transmit the inputted pixel value in synchronization with the transfer clocks.

The data buffers DL0 to DL3 may have any configuration only if they can work as shift registers in synchronization with the transfer clocks, and, for example, data latches with shift function or register files (memories) may be used.

Figure 9:
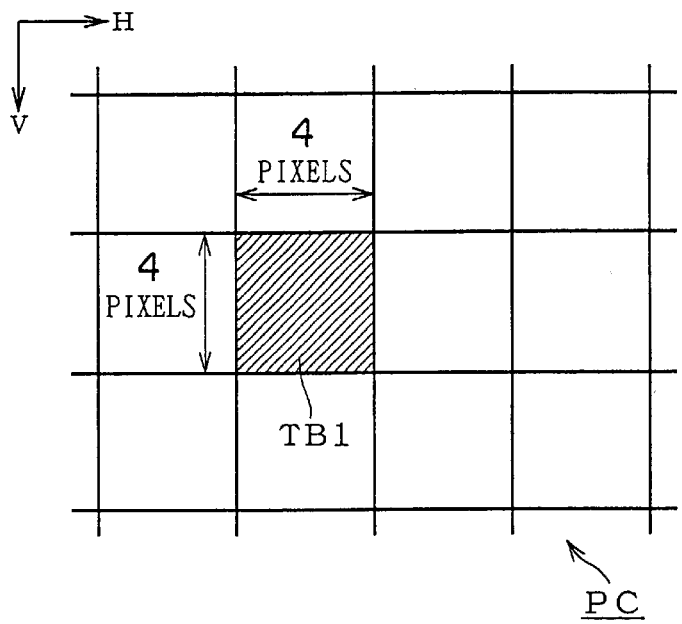
FIGS. 9 to 12 are illustrated descriptions of an operation of the device in accordance with the first preferred embodiment of the present invention.

FIG. 9 illustrates a relation between the above-mentioned block and a template block TB1 on the current image PC. The current image PC is divided into a lot of blocks as discussed above. Each of these blocks are sequentially selected as the template block TB1 (the hatched block in FIG. 9). As mentioned earlier, in this illustrated example, one block consists of 4×4 pixels.

Figure 10:
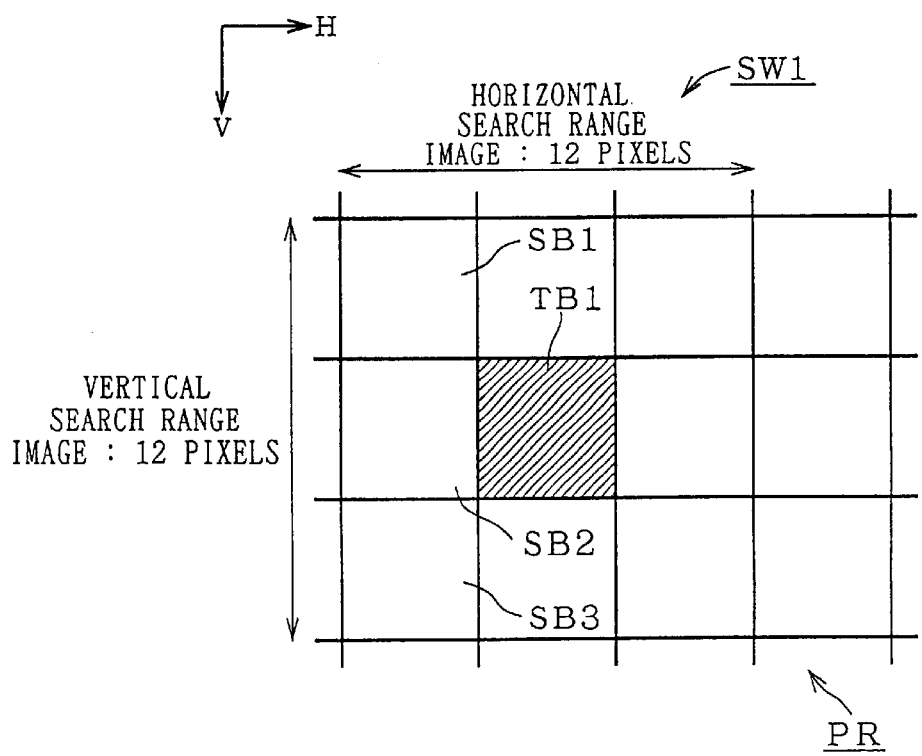

FIG. 10 is a plan view showing a part of the reference image PR. The reference image PR is divided into a lot of blocks like; the current image PC. The current image PC and the reference image PR are equally divided into blocks. In other words, the blocks in these images overlap each other. As discussed above, a search window SW1 is defined in the reference image PR for the template block TB1.

In the example of FIG. 10, the search window SW1 is defined as a region consisting of 3×3 blocks (=12×12 pixels) around the block (represented by the reference sign "TB1" for convenience of illustration) of the reference image PR at the same position as the template block TB1. As shown in FIG. 10, among the blocks constituting the search window SW1, the blocks from the highest position to the lowest position are sequentially represented by reference signs SB1 to SB3.

Figure 11:
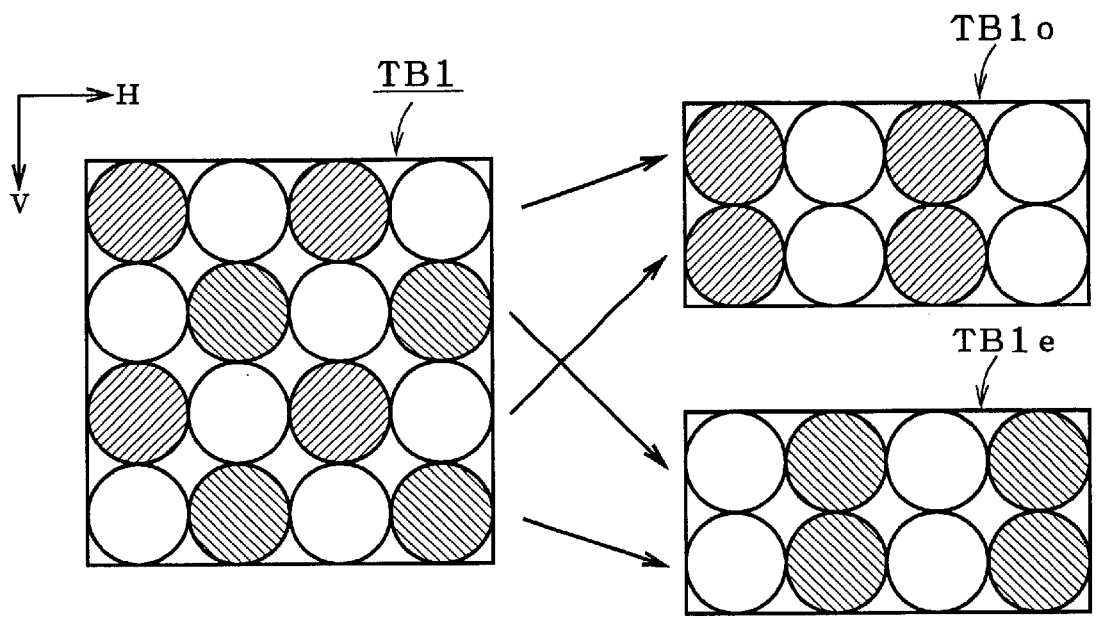

In the device 101, three kinds of motion vectors are detected for each template block TB1. FIG. 11 is an illustration of the three kinds of motion vectors. In FIG. 11, one pixel is represented by one circle. A hatched circle represents a pixel to be compared with the pixel of the search window SW1 by the element processor PEA and a blank circle represents a pixel not to be compared.

The first one of the three kinds of motion vectors corresponds to a region consisting of 4×4 pixels which coincides with the template block TB1. The second one corresponds to a 4×2-pixel odd sub-template block TB1o consisting of only pixels included in the odd fields among the pixels constituting the template block TB1. The third one corresponds to a 4×2-pixel even sub-template block TB1e consisting of only pixels included in the even fields among the pixels constituting the template block TB1.

Figure 12:
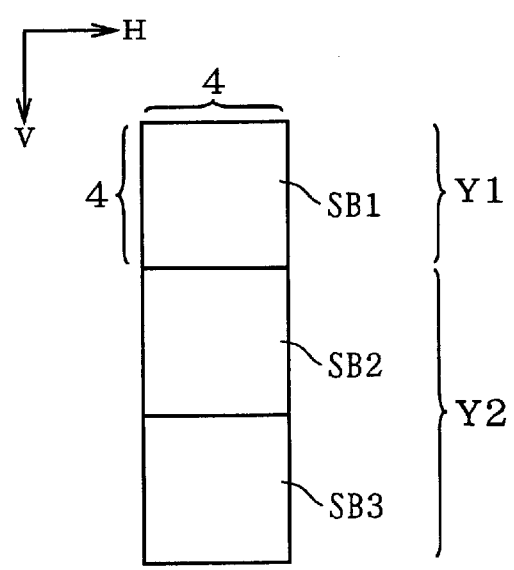

FIG. 12 is an illustration of the search window data Y1 and Y2. The search window data Y1 are defined as pixel values of the block SB1 located at the highest position in one block column included in the search window SW1. The search window data Y2 are defined as pixel values of all the blocks SB2 to SB3 located lower than the block SB1.

FIG. 13 is an illustration showing which pixel value of the search window SW1 is stored in the search window registers 10 or 11 of the element processors PE00 to PE33 and the data buffers DL0 to DL3. FIG. 13 shows an initial estimation-value operation cycle, i.e., an initial state of the motion-vector operation cycle for one template block TB1. The position of each pixel represented by the circle of FIG. 13 indicates the position in the search window SW1.

In this initial state, the template data X of a new template block TB1 are stored in the template block registers 9 provided in the element processors PEA in the element processors PE00 to PE 33. The block SB1 among the blocks SB1 to SB3 located on the leftmost column of FIG. 10 is stored in the search window register 10 on the A-side of the element processors PE00 to PE33. The blocks SB2 and SB3 among the blocks SB1 to SB3 located on the leftmost column of FIG. 10 are stored in the data buffers DL0 to DL3.

The arrangement of the element processors PE00 to PE33 of FIG. 1 corresponds to that of the pixels in on template block TB1. Therefore, the element processors PE00 to PE33 are arranged in a four-by-four matrix. In the element processors PE00 to PE33, the element processors PEA (i.e., the element processors PE00 PE02, PE11, PE13, PE20, PE22, PE31, PE33) store the pixel values of the pixels in the template block TB1 corresponding to the positions of the element processors PEA in the matrix (the hatched pixels in the template block TB1 of FIG. 11), respectively.

In other, words, the element processors PE00 to PE33 select the pixels on the odd columns if the odd rows and select the pixels on the even columns if the even rows in the template block TB1 and store their pixel values. Specifically, the element processors PE00 to PE33 skip the pixels in the template block TB1 and store the pixel values of the left pixels. Moreover, the skipping is performed every other pixel so that the skipping rate may be one-half along the horizontal scanning-line direction H. In short, the device 101 compares the pixel value of the template block TB1 after skipping with the pixel value in the search window SW1, to detect the motion vector.

Though the processor array 7 compares the pixels between the template block TB1 and the search window SW1 after the skipping, the input unit 1 can perform filtering of the current image PC and the reference image PR, as discussed above. When the filtering is performed, the pixel values of the template block TB1 and the pixel values of the search window SW1 are pixel values after filtering. In the filtering, as shown in FIGS. 4 and 5, the pixel value of the object pixel to be filtered and the pixel values of its peripheral pixels are mixed.

Therefore, the filtering can advantageously relieve the possibility of deterioration in detection accuracy of the motion vector. Moreover, since the skipping is performed every other pixel along the horizontal scanning-line direction H, as shown in FIGS. 4 and 5, the filtering where the pixel values of the two adjacent pixels on the left and right sides along the horizontal scanning-line direction H are mixed into the pixel value of the object pixel is particularly suitable for the processor array 7. That reduces the amount of operation and the hardware volume.

Though the pixels of the block SB1 are stored in the search window registers 10 or 11 in the element processors PE00 to PE33 arranged in a matrix in an initial state, the arrangement in a matrix of the element processors PE00 to PE30 of FIG. 1 and the arrangement of the pixels in the block SB1 corresponding to the pixel values stored therein coincide with each other. In other words, the element processors PE00 to PE33 store the pixel values of the pixels in the block SB1 corresponding to the positions in the matrix.

The displacement block in the search window SW1 to be compared with the template block TB1 moves in the search window SW1. At every move, the processor array 7 outputs the absolute differential values DIF. The search window registers 10 or 11 of the element processors PE00 to PE33 always store the pixel values of the displacement block. Further, the arrangement of the pixels in the displacement block and the arrangement of the element processors PE00 to PE33 storing their pixel values coincide with each other. In short, the element processors PE00 to PE33 always store the pixel values in the displacement block corresponding to their positions in a matrix.

In the initial state shown in FIG. 13, the displacement block coincides with the block SB1. At this time, a vector representing a displacement of the displacement block with respect to the template block TB1, i.e., the displacement vector, is represented as (−4, −4) by pixel. Similarly, the displacement vector of the odd sub-displacement block with respect to the odd sub-template block TB1o is represented as (−4, −2) and the displacement vector of the even sub-displacement block with respect to the even sub-template block TB1e is represented as (−4, −2).

In this state, each of the arithmetic units 12 of the eight element processors PEA, for example, outputs the absolute differential value DIF between the pixel values of the template block TB1 stored in the template block register 9 and the pixel values of the displacement block stored in the search window register 10 (the block SB1 in the initial state of FIG. 13) on a pixel-by-pixel basis. A pair of pixels to be calculated are located at the same position in the template block TB1 and the displacement block. Since the pixels of the template block TB1 are skipped, the absolute differential value DIF is calculated using only the pixels after skipping, in other words, left pixels that are not skipped. Eight absolute differential values DIF obtained by the eight element processors PEA are inputted into the summation unit 8.

Figure 14:
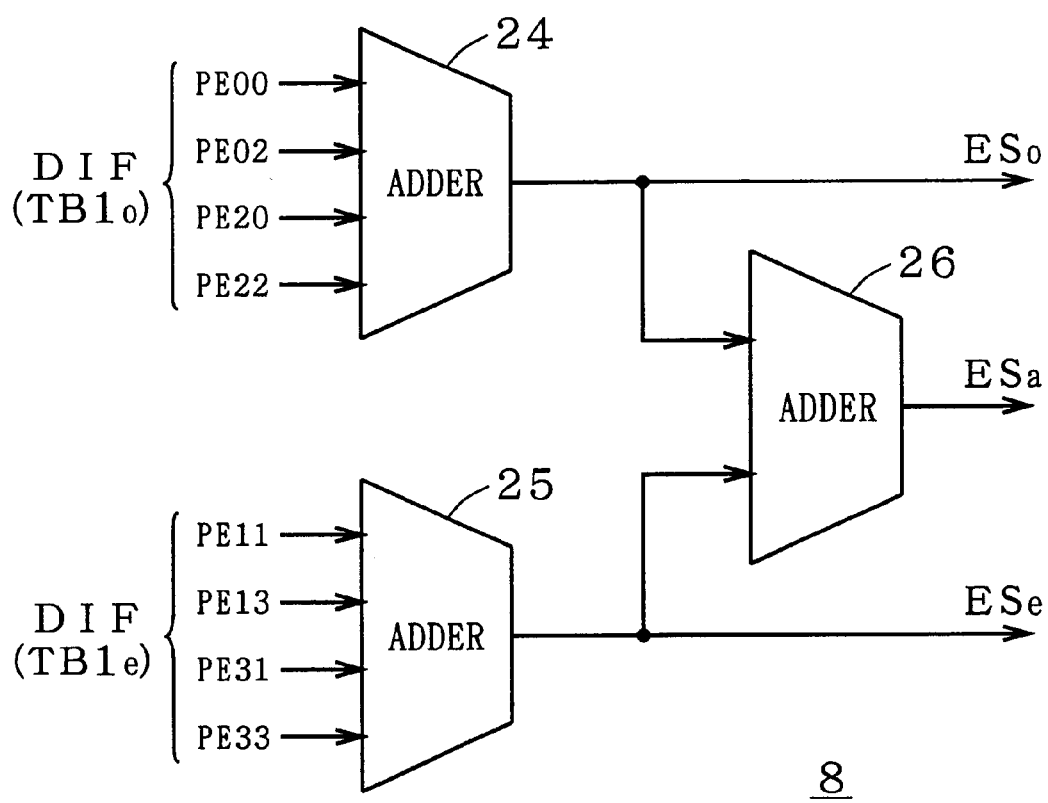
FIG. 14 is a block diagram of a summation unit in accordance with the first preferred embodiment of the present invention.

FIG. 14 is a block diagram showing an internal constitution of the summation unit 8. The summation unit 8 comprises ante-stage adders 24 and 25 and a post-stage adder 26. The adder 24 receives the absolute differential values DIF on the odd sub-template block TB1o. Specifically, the adder 24 receives the absolute differential values DIF outputted from the element processors PE00 PE02, PE20 and PE22 which are element processors PEA storing the pixel values of the odd sub-template block TB1o. The adder 24 calculates the sum of the four inputted absolute differential values DIF and outputs it as an estimation value ESo on the odd sub-displacement block (odd sub-block estimation value).

On the other hand, the adder 25 receives the absolute differential values DIF on the even sub-template block TB1e. Specifically, the adder 25 receives the absolute differential values DIF outputted from the element processors PE11, PE13, PE31 and PE33 which are element processors PEA storing the pixel values of the even sub-template block TB1e. The adder 25 calculates the sum of the four inputted absolute differential values DIF and outputs it as an estimation value ESe on the even sub-displacement block (even sub-block estimation value).

The adder 26 receives the estimation values ESo and ESe. Then, the adder 26 calculates the sum of these inputted values and outputs it as an estimation valuer ESa on the displacement block (block estimation value). Thus, the summation unit 8 can calculate the estimation values ESa, ESo and ESe on the three kinds of displacement vectors with a simple constitution.

The calculated estimation values ESa, ESo and ESe are inputted to the comparison unit 3. When the input to the comparison unit 3 is finished, the estimation-value operation cycle for the current displacement block is completed, and the next estimation-value operation cycle, specifically, a cycle for calculating the estimation values ESa, ESo and ESe on a new displacement block follows.

Figure 15:
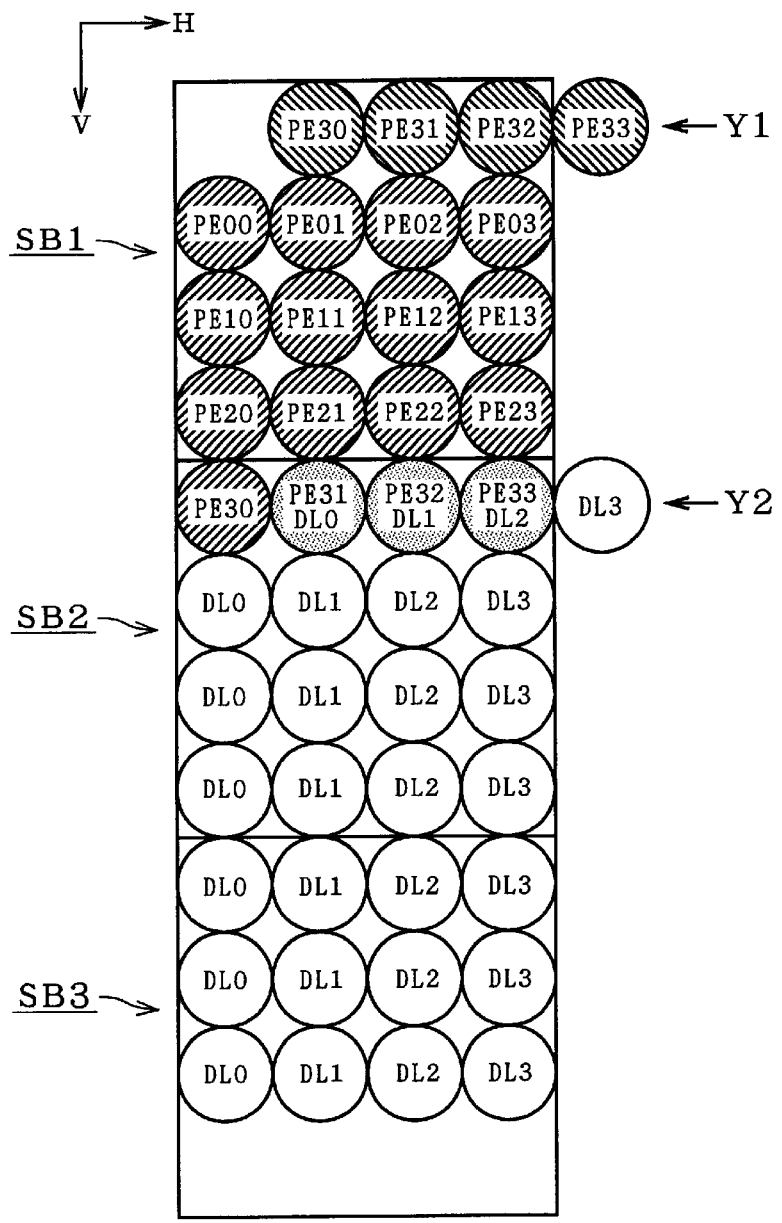
FIGS. 15 and 16 are illustrated descriptions of an operation of the processor array in accordance with the first preferred embodiment of the present invention.

FIG. 15 shows stored contents of the element processors PE00 to PE33 and the data buffers DL0 to DL3 in an estimation-value operation cycle following the initial state (FIG. 13). The pixel values stored in the template block registers 9 provided in the element processors PEA is not updated and remains stored. On the other hand, the pixel values of the search window SW1 stored in the search window registers 10 and 11 of the element processors PE00 to PE33 and the data buffers DL0 to DL3 are updated.

As can be seen from comparison between FIGS. 13 and 15, as the estimation-value operation cycle goes ahead by one step, the search window data Y1 and Y2 are transmitted forward by one pixel among the search window registers 10 and 11 of the element processors PE00 to PE33 and the data buffers DL0 to DL3 in synchronization with the transfer clocks TC1 and TC2. The pixel values stored in the search window registers 10 of the element processors PE01 to PE03 located at the highest positions are stored in the search window registers 11 of the element processors PE30 to PE32 located at the lower positions on their left hand.

The pixel values in the search window registers 10 are transmitted to the upper adjacent search window registers 10 among the element processors PE0x to PE3x included in one column (the x-th column). To the search window registers 10 of the: element processors PE3x located at the lowest positions, the pixel values are transmitted from the data buffers DLx. The pixel values outputted from the data buffers DL1 to DL3 are inputted to the left adjacent data buffers DL0 to DL2, respectively.

To the search window register 11 of the element processor PE33 located at the lowest position on the rightmost column, a new search window data Y1 are inputted from the input unit 1. At the same time, to the data buffer DL3 located on the rightmost column, a new search window data Y2 are inputted from the input unit 1. The newly-inputted search window data Y1 and Y2 are included in a new block SB1 and new blocks SB2 and SB3 located in the center of the search window SW1 (see FIG. 10), respectively.

Also in the estimation-value operation cycle of FIG. 15, like the cycle of FIG. 13, the pixel values of the displacement block to be compared with the template block TB1 are stored in the search window registers 10 of the element processors PE00 to PE33. Therefore, the displacement block is moved downward by one pixel in the search window SW1 as compared with the initial state of FIG. 13.

In other words, the pixel values of the three kinds of displacement blocks in the estimation-value operation cycle are represented as below. Specifically, the displacement vector of the displacement block with respect to the template block TB1 is represented as (−4, −3). The displacement vector of the even field with respect to the odd sub-template block TB1o is represented as (−4, −2) and the displacement vector of the odd field with respect to the even sub-template block TB1e is represented as (−4, −1).

In this estimation-value operation cycle, the absolute differential values DIF on the odd sub-template block TB1o are outputted from the element processors PE00 PE02, PE20 and PE22 and the absolute differential values DIF on the even sub-template block TB1e are outputted from the element processors PE11, PE13, PE31 and PE33, like the initial state of FIG. 13. In the summation unit 8, based on the absolute differential values DIF, the estimation values ESa, ESo and ESe corresponding to the three kinds of displacement vectors are calculated and inputted to the comparison unit 3.

Figure 16:
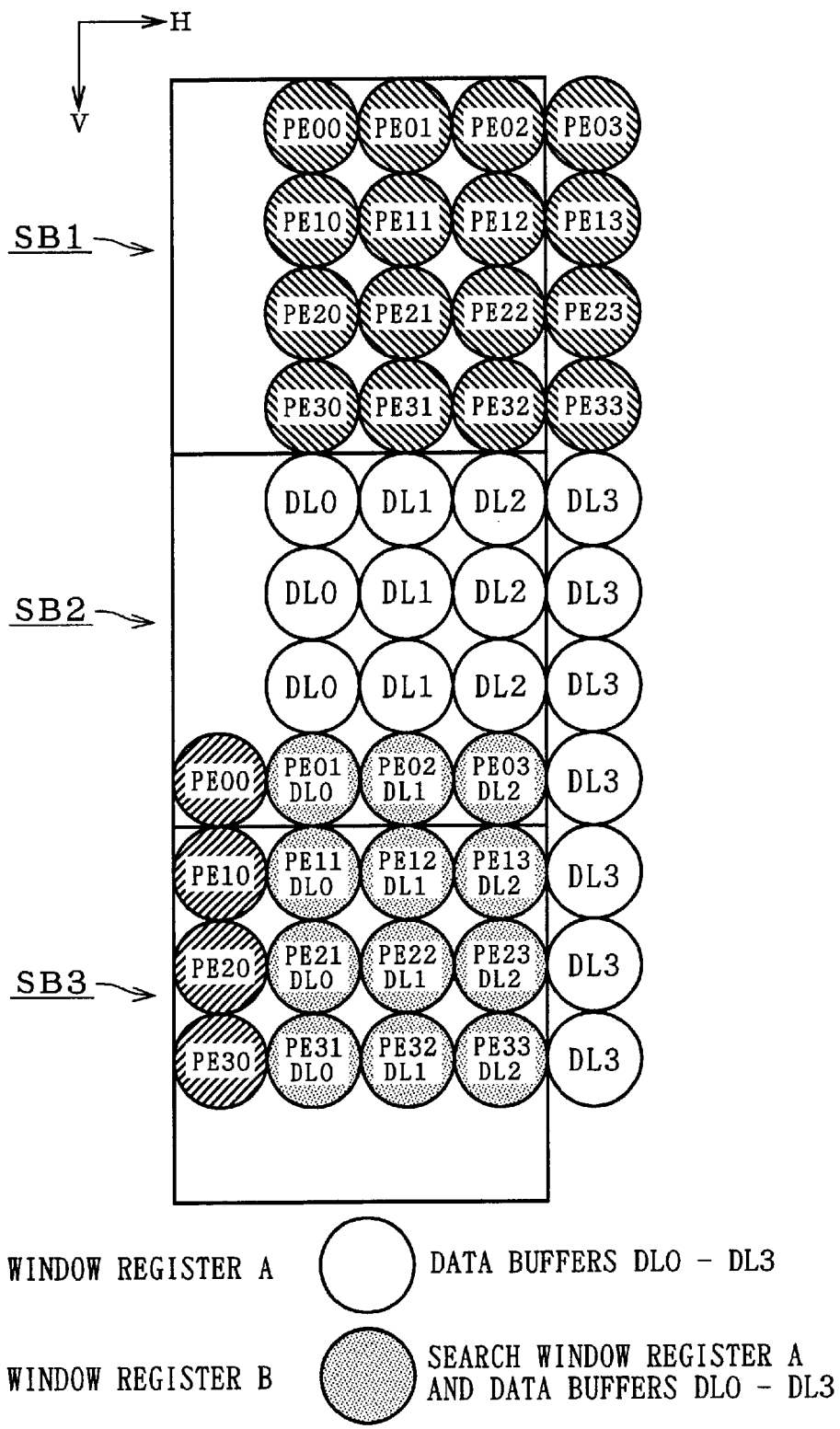

FIG. 16 is an illustration of a state after repeating the estimation-value operation cycle seven times from the initial state. The transfer of the pixel values to the search window register 11 is completed at the time when the pixel value stored in the right adjacent search window register 10 in the initial state is stored in the search window register 11. Stopping the supply of the transfer clock TC2 to the search window register 11 stops the transfer.

Also in the estimation-value operation cycle, like the cycles of FIGS. 13 and 15, the pixel values of the displacement block to be compared with the template block TB1 are stored in the search window registers 10 of the element processors PE00 to PE33. Therefore, the displacement block is moved downward by seven pixels in the search window SW1 as compared with the initial state of FIG. 13.

The pixel values of the three kinds of displacement vectors in the estimation-value operation cycle are represented as below. Specifically, the displacement vector of the displacement block with respect to the template block TB1 is represented as (−4, +3). The displacement vector of the even field with respect to the odd sub-template block TB1o is represented as (−4, +1) and the displacement vector of the odd field with respect to the even sub-template block TB1e is represented as (−4, +2).

In this estimation-value operation cycle, the absolute differential values DIF on the odd sub-template block TB1o are outputted from the element processors PE00, PE02, PE20 and PE22 and the absolute differential values DIF on the even sub-template block TB1e are outputted from the element processors PE11, PE13, PE31 and PE33, like the estimation-value operation cycles of FIGS. 13 and 15. In the summation unit 8, based on the absolute differential values DIF, the estimation values ESa, ESo and ESe corresponding to the three kinds of displacement vectors are calculated and inputted to the comparison unit 3.

Further, during the estimation-value operation cycle, in the search window registers 11 of the PE00 to PE33 and the data buffers DL0 to DL3 stored are pixel values of pixels to which the pixels corresponding to the pixel values stored in the search window registers 10 and the data buffers DL0 to DL3 in the initial state are shifted in a right direction by one pixel. Therefore, the displacement block corresponding to the pixel values stored in the search window registers 11 of the element processors PE00 to PE33 is shifted in a right direction by one pixel with respect to the displacement block corresponding to the pixel values stored in the search window registers 10 in the initial state.

The three kinds of displacement vectors on the displacement block corresponding to the pixel values stored in the search window registers 11 are represented as below. Specifically, the displacement vector of the displacement block with respect to the template block TB1 is represented as (−3, −4). The displacement vector of the even field with respect to the odd sub-template block TB1o is represented as (−3, −2) and the displacement vector of the odd field with respect to the even sub-template block TB1e is represented as (−3, −2).

In this cycle, the estimation values ESa, ESo and ESe are calculated on the basis of the displacement block corresponding to the pixel values stored in the search window registers 11 after calculation of the estimation values ESa, ESo and ESe on the basis of the displacement block corresponding to the pixel values stored in the search window registers 10. This switching is performed by the selector 23 (of FIG. 7). Specifically, the selector 23 switches an object to be referred to by the arithmetic unit 12 from the search window register 10 to the search window register 11 in response to the selection signal SE1.

As a result, the arithmetic unit 12 calculates the absolute differential value DIF based on the pixel value of the template block register 9 and the pixel value of the search window register 10 and thereafter calculates a new absolute differential value DIF based on the pixel value of the template block register 9 and the pixel value of the search window register 11. Consequently, the summation unit 8 outputs the estimation values ESa, ESo and ESe on the displacement block corresponding to the search window register 10 and subsequently the estimation values ESa, ESo and ESe on the displacement block corresponding to the search window register 11.

Thus, in this estimation-value operation cycle, by switching the search window register for operation from the search window register 10 to the search window register 11, it becomes possible to estimate the displacement block which is shifted from the initial state by one pixel in the horizontal scanning-line direction H. After that, the estimation-value operation cycle using the search window register 11 are repeated seven times. The calculation of the estimation values ESa, ESo and ESe is performed, switching the search window register to be connected to the arithmetic unit 12 between the two kinds of search window registers 10 and 11 every seven estimation-value operation cycles from the initial state.

At a point of time when the displacement block moves all over in the search window SW1, i.e., the final point of a motion-vector operation cycle, based on all of the three kinds of estimation values ESa, ESo and ESo which are calculated in all estimation-value operation cycles, the respective minimum values are searched for each kind. This operation is performed by the comparison unit 3.

The comparison unit 3 outputs the displacement vectors corresponding to the searched minimum values as the motion vectors. The outputted motion vectors are three kinds of motion vectors MVa, MVo, MVe corresponding to the three kinds of estimation values ESa, ESo, ESe. Among them, the motion vector MVa, which is based on the estimation value ESa, is a motion vector with respect to the template block TB1. The motion vector MVo, which is based on the estimation value ESo, is a motion vector with respect to the odd sub-template block TB1o. The motion vector MVe, which is based on the estimation value ESe, is a motion vector with respect to the even sub-template block TB1e.

Thus, the comparison unit 3 searches the displacement block most highly approximate to the template block TB1 in terms of pixel value, i.e., the displacement block which matches the template block TB1, and determines the displacement vector providing the matching as the motion vector MVa. Similarly, the comparison unit 3 searches the displacement block which matches the odd sub-template block TB1o and determines the displacement vector providing the matching as the motion vector MVo, and further searches the displacement block which matches the even sub-template block TB1e and determines the displacement vector providing the matching as the motion vector MVe.

As mentioned above, in the device 101, since the comparison of the pixel values between the template block TB1 (including sub-template blocks TB1o and TB1e) and the displacement block (including sub-displacement blocks) in the search window SW1, i.e., the calculation of the estimation component values such as the absolute differential values DIF is performed on the pixels after skipping, the amount of operation can be reduced. As a result, it is possible to reduce the hardware volume and search the motion vector in a wide range. Moreover, since the comparison can be performed on the basis of the filtered pixel values, the hardware volume can be reduced with less deterioration in accuracy of the detected motion vectors, i.e., in prediction accuracy.

<1-4. Variation of Processor Array>

In the processor array 7 of FIG. 1, among the element processors PE00 to PE33 arranged in a four-by-four matrix, the element processors PEA having the template block registers 9 are disposed on odd columns of odd rows and even columns of even rows. With this arrangement, the comparison between the pixel values of the template block TB1 and the pixel values of the displacement block is performed by using the pixel values of the pixels after skipping of every other pixel along the horizontal scanning-line direction H.

Alternatively, as an arrangement pattern of the element processors PEA to implement the skipping of every other pixel along the horizontal scanning-line direction H, in other words, an arrangement pattern of pixels selected for comparison with the pixels of the displacement block among the 4×4 pixels constituting the template block TB1 (temporarily, referred to as "skipping pattern"), other pattern than that of FIG. 1 (and of FIG. 11 corresponding thereto) may be used. Some examples are shown below.

Figure 17:
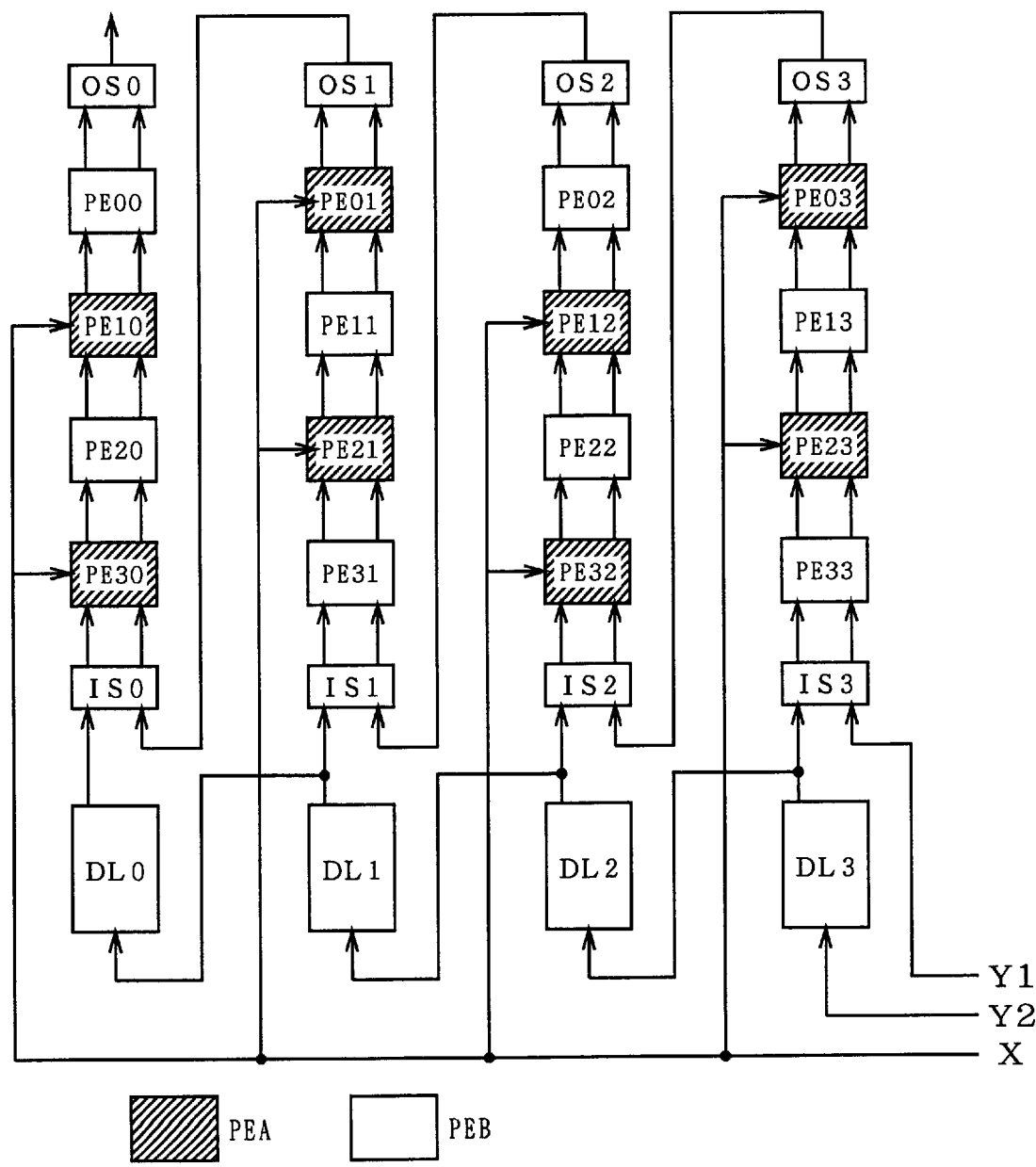
FIG. 17 is a block diagram of another example of the processor array in accordance with the first preferred embodiment of the present invention.
Figure 18:
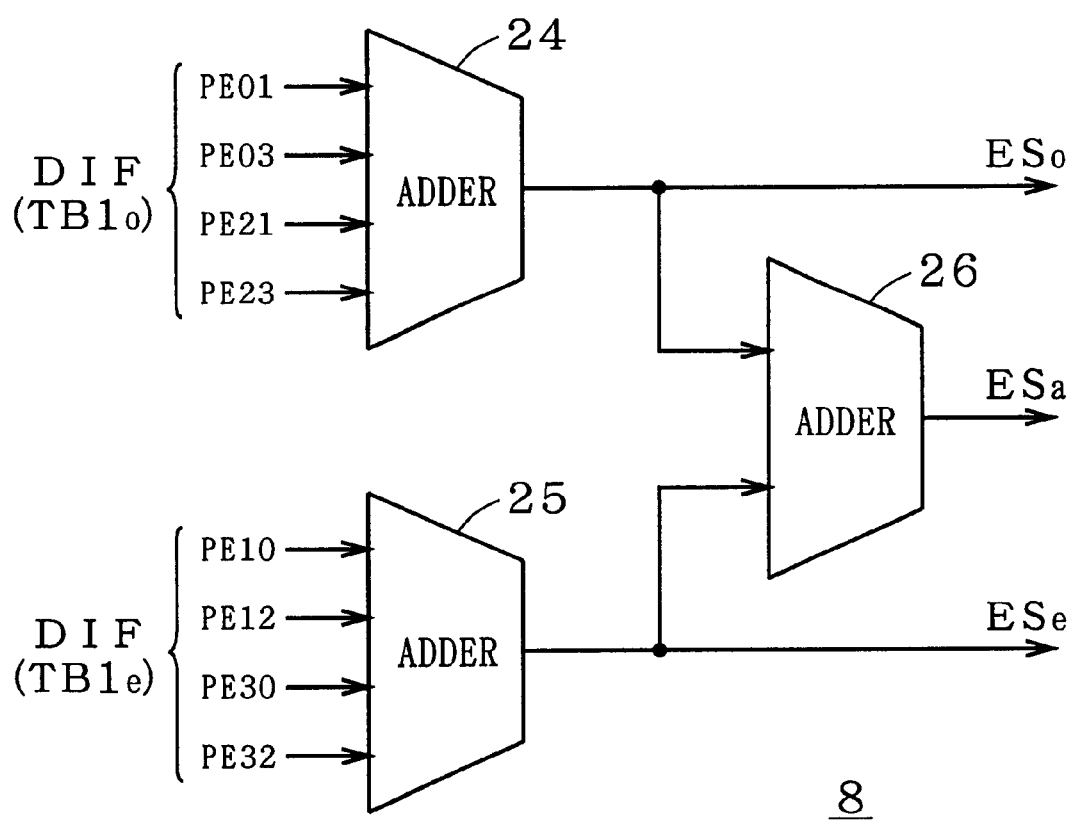
FIG. 18 is a block diagram of another example of the summation unit in accordance with the first preferred embodiment of the present invention.

In the processor array 7 of FIG. 17, the element processors PEA are disposed on even columns of odd rows and odd columns of even rows. Specifically, among the sixteen element processors PE00 to PE33, the element processors PE01, PE03, PE10, PE12, PE21, PE23, PE30 and PE32 are the element processors PEA. In this case, the summation unit 8 has a constitution as shown in the block diagram of FIG. 18, for example. The absolute differential values DIF outputted from the element processors PE01, PE03, PE21, PE23 storing the pixel values of the odd sub-template block TB1o are inputted to the adder 24. As a result, the adder 24 outputs the odd sub-block estimation value ESo.

On the other hand, the absolute differential values DIF outputted from the element processors PE10, PE12, PE30, PE32 storing the pixel values of the even sub-template block TB1e are inputted to the adder 25. As a result, the adder 25 outputs the even sub-block estimation value ESe. Further, the adder 26 outputs the block estimation value ESa. Thus, in the summation unit 8 of FIG. 18, like that of FIG. 14, the estimation values ESa, ESo and ESe on the three kinds of displacement vectors are calculated.

Figure 19:
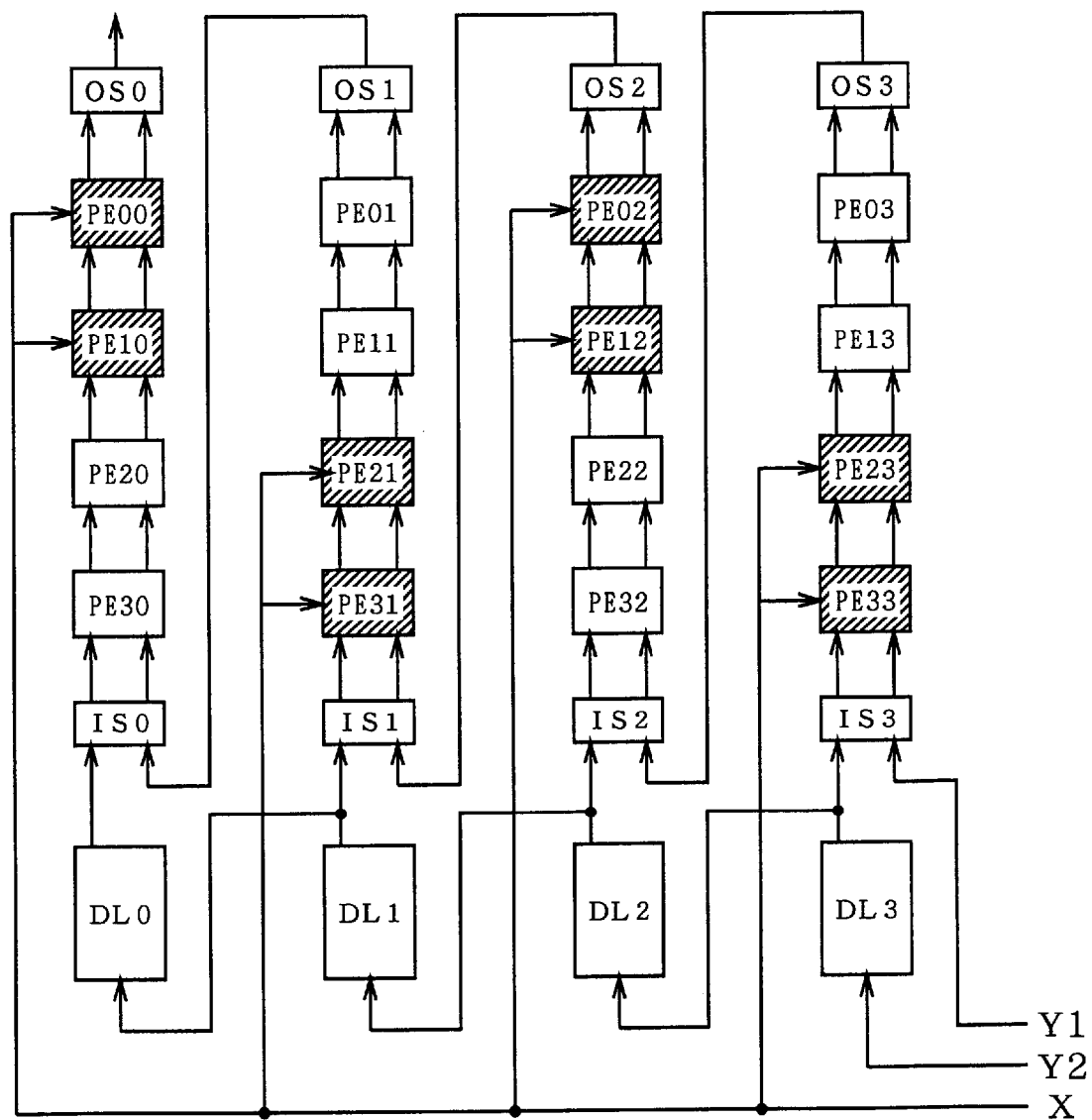
FIG. 19 is a block diagram of still another example of the processor array in accordance with the first preferred embodiment of the present invention.

In the processor array 7 of FIG. 19, the element processors PEA are disposed on odd columns in the upper half of the matrix of the element processors PE00 to PE33 and on even columns in the lower half. Specifically, among the sixteen element processors PE00 to PE33, the element processors PE00 PE02, PE10, PE12, PE21, PE23, PE31, PE33 are element processors PEA. In this case, the summation unit 8 has a constitution as shown in the block diagram of FIG. 20, for example. The absolute differential values DIF outputted from the element processors PE00 PE02, PE21, PE23 storing the pixel values of the odd sub-template block TB1o are inputted to the adder 24. As a result, the adder 24 outputs the odd sub-block estimation value ESo.

On the other hand, the absolute differential values DIF outputted from the element processors PE10, PE12, PE31, PE33 storing the pixel values of the even sub-template block TB1e are inputted to the adder 25. As a result, the adder 25 outputs the even sub-block estimation value ESe. Further, the adder 26 outputs the block estimation value ESa. Thus, in the summation unit 8 of FIG. 20, like that of FIG. 14, the estimation values ESa, ESo and ESe on the three kinds of displacement vectors are calculated.

Figure 21:
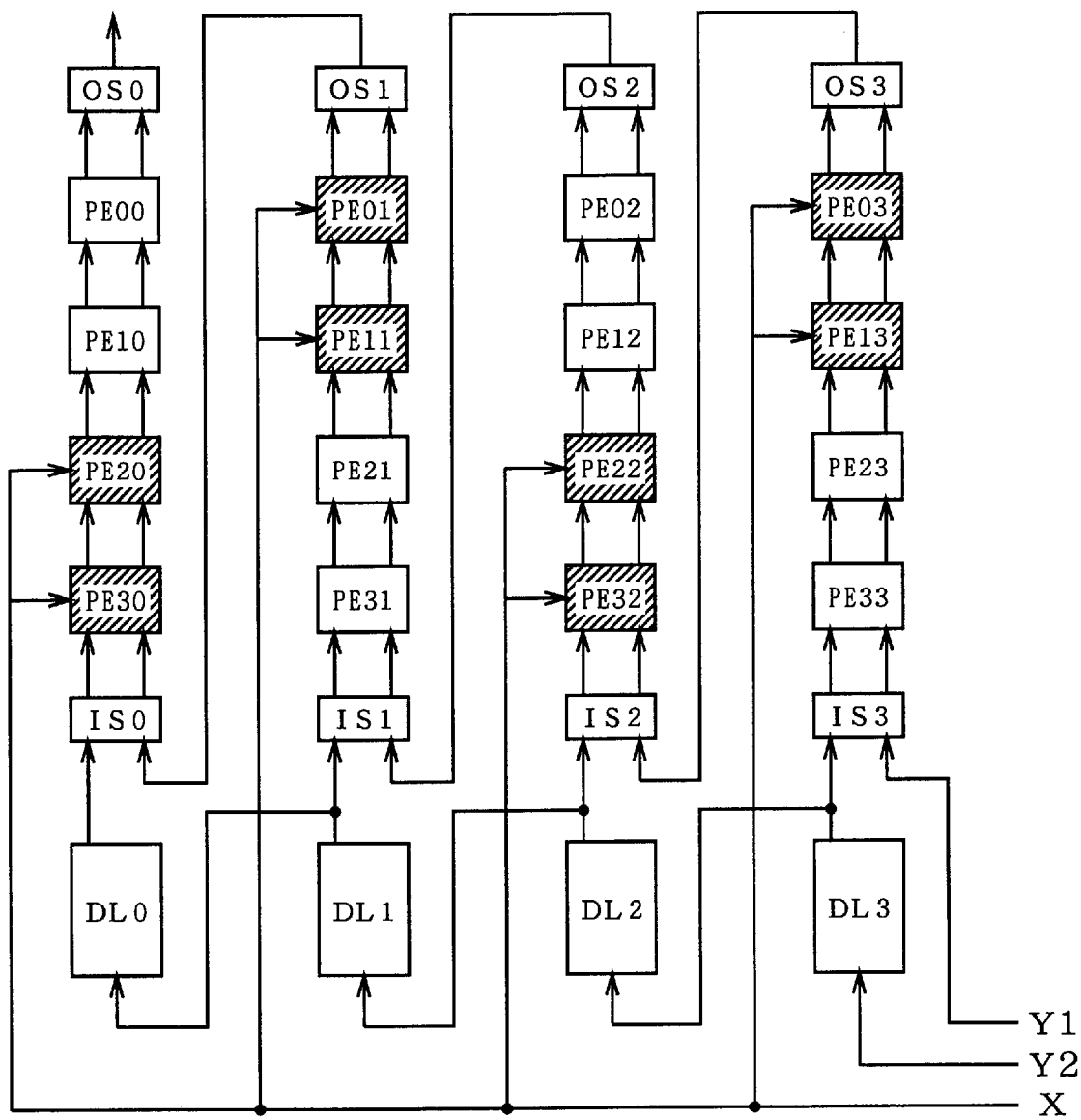
FIG. 21 is a block diagram of yet another example of the processor array in accordance with the first preferred embodiment of the present invention.
Figure 22:
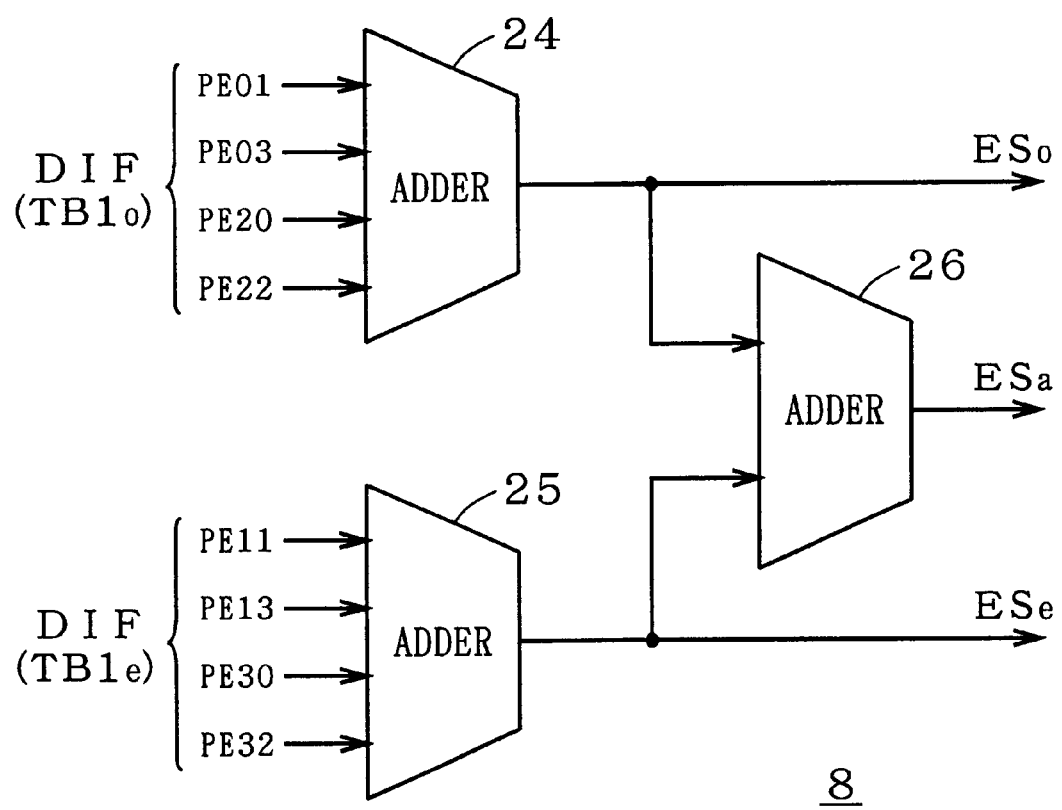
FIG. 22 is a block diagram of yet another example of the summation unit in accordance with the first preferred embodiment of the present invention.

In the processor array 7 of FIG. 21, the element processors PEA are disposed on even columns in the upper half of the matrix of the element processors PE00 to PE33 and on odd columns in the lower half. Specifically, among the sixteen element processors PE00 to PE33, the element processors PE01, PE03, PE11, PE13, PE20, PE22, PE30, PE32 are element processors PEA. In this case, the summation unit 8 has a constitution as shown in the block diagram of FIG. 22, for example. The absolute differential values DIF outputted from the element processors PE01, PE03, PE20, PE22 storing the pixel values of the odd sub-template block TB1o are inputted to the adder 24. As a result, the adder 24 outputs the odd sub-block estimation value ESo.

On the other hand, the absolute differential values DIF outputted from the element processors PE11, PE13, PE30, PE32 storing the pixel values of the even sub-template block TB1e are inputted to the adder 25. As a result, the adder 25 outputs the even sub-block estimation value ESe. Further, the adder 26 outputs the block estimation value ESa. Thus, in the summation unit 8 of FIG. 22, like that of FIG. 14, the estimation values ESa, ESo and ESe on the three kinds of displacement vectors are calculated.

2. The Second Preferred Embodiment

Figure 23:
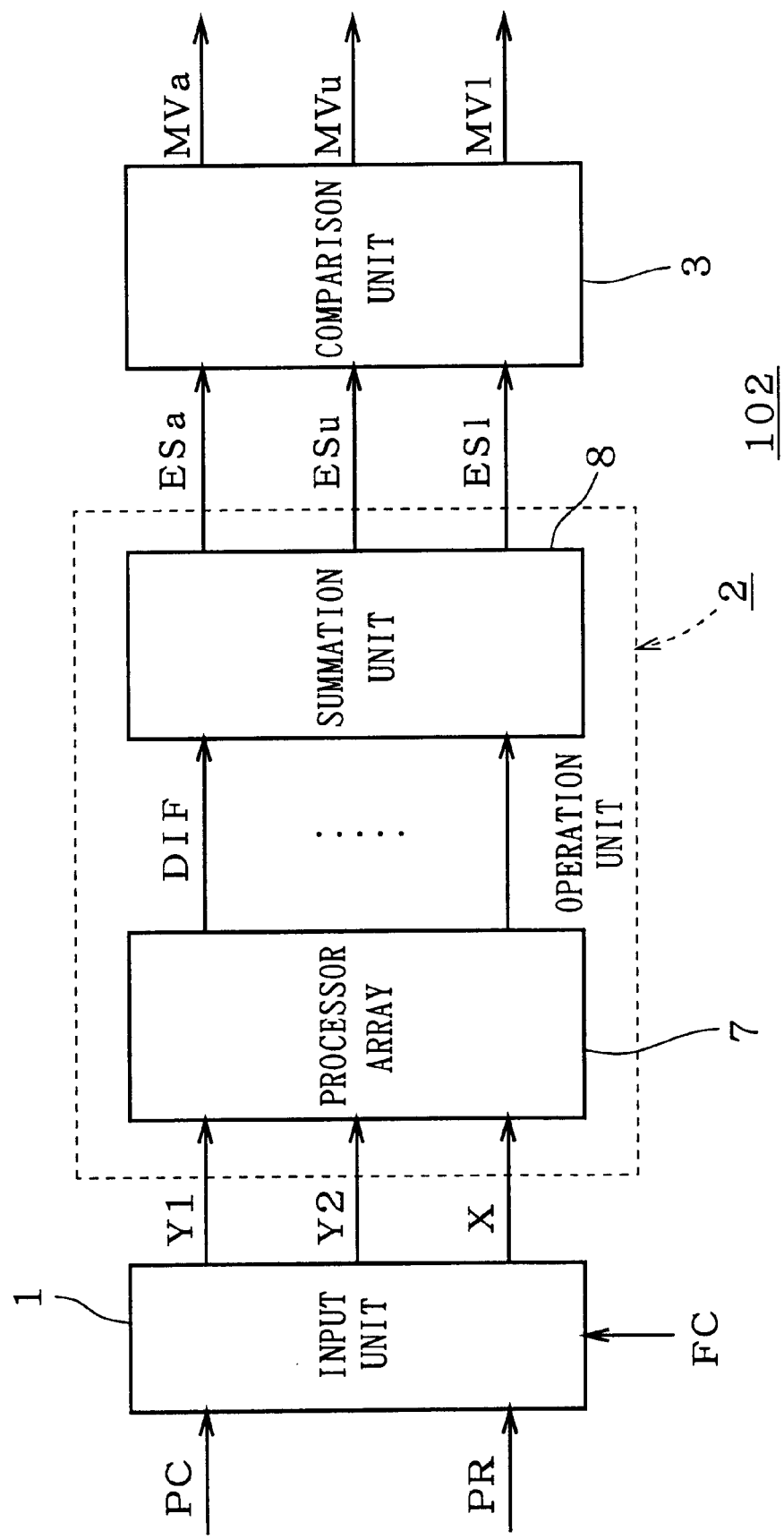
FIG. 23 is a block diagram of a device in accordance with a second preferred embodiment of the present invention.

FIG. 23 is a block diagram showing an overall constitution of a vector detecting device in accordance with the second preferred embodiment. A device 102 of FIG. 23 can be suitably used for an image compression apparatus performing an inter-field predictive coding. Therefore, the device 102 receives the current image PC and the reference image PR as field images.

In the motion vector detecting device 102, the current image PC and the reference image PR as the field images are divided into blocks like the frame image, and various processings are performed on a block-by-block basis. Though one block generally is a region of 16×16 pixels, specifically, a region having 16 pixels arranged in each of the horizontal and vertical scanning-line directions, an exemplary block of 4×4 pixels is adopted also in the second preferred embodiment like the first preferred embodiment, for simple description.

The device 102 is characteristically different from the device 101 in that the summation unit 8 outputs three kinds of estimation values ESa, ESu and ESl and the comparison unit 3 outputs three kinds of motion vectors MVa, MVu and MVl. The respective internal constitutions of the input unit 1, the processor array 7, the summation unit 8 and the comparison unit 3 are the same as those of the device 101. For example, the input unit 1 performs filtering on the current image PC and the reference image PR in response to the filter control signal FC in an on/off selectable manner.

Figure 24:
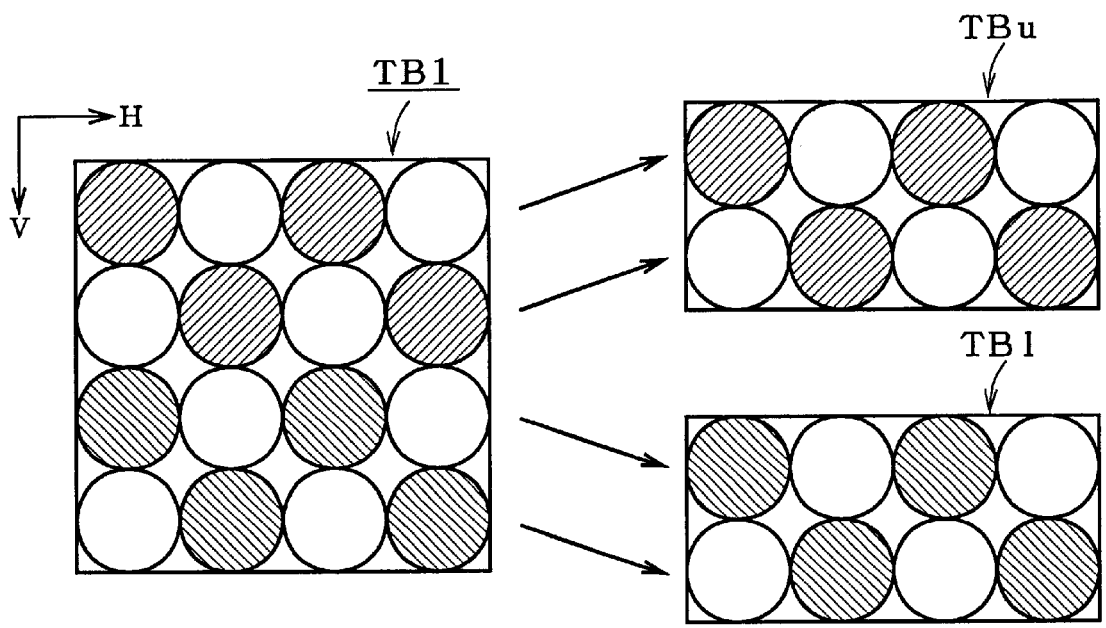
FIG. 24 is an illustrated description of an operation of the device in accordance with the second preferred embodiment of the present invention.

FIG. 24 is an illustrated description of the three motion vectors. In FIG. 24, one circle represents one pixel. A hatched circle represents a pixel to be compared with the pixel of the search window SW1 by the element processor PEA and a blank circle represents a pixel not to be compared. As can be seen from the comparison between FIGS. 11 and 24, the devices 101 and 102 has the same skipping pattern.

Among the three motion vectors, the motion vector MVa corresponds to the template block TB1 (4×4 pixels). Other two motion vectors MVu and MVl correspond to an upper sub-template block TB1u (4×2 pixels) and a lower sub-template block TB1l (4×2 pixels) into which the template block TB1 is vertically divided, respectively.

The processor array 7 of the device 102 is illustrated in the FIG. 1, like the processor array 7 of the device 101. Therefore, among the element processors PE00 to PE33, the element processors PEA for storing the pixel values of the upper sub-template block TB1u are element processors PE00 PE02, PE11 and PE13 and the element processors PEA for storing the pixel values of the lower sub-template block TB1l are element processors PE20, PE22, PE31 and PE33.

Figure 25:
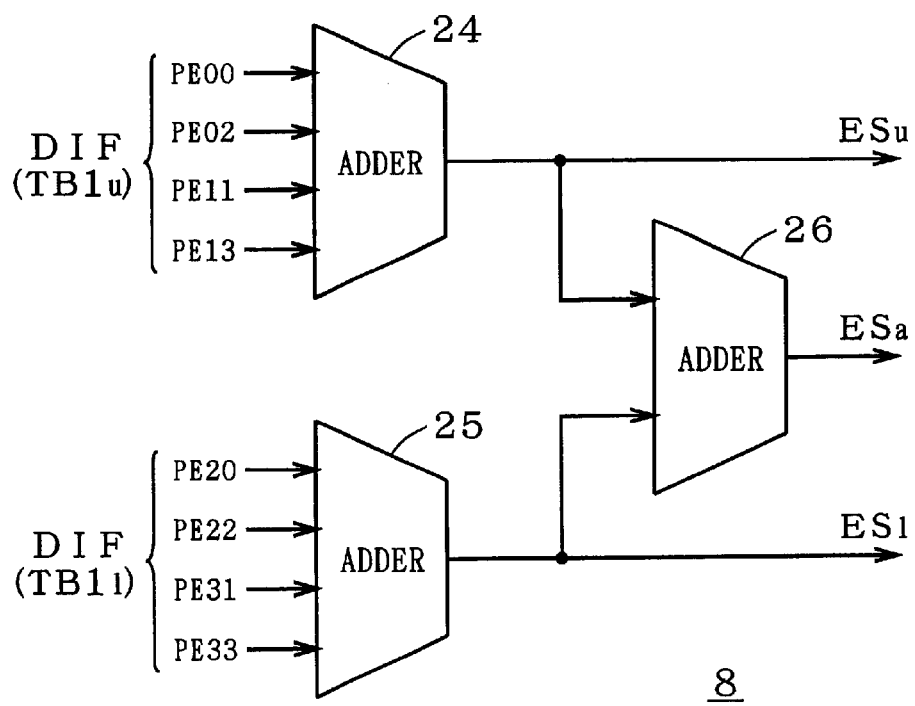
FIG. 25 is a block diagram of a summation unit in accordance with the second preferred embodiment of the present invention.

FIG. 25 is a block diagram showing an internal constitution of the summation unit 8 provided in the device 102. The constitution of the summation 8 is the same as that provided in the device 101 (e.g., shown in FIG. 14). The absolute differential values DIF on the upper sub-template block TB1u are inputted to the adder 24. Specifically, the absolute differential values DIF outputted from the element processors PE00 PE02, PE11 and PE13 for storing the pixel values of th e upper sub-template block To TB1u are inputted to the adder 24. Then, the adder 24 calculates the sum of the inputted four absolute differential values DIF and outputs it as the estimation value ESu on t he upper sub-displacement block (upper sub-block estimation value).

On the other hand, the absolute differential values DIF on the lower sub-template block TB1 are inputted to the adder 25. Specifically, the absolute differential values DIF outputted from the element processors PE20, PE22, PE31 and PE33 for storing the pixel values of the lower sub-template block TB1 are inputted to the adder 25. Then, the adder 25 calculates the sum of the inputted four absolute differential values DIF and outputs it as the estimation value ESl on the lower sub-displacement block (lower sub-block estimation value).

The estimation values ESu and ESl are inputted to the adder 26. Then, the adder 26 calculates the sum of the inputted values and outputs it as the estimation value ESa on the displacement block (block estimation value). Thus, the summation unit 8 obtains the estimation values ESa, ESu and ESl for the three kinds of displacement vectors with a simple constitution.

As described above, the three kinds of estimation values ESa, ESu and ESl for the three kinds of displacement vectors representing the displacements of the three kinds of displacement blocks from the three kinds of template blocks are calculated, respectively. The three kinds of displacement vectors to be estimated in an estimation-value operation cycle have the same vector value. The comparison unit 3 searches the three kinds of displacement vectors providing the minimum values to the three kinds of estimation values ESa, ESu and ESl and outputs the three kinds of searched displacement vectors as the motion vectors MVa, MVu and MVl.

Furthermore, instead of the processor array 7 of FIG. 1, those of FIGS. 17, 19 and 21 may be used, like the first preferred embodiment. In any case, the absolute differential values DIF on the upper sub-template block TB1u are inputted to the adder 24 in the summation unit 8 (of FIG. 25) and the absolute differential values DIF on the lower sub-template block TB1l are inputted to the adder 25.

Thus, also in the device 102, since the comparison of the pixel values between the template block TB1 (including sub-template blocks TB1u and TB1l) and the displacement block (including sub-displacement blocks) in the search window SW1, i.e., the calculation of the estimation component values such as the absolute differential values DIF is performed on the pixels after skipping, the amount of operation can be reduced. As a result, it is possible to reduce the hardware volume and search the motion vector in a wide range. Moreover, since the comparison can be performed on the basis of the filtered pixel values, the hardware volume can be reduced while suppressing deterioration in accuracy of the detected motion vectors, i.e., in prediction accuracy.

3. The Third Preferred Embodiment

FIG. 26 is a block diagram showing an overall constitution of a motion vector detecting device in accordance with the third preferred embodiment. A device 103 of FIG. 26 can be suitably used for an image compression apparatus performing an inter-frame predictive coding. Therefore, the device 103 receives the current image PC and the reference image PR as frame images.

Figure 27:
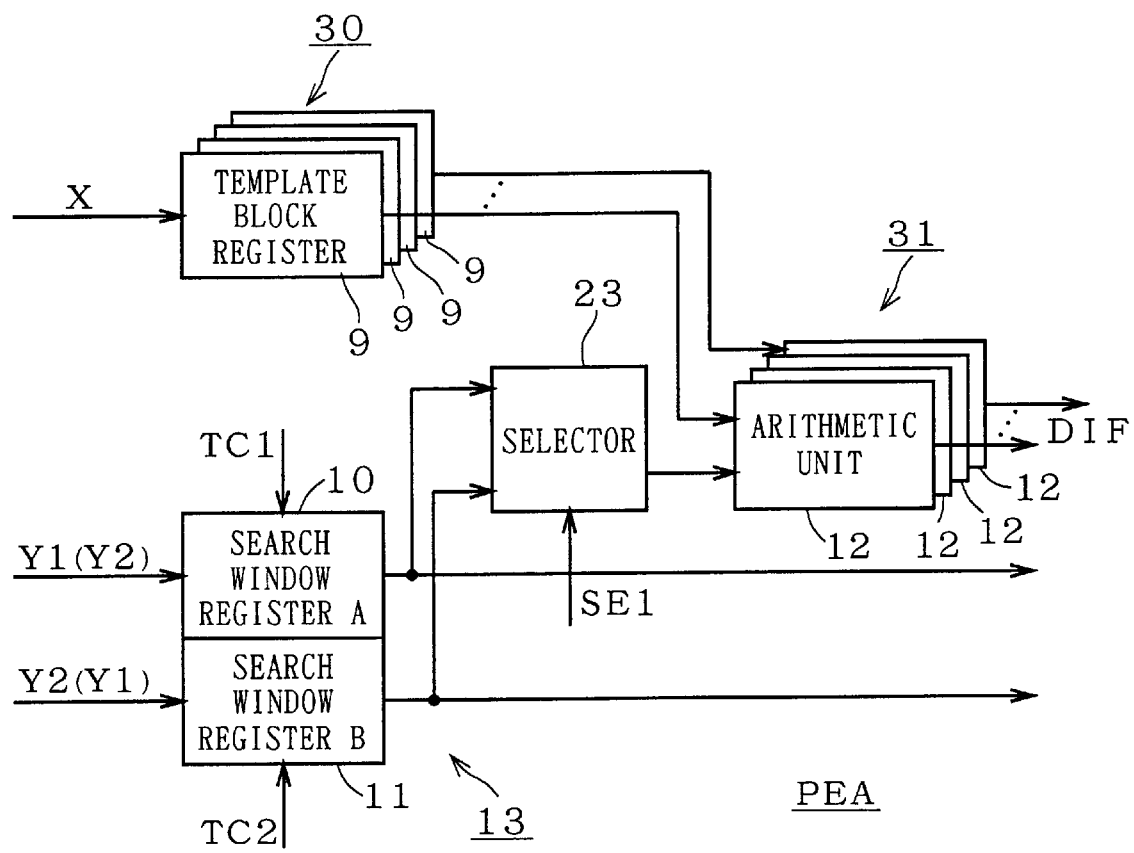
FIG. 27 is a block diagram of an element processor in accordance with the third preferred embodiment of the present invention.

In the device 103, the processor array 7 is constituted, for example, as shown in FIG. 1. The element processors PEA among the element processors PE00 to PE33 are replaced by those as shown in FIG. 27. Each element processor PEA of FIG. 27 comprises a group of template block registers 30 including n ($\geq 2$) template block registers 9 and a group of arithmetic units 31 including n arithmetic units 12 as well as the search window registers 10 and 11 and the selectors 23.

Outputs from the n template block registers 9 are inputted to the n arithmetic units 12, respectively. An output of the selector 23 is inputted commonly to all the n arithmetic units 12. Specifically, each of the n arithmetic units 12 compares the template data X stored in one of the n template block registers 9 with the search window data Y1 or Y2 stored in either the search window register 10 or 11 which is selected by the selector 23, to calculate the absolute differential value DIF.

With reference back to FIG. 26, the operation unit 2 comprises a group of summation units 28 as well as the processor array 7. The group of summation units 28 comprises n summation units $8_1$ to $8_n$. Each of the summation units $8_1$ to $8_n$ has the same constitution as the summation unit 8 of FIG. 14. The outputs from the n arithmetic units 12 are inputted to the n summation units $8_1$ to $8_n$, respectively. Each of the n summation units $8_1$ to $8_n$ calculates the three kinds of estimation values ESa, ESo and ESe and outputs them. The n groups of estimation values ESa, ESo and ESe outputted from the n summation units $8_1$ to $8_n$ are inputted to a comparison unit 29. The comparison unit 29 searches the motion vectors MVa, MVo and MVe based on the estimation values ESa, ESo and ESe and outputs the searched motion vectors.

Figure 28:
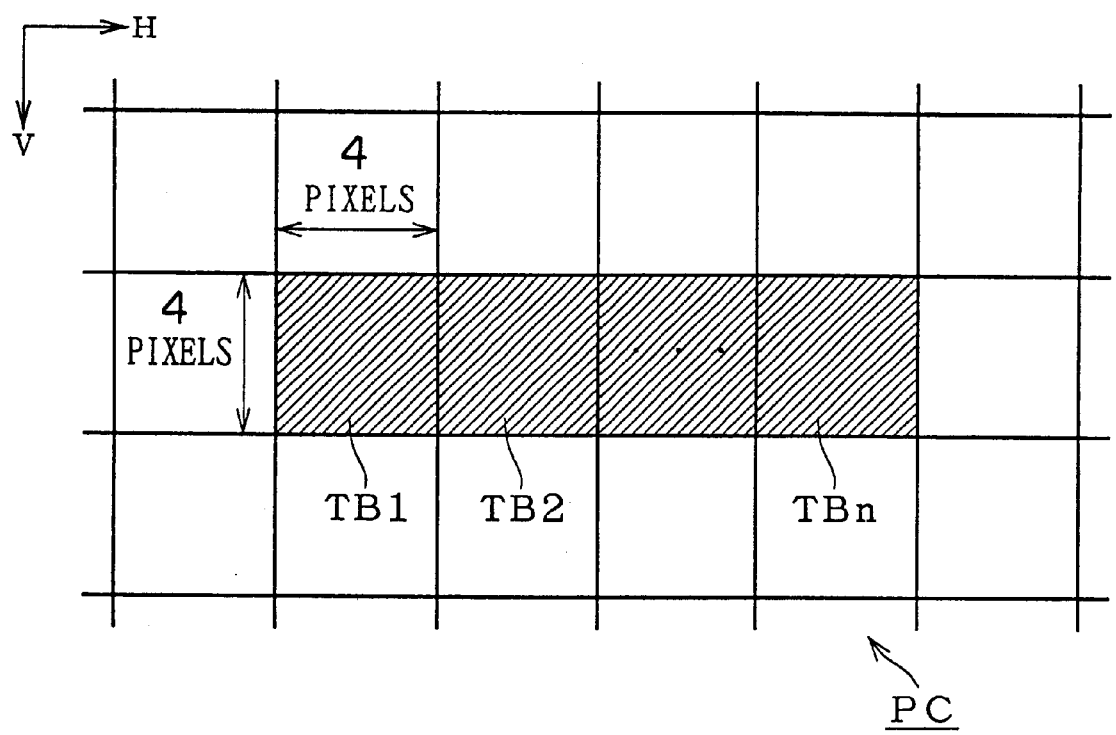
FIG. 28 is an illustrated description of an operation of the device in accordance with the third preferred embodiment of the present invention.

FIG. 28 is an illustration of template blocks corresponding to the template data stored in the n template block registers 9 provided in the element processors PEA, As shown in FIG. 28, in the device 103, n consecutive template blocks TB1 to TBn are set in the current image PC at one time. The template blocks TB1 to TBn are preferably set consecutively in the horizontal scanning-line direction H as shown in FIG. 28.

To the n template block registers 9 provided in each of the element processors PEA among the element processors PE00 to PE33, n template data X1 to Xn corresponding to the consecutive template blocks TB1 to TBn are stored at one time. The pixel values of the n pixels positioned at the same position in each of the template blocks TB1 to TBn are stored in the n template block registers 9 in one element processor PEA.

A common search window is set for these template blocks TB1 to TBn. The common search window is set as the sum of respective search windows for the template blocks TB1 to TBn. Therefore, supposing that FIG. 28 shows the reference image PR and the template blocks TB1 to TBn to be drawn are a row of blocks in the reference image PR corresponding to the template blocks TB1 to TBn, the common search window corresponds to e.g., a region of (n+2)×3 blocks as shown in FIG. 28. In other words, the common search window is defined as a region obtained by expanding the row of blocks in the reference image PR corresponding to the template blocks TB1 to TBn circumferentially, e.g., by one block.

The displacement block sequentially moves in the common search window in such a manner as shown in FIGS. 13, 15 ad 16. Then, comparisons between the pixel values of one displacement block and n template data X1 to Xn are performed at the same time. Thus, the template data X1 to Xn corresponding to the template blocks TB1 to TBn are stored in the n template block registers 9, and a simultaneous operation is made on the n template blocks TB1 to TBn with different displacement vectors.

In the case of the template blocks TB1 to TBn shown in FIG. 28, assuming that the displacement point for the template block TB1 is a reference point, a displacement point displaced in a positive horizontal scanning-line direction H by a horizontal template-block size (=4 pixels) is estimated for the template block TB2 and a displacement point displaced in a positive horizontal scanning-line direction H by (n−1)×4 pixels is estimated for the template block TBn at the same timing. As a result, the absolute differential values DIF between the n template data X1 to Xn and the pixel values of one displacement block are outputted at one time from the element processors PEA among the element processors PE00 to PE33.

Figure 29:
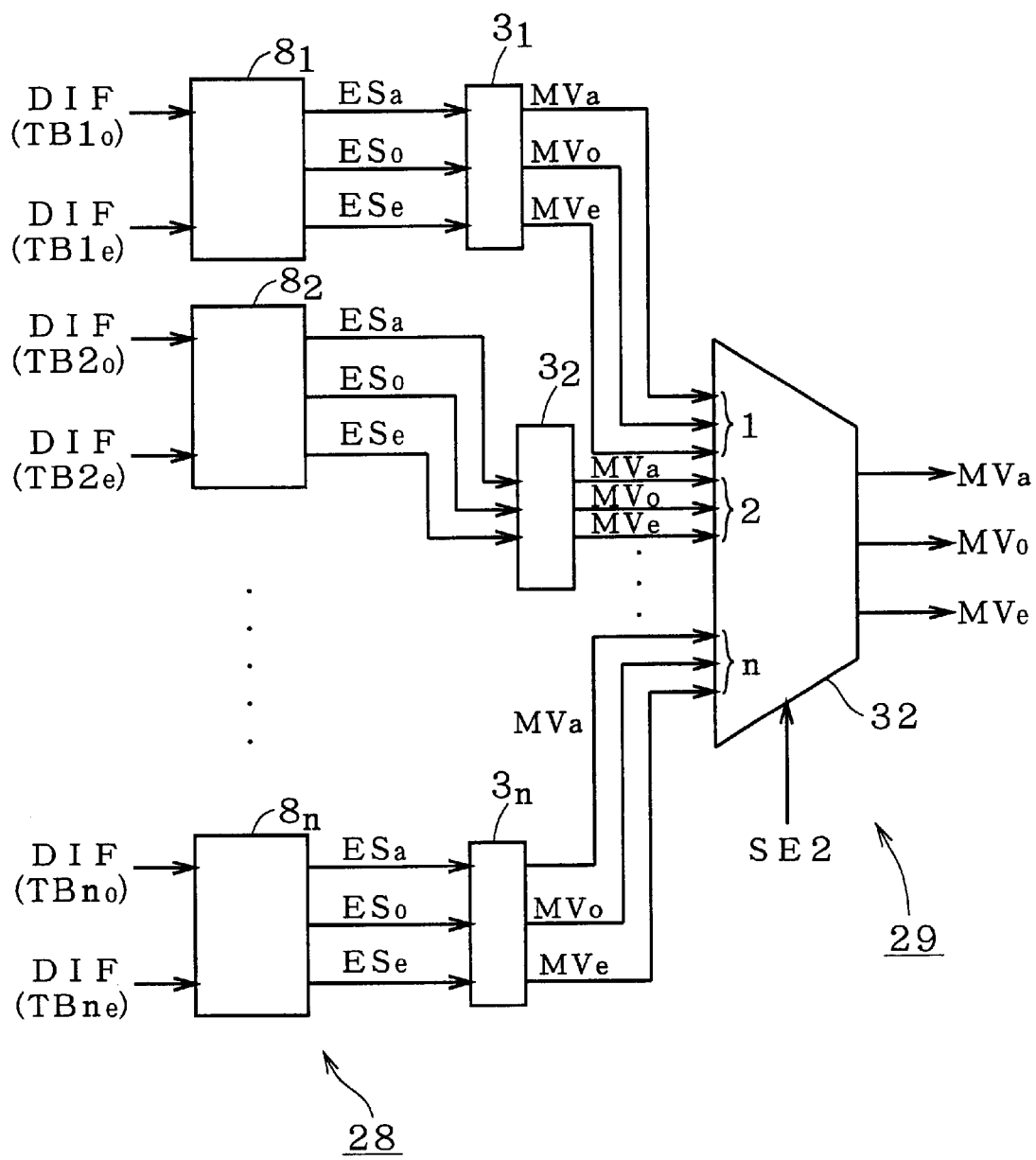
FIG. 29 is a block diagram of a comparison unit in accordance with the third preferred embodiment of the present invention.

As shown in FIG. 29, n absolute differential values DIF corresponding to the n template blocks TB1 to TBn are inputted to the summation units $8_1$ to $8_n$ included in the group of summation units 28. Each of the summation units $8_1$ to $8_n$ has the same constitution as the summation unit 8 of FIG. 14. The absolute differential value DIF on the odd sub-template block TBko (k=1 to n) is inputted to the adder 24 provided in the summation unit $8_k$ and the absolute differential value DIF on the even sub-template block TBke is inputted to the adder 25. As a result, the n summation units $8_1$ to $8_n$ output n groups of estimation values ESa, ESo and ESe corresponding to the n template block TB1 to TBn, respectively.

The comparison unit 29 comprises n comparison units $3_1$ to $3_n$ and further comprises a selector 32 which selects one of outputs from the n comparison units $3_1$ to $3_n$ and outputs the selected one in response to a selection signal SE2. The n groups of estimation values ESa, ESo and ESe outputted from the n summation units $8_1$ to $8_n$ are inputted to the n comparison units $3_1$ to $3_n$. As a result, the n comparison units $3_1$ to $3_n$ output the n groups of motion vectors MVa, MVo and MVe corresponding to the n template blocks TB1 to TBn, respectively.

The n comparison units $3_1$ to $3_n$ calculate the n groups of motion vectors MVa, MVo and MVe, for example, at the time when the move of the displacement block in the common search window is completed. At this time, the selector 32 selects one of the n groups of calculated motion vectors MVa, MVo and MVe and outputs it.

When the n comparison units $3_1$ to $3_n$ output the n groups of motion vectors MVa, MVo and MVe differently in terms of time from one another, the selector 32 is not always needed and the outputs from the n comparison units $3_1$ to $3_n$ may be connected to a common bus line. For example, it is possible to constitute the comparison units $3_1$ to $3_n$ so that each of the n groups of motion vectors MVa, MVo and MVe may be sequentially calculated every time when the move of the displacement vector in a search window individually defined for each of the template blocks TB1 to TBn is completed, and in this case, the selector 32 is not necessarily provided. At this time, it is desirable that the comparison units $3_1$ to $3_n$ should be constituted so that, for example, the output from a comparison unit 3 may be in high impedance while the comparison unit 3 outputs no effective data lest the outputs from the comparison units $3_1$ to $3_n$ collide with one another in the bus line.

Furthermore, instead of the processor array 7 of FIG. 1, those of FIGS. 17, 19 and 21 may be used, like the first preferred embodiment. In any case, the absolute differential value DIF on the odd sub-template block TBko is inputted to the adder 24 in the summation unit $8_k$ (of FIG. 29) and the absolute differential value DIF on the even sub-template block TBke is inputted to the adder 25. As a result, in any case, the n summation units $8_1$ to $8_n$ output n groups of estimation values ESa, ESo and ESe corresponding to the n template blocks TB1 to TBn.

As discussed above, in the device 103, since simultaneous operation is made on a plurality of template blocks TB1 to TBn, sharing the search window registers 10 and 11, it is possible to cut the operation time. Further, though it is also possible to achieve the simultaneous operation on the n template blocks TB1 to TBn by aligning n processor arrays 7 of the first preferred embodiment, in the device 103, as compared with this constitution, the hardware volume is remarkably reduced. In other words, the device 103 has an advantage, over the device 101, that it is possible to cut the operation time while suppressing the increase in hardware volume.

Furthermore, since the unit of coding is generally moved along the horizontal scanning-line direction H in the image compression technique, when a plurality of template blocks TB1 to TBn are set consecutively along the horizontal scanning-line H as shown in FIG. 28, it is possible to further enhance the efficiency of the operation.

Thus, also in the device 103, since the comparison of the pixel values between the template block (including sub-template blocks) and the displacement block (including sub-displacement blocks) in the search window, i.e., the calculation of the estimation component values such as the absolute differential values DIF is performed on the pixels after skipping, the amount of operation can be reduced. As a result, it is possible to reduce the hardware volume and search the motion vector in a wide range, like the first and second preferred embodiments. Moreover, since the comparison can be performed on the basis of the filtered pixel values, the hardware volume can be reduced while suppressing deterioration in accuracy of the detected motion vectors, i.e., in prediction accuracy.

4. The Fourth Preferred Embodiment

FIG. 30 is a block diagram showing an overall constitution of a vector detecting device in accordance with the fourth preferred embodiment. A device 104 of FIG. 30 can be suitably used for an image compression apparatus performing an inter-field predictive coding. Therefore, the device 104 receives the current image PC and the reference image PR as field images.

The device 104 is characteristically different from the device 103 in that each of the n summation units $8_1$ to $8_n$ outputs three kinds of estimation values ESa, ESu and ESl and the comparison unit 29 outputs three kinds of motion vectors MVa, MVu and MVl. The respective internal constitutions of the input 1, the processor array 7, the summation units $8_1$ to $8_n$ and the comparison unit 29 are the same as those of the device 103. For example, the processor array 7 has a configuration of FIG. 1.

Figure 31:
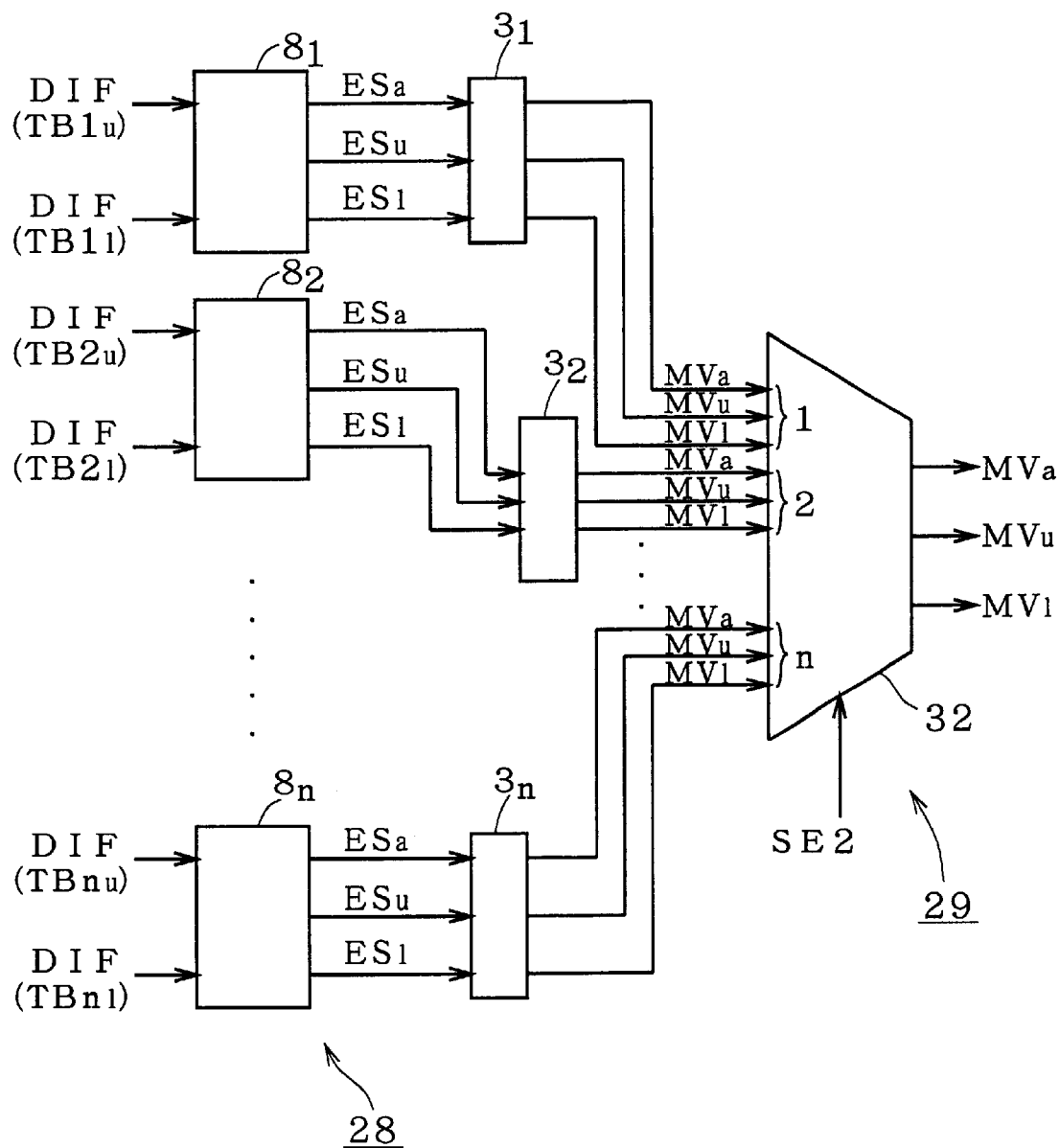
FIG. 31 is a block diagram of a comparison unit in accordance with the fourth preferred embodiment of the present invention.

As shown in FIG. 31, the absolute differential values DIF on the n template blocks TB1 to TBn are inputted to the n summation units $8_1$ to $8_n$ included in the group of summation units 28, respectively. Each of the summation units $8_1$ to $8_n$ has the same constitution as the summation unit 8 of FIG. 14. The absolute differential values DIF on the upper sub-template blocks TBku (k=1 to n) are inputted to the adders 24 provided in the summation units $8_1$ to $8_n$ and the absolute differential values DIF on the lower sub-template blocks TBkl are inputted to the adders 25 provided in the summation units $8_1$ to $8_n$, respectively.

As a result, the n summation units $8_1$ to $8_n$ output the n groups of estimation values ESa, ESu and ESl corresponding to the n template blocks TB1 to TBn. Therefore, the comparison unit 29 selectively outputs the n groups of motion vectors MVa, MVu and MVl corresponding to the n template blocks TB1 to TBn. When the n comparison units $3_1$ to $3_n$ output the n groups of motion vectors MVa, MVu and MVl differently in terms of time from one another, the selector 32 is not always needed, like the third preferred embodiment.

Furthermore, instead of the processor array of FIG. 1, those of FIGS. 17, 19 and 21 may be used, like the third preferred embodiment. In any case, the absolute differential value DIF on the upper sub-template block TBku is inputted to the adder 24 (FIG. 14) in the summation unit $8_k$ (of FIG. 31) and the absolute differential value DIF on the lower sub-template block TBkl is inputted to the adder 25. As a result, in any case, the n summation units $8_1$ to $8_n$ output the n groups of estimation values ESa, ESu and ESl corresponding to the n template blocks TB1 to TBn.

As discussed above, in the device 104, since the simultaneous operation is made on a plurality of template blocks TB1 to TBn, sharing the search window registers 10 and 11, it is possible to cut the operation time. Also in the device 104, since the comparison of the pixel values between the template block (including sub-template blocks) and the displacement block (including sub-displacement blocks) in the search window, i.e., the calculation of the estimation component values such as the absolute differential values DIF is performed on the pixels after skipping.

Therefore, it is possible to reduce the hardware volume and search the motion vector in a wide range, like the device 101 of the first preferred embodiment. Moreover, since the comparison can be performed on the basis of the filtered pixel values, the hardware volume can be reduced while suppressing deterioration in accuracy of the detected motion vectors, i.e., in prediction accuracy.

5. The Fifth Preferred Embodiment

Figure 32:
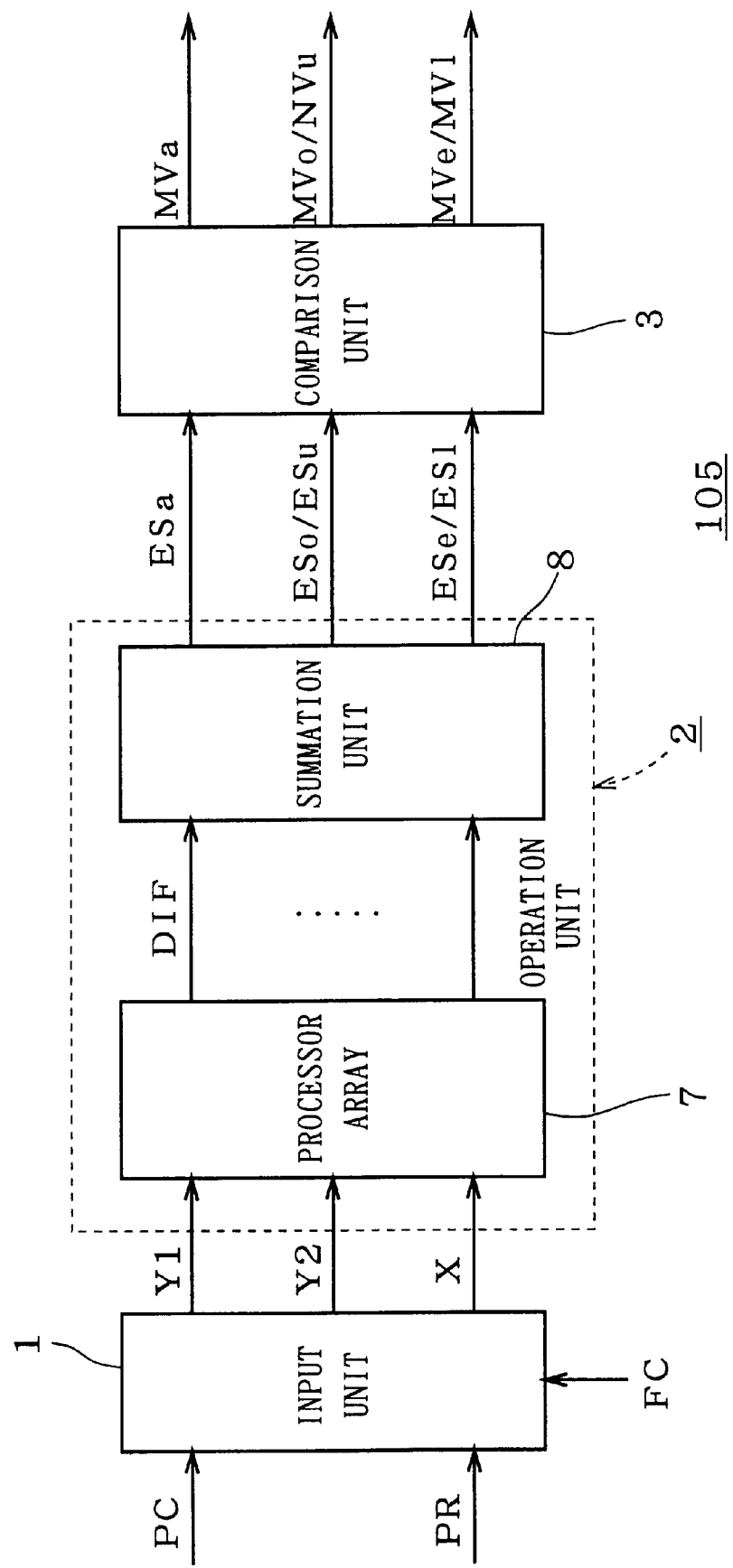
FIG. 32 is a block diagram of a device in accordance with a fifth preferred embodiment of the present invention.

FIG. 32 is a block diagram showing an overall constitution of a motion vector detecting device in accordance with the fifth preferred embodiment. A device 105 of FIG. 32 can be suitably used for both an image compression apparatus performing an inter-frame predictive coding and that performing an inter-field predictive coding. Therefore, the device 105 receives the current image PC and the reference image PR in any form of frame image and field image.

The device 105 is characteristically different from the device 101 in that the summation unit 8 selectively outputs either the three kinds of estimation values ESa, ESo and ESe or the three kinds of estimation values ESa, ESu and ESl and the comparison unit 3 selectively outputs either the three kinds of motion vectors MVa, MVo and MVe or the three kinds of motion vectors MVa, MVu and MVl.

Figure 33:
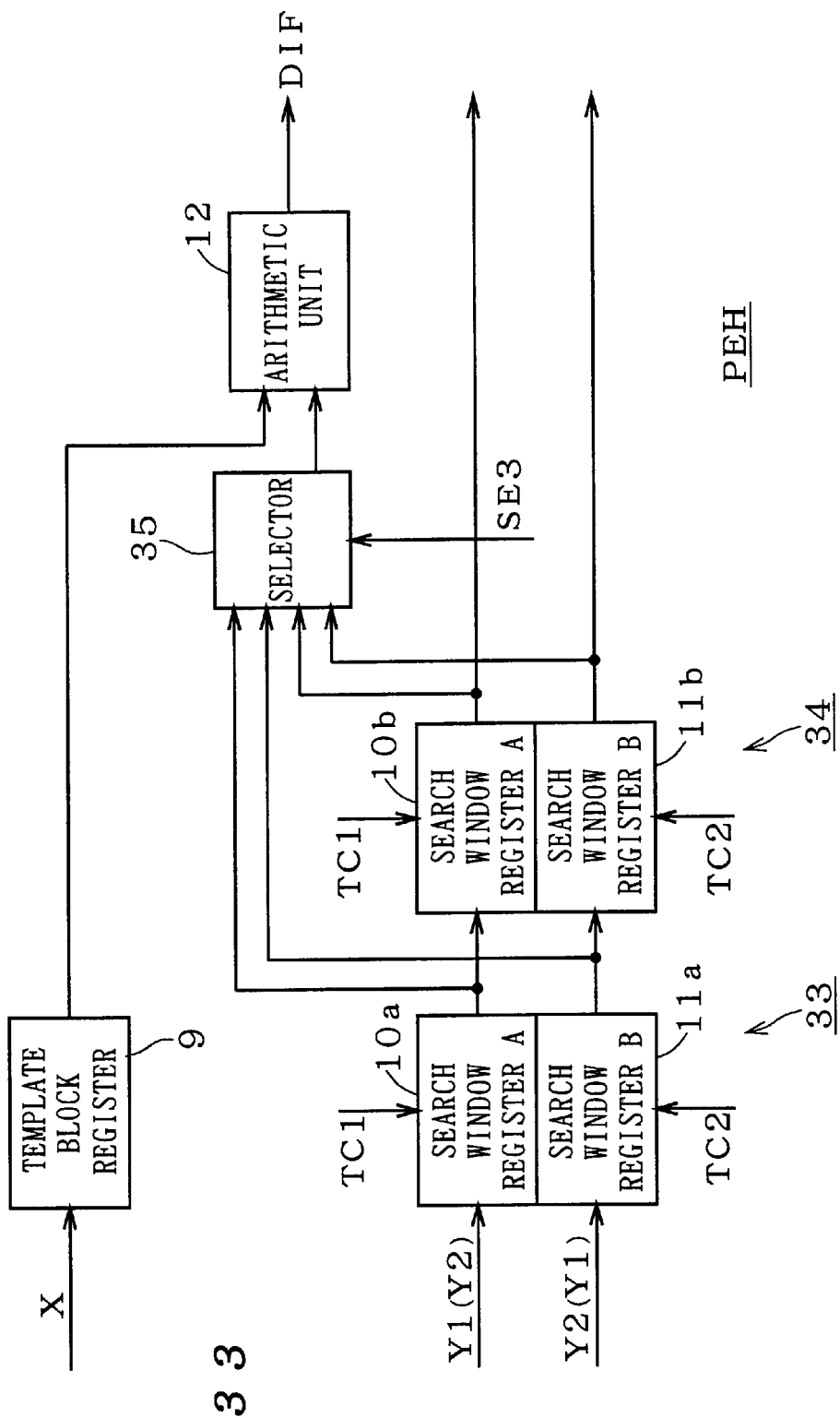
FIG. 33 is a block diagram of an element processor in accordance with the fifth preferred embodiment of the present invention.

In the processor array 7 of the device 105, element processors PEH of FIG. 33 are arranged instead of mixed arrangement of the element processors PEA and PEB. The element processor PEH is characteristically different from the element processor PEA of FIG. 7 in that the group of search window registers 13 is replaced by two groups of search window registers 33 and 34 and the selector 23 is replaced by a selector 35.

Each of the groups of search window registers 33 and 34 has the same constitution of the group of search window registers 13 (of FIG. 7), including the search window registers 10 and 11. The ante-stage group of registers 33 and the post-stage group of registers 34 are cascaded. Further, two search window registers 10a and 10b included in the groups of registers 33 and 34 respectively are cascaded. Similarly, two search window registers 11a and 11b included in the groups of registers 33 and 34 respectively are cascaded.

The selector 35 selects one of outputs from the four search window registers 10a, 10b, 11a and 11b in response to a selection signal SE3 and outputs it to the arithmetic unit 12. Thus, the arithmetic unit 12 calculates the absolute differential value DIF by comparing the template data X stored in the template block register 9 with the search window data Y1 or Y2 stored in one of the four search window registers 10a, 10b, 11a and 11b selected by the selector 35.

Specifically, the element processor PEH is configured as if it includes the cascaded element processors PEA and PEB and selects freely one of the search window registers 10 and 11 to be used for the calculation of the absolute differential values DIF performed by the arithmetic unit 12.

Figure 34:
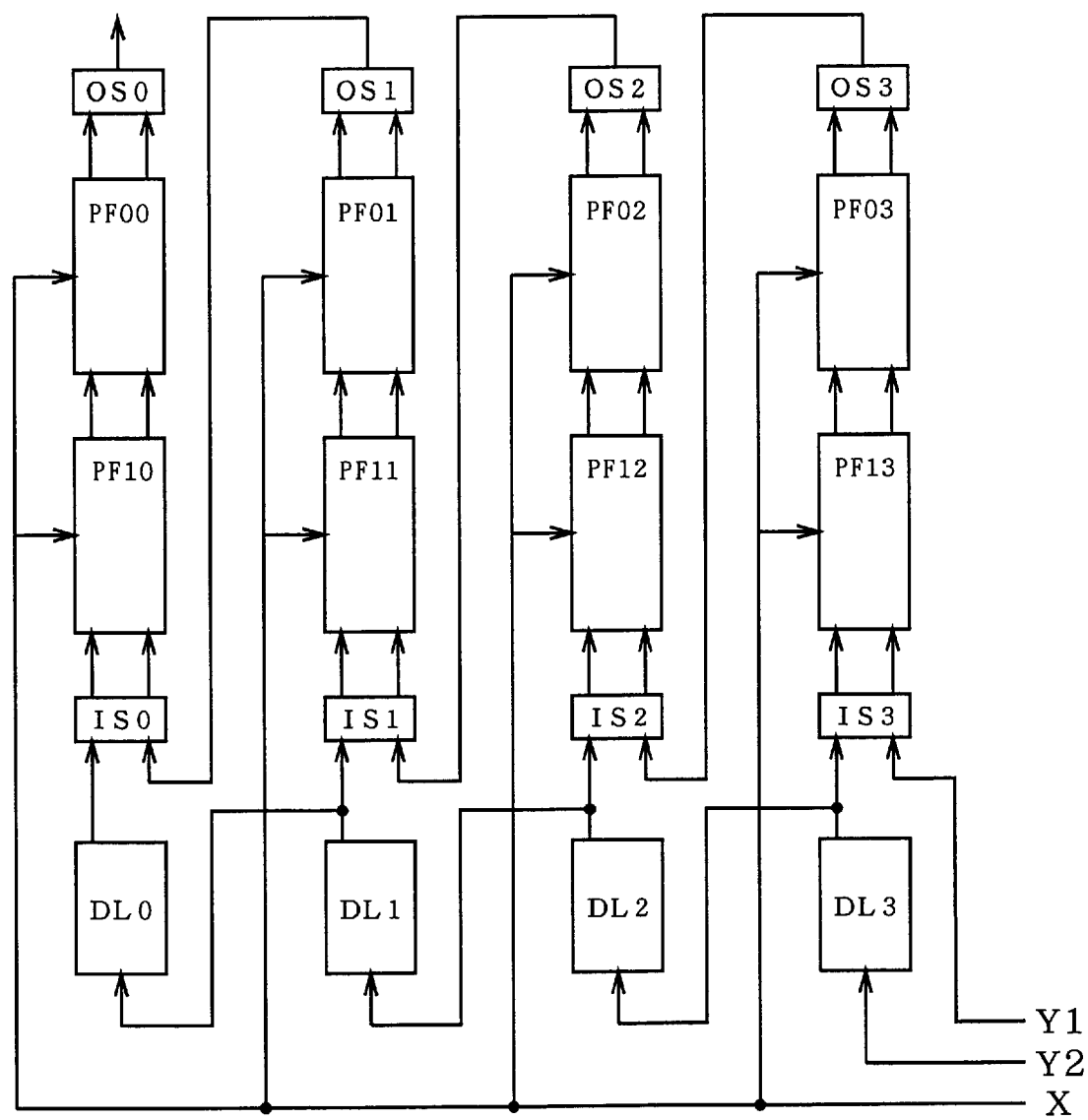
FIG. 34 is a block diagram of a processor array in accordance with the fifth preferred embodiment of the present invention.

FIG. 34 is a block diagram showing an internal configuration of the processor array 7 provided in the device 105. The processor array 7 of FIG. 34 has a configuration where the element processors PE00 to PE33 arranged in a matrix with four rows and four columns in the processor array 7 of FIG. 1 are replaced by eight element processors PF00 to PF13 arranged in a matrix with two rows and four columns. Each of the element processors PF00 to PF13 is the element processor PEH.

The template block register 9 provided in each of the eight element processors PF00 to PF13 is connected to a bus. Through the bus, the pixel values of new template data X are distributed to the template block register 9 and stored therein at the head of the motion-vector operation cycle. The template block register 9 to which the pixel values of the template data X should be applied is selected by a selection signal not shown.

The four search window registers 10a, 10b, 10a and 10b provided in the two element processors PF0x and PF1x included in a column (the x-th column) are cascaded. Similarly, the four search window registers 11a, 11b, 11a and 11b provided in the two element processors PF0x and PF1x included in a column are cascaded. Specifically, between the element processors PF0x and PF1x included in a column, the pixel values of the search window data Y1 and Y2 are transferred from the lower side to the upper side of FIG. 34 along the four cascaded search window registers 10a, 10b, 10a and 10b, or 11a, 11b, 11a and 11b. The timing for transfer is controlled by the transfer clocks TC1 and TC2 (of FIG. 33).

The outputs from the post-stage search window registers 10b and 1b provided in the element processor PF0x on the upper side of this figure are inputted to the selector OSx. Further, an output from the selector ISx is inputted to the ante-stage search window registers 10a and 11a provided in the element processor PF1x on the lower side of this figure.

The search window data Y1 (see FIG. 12) outputted from the input unit 1 are inputted to either the ante-stage search window register 10a or 11a provided in the element processor PF13 at the lower position on the rightmost column through the selector IS3. The search window data Y2 (see FIG. 12) outputted from the input unit 1 are inputted to the data buffer DL3 on the rightmost column.

For example, if the selection signal SE3 is determined so that the selector 35 selects either the post-stage search window register 10b or 11b in the element processors PF00, PF02, PF10 and PF12 on the odd columns and selects either the ante-stage search window register 10a or 11a in the element processors PF01, PF03, PF11 and PF13 on the even columns, the processor array 7 is equivalent to that of FIG. 1.

On the other hand, if the selection signal SE3 is determined so that the selector 35 selects either the ante-stage search window register 10a or 11a in the element processors PF00, PF02, PF10 and PF12 on the odd columns and selects either the post-stage search window register 10b or 11b in the element processors PF01, PF03, PF11 and PF13 on the even columns, the processor array 7 is equivalent to that of FIG. 17.

Thus, the pixel values stored in either the group of ante/post-stage search window registers 33 or 34 can be selected switchably as the search window data Y1 or Y2 to be used for the calculation of the absolute differential value DIF performed by the arithmetic unit 12. Therefore, it is possible to switchably produce a variety of skipping patterns.

Figure 35:
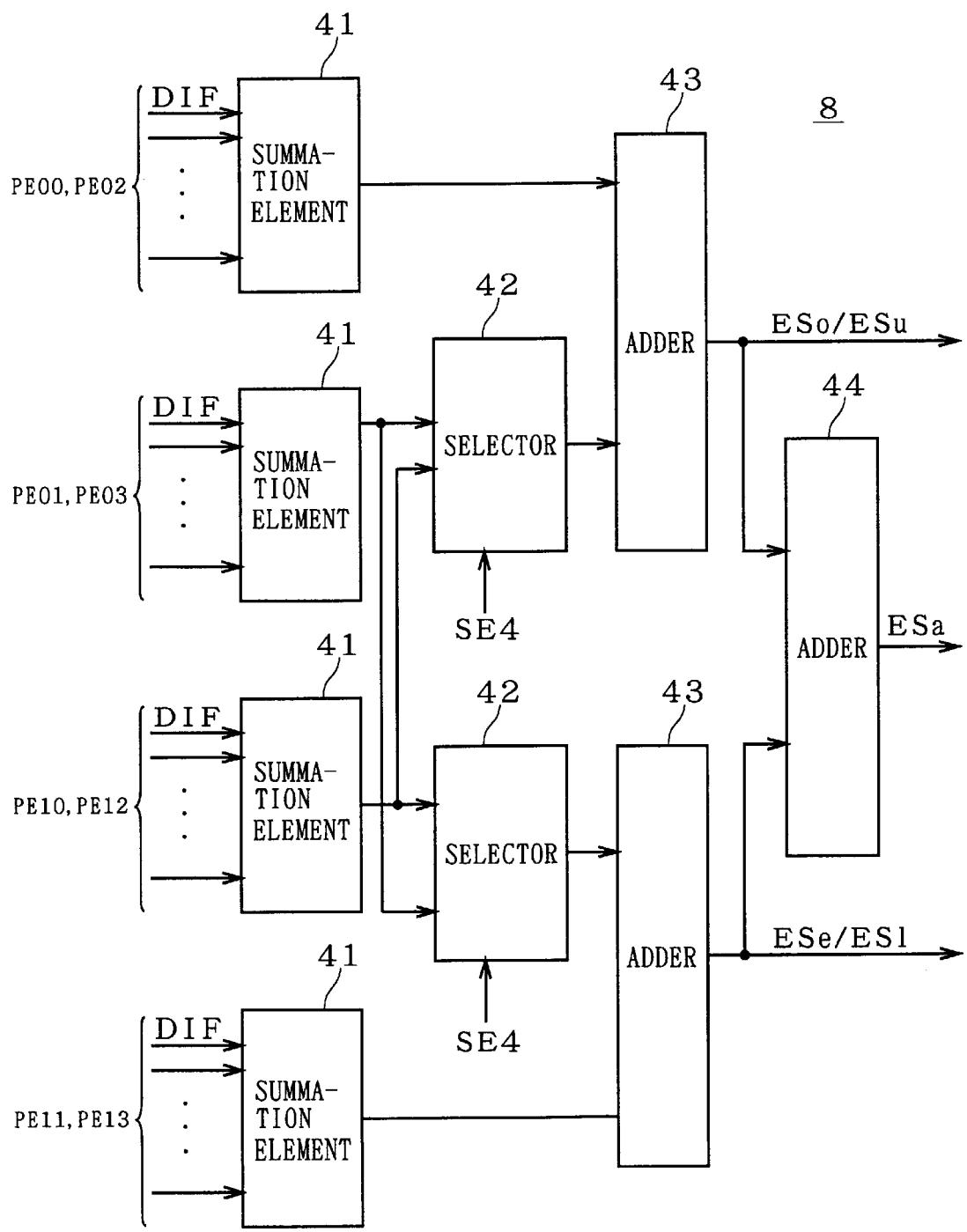
FIG. 35 is a block diagram of a summation unit in accordance with the fifth preferred embodiment of the present invention.

FIG. 35 is a block diagram showing an internal constitution of the summation unit 8 of the device 105. The summation unit 8 comprises four summation elements 41, two selectors 42, two adders 43 and another adder 44. Among the element processors PF00 to PF13 arranged in a matrix, the absolute differential values DIF outputted from the element processors PF00 and PF02 in the upper half on the odd columns are inputted to the first summation element 41. Similarly, the absolute differential values DIF outputted from the element processors PF01 and PF03 in the upper half on the even columns, the absolute differential values DIF outputted from the element processors PF10 and PF12 in the lower half on the odd columns, and the absolute differential values DIF outputted from the element processors PF11 and PF13 in the lower half on the even columns are inputted to the second to fourth summation elements 41, respectively.

Each of the summation elements 41 calculates the sum of the inputted absolute differential values DIF and outputs it. One and the other of the first and second selectors 42 switchably select one and the other of the outputs from the second and third summation elements 41 in response to a selection signal SE4 and output the selected ones. The first adder 43 calculates a sum of an output from the first summation element 41 and an output from one of the second and third summation elements 41 selected by the first selector 42 and outputs the sum. The second adder 43 calculates a sum of an output from the fourth summation element 41 and an output from one of the second and third summation elements 41 not selected by the second selector 42 and outputs the sum.

When the first adder 43 calculates a sum of the outputs from the first and second summation elements 41 and the second adder 43 calculates a sum of the outputs from the third and fourth summation elements 41, the first adder 43 outputs the estimation value ESu on the upper sub-displacement block and the second adder 43 outputs the estimation value ESl on the lower sub-displacement block.

On the other hand, when the first adder 43 calculates a sum of the outputs from the first and third summation elements 41 and the second adder 43 calculates a sum of the outputs from the second and fourth summation elements 41, the first adder 43 outputs the estimation value ESo on the odd sub-displacement block and the second adder 43 outputs the estimation value ESe on the even sub-displacement block.

The adder 44 calculates a sum of outputs from the two adders 43 and outputs it. Therefore, the adder 44 outputs the estimation value ESa on the displacement block regardless of the selection signal SE4. The comparison unit 3 of FIG. 32 has the same constitution as that of FIG. 2 or FIG. 23. Therefore, when the summation unit 8 of FIG. 35 outputs the estimation values ESa, ESo and ESe, the comparison unit 3 outputs the motion vectors MVa, MVo and MVe, and on the other hand, when the summation unit 8 of FIG. 35 outputs the estimation values ESa, ESu and ESl, the comparison unit 3 outputs the motion vectors MVa, MVu and MVl.

Thus, the device 105 can switchably select the skipping pattern in response to the selection signal SE3 and can switchably select the frame image and the field image as the current image PC and the reference image PR to be inputted in response to the selection signal SE4. In other words, the device 105 can switch the functions of the devices 101 and 102.

Moreover, in the device 105, though the summation unit 8 has some complicate constitution as compared with the devices 101 and 102, there is no increase in hardware volume of other elements including the processor array 7. In short, the device 105 achieves both the functions of the devices 101 and 102 without remarkable increase in hardware volume.

6. The Sixth Preferred Embodiment

An overall constitution of a device of the sixth preferred embodiment is the same as that shown in FIG. 32. Therefore, the device of the sixth preferred embodiment can be also suitably used for both an image compression apparatus performing an inter-frame predictive coding and that performing an inter-field predictive coding.

Figure 36:
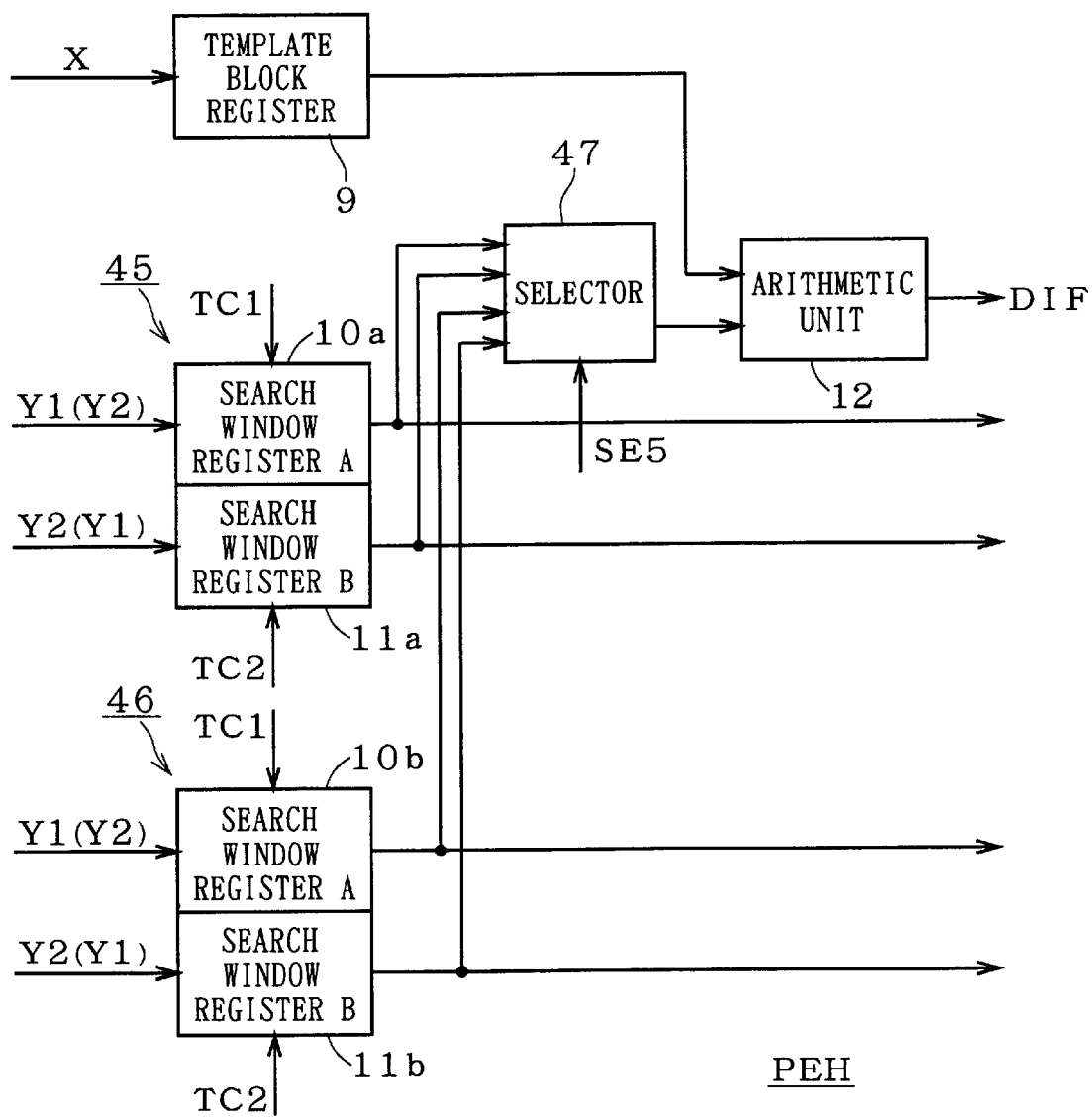
FIG. 36 is a block diagram of an element processor in accordance with a sixth preferred embodiment of the present invention.

FIG. 36 is a block diagram showing an internal constitution of the element processor PEH used in the processor array 7 of the device of the sixth preferred embodiment. The element processor PEH is characteristically different from the element processor PEA of FIG. 7 in that the group of search window registers 13 is replaced by two groups of search window registers 45 and 46 and the selector 23 is replaced by a selector 47.

Each of the groups of search window registers 45 and 46 has the same constitution of the group of search window registers 13 (of FIG. 7), including the search window registers 10 and 11. Different from the element processor PEH of FIG. 33, the two groups of search window registers 45 and 46 are not cascaded but disposed simply in parallel. The selector 47 selects one of the outputs from the four search window registers 10a, 10b, 11a and 11b in response to a selection signal SE5 and outputs it to the arithmetic unit 12. Thus, the arithmetic unit 12 calculates the absolute differential value DIF by comparing the template data X stored in the template block register 9 with the search window data Y1 or Y2 stored in one of the four search window registers 10a, 10b, 11a and 11b selected by selector 47.

Specifically, the element processor PEH is configured as if it includes the element processors PEA and PEB which are adjacently disposed on a column and selecting freely one of the search window registers 10 and 11 to be used for the calculation of the absolute differential values DIF performed by the arithmetic unit 12.

Figure 37:
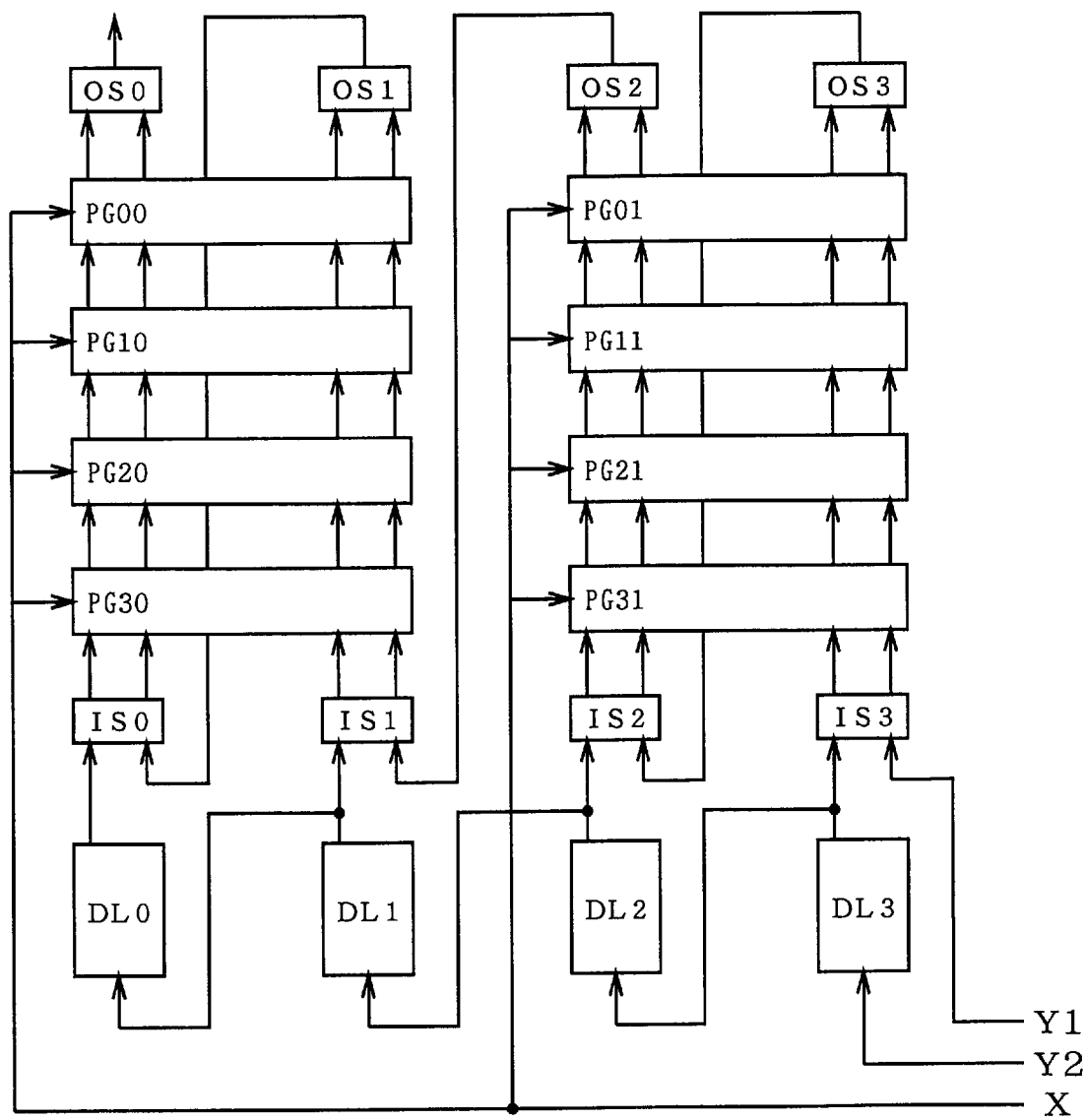
FIG. 37 is a block diagram of a processor array in accordance with the sixth preferred embodiment of the present invention.

FIG. 37 is a block diagram showing an internal configuration of the processor array 7 provided in the device of the sixth preferred embodiment. The processor array 7 of FIG. 37 has a configuration where the element processors PE00 to PE33 arranged in a matrix with four rows and four columns in the processor array 7 of FIG. 1 are replaced by eight element processors PG00 to PG31 arranged in a matrix with four rows and two columns. Each of the element processors PG00 to PG31 is the element processor PEH.

The template block register 9 provided in each of the eight element processors PG00 to PG31 is connected to a bus. Through the bus, the pixel values of new template data X are distributed to the template block register 9 and stored therein at the head of the motion-vector operation cycle. The template block register 9 to which the pixel value of the template data X should be applied is selected by a selection signal not shown.

In the four groups of search window registers 45 provided in the four element processors PG0x to PG03 on a column (the x-th column), the four search window registers 10*a* are cascaded and the search window registers 11*a* are also cascaded. Similarly, in the four groups of search window registers 46 provided in the four element processors PG0x to PG3x on a column, the four search window registers 10*b* are cascaded and the search window registers 11*b* are also cascaded.

In other words, among the four groups of search window registers 45 and among the four groups of search window registers 46 provided in the element processors PG0x to PG3x on a column, the pixel values included in the search window data Y1 and Y2 are transferred along the four cascaded search window registers 10*a* or 10*b*, or the four cascaded search window registers 11*a* or 11*b*. The timings for transfer is controlled by the transfer clocks TC1 and TC2 (see FIG. 36).

In FIG. 37, the outputs from the four pairs of search window registers 10 and 11 provided in the element processors PG00 and PG01 located at the highest positions are inputted to the selectors OS0 to OS3, respectively. Further, in FIG. 37, the outputs from the selectors IS1 to IS3 are inputted to the four pairs of search window registers 10 and 11 provided in the element processors PG30 and PG31 located at the lowest positions, respectively.

The search window data Y1 (see FIG. 12) outputted from the input unit 1 are inputted to either of a pair of search window registers 10*b* and 11*b* located at the lowest position on the rightmost column through the selector IS3. Further, the search window data Y2 (see FIG. 12) are inputted to the data buffer DL3 located at the rightmost position.

For example, when the selection signal SE5 is determined so that the selector 47 may select either the search window register 10*a* or 11*a* on the left side (e.g., that included in the group of search window registers 45) in the element processors PG00, PG01, PG20 and PG21 on the odd rows and may select either the search window register 10*b* or 11*b* on the right side (e.g., that included in the group of search window registers 46) in the element processors PG10, PG11, PG30 and PG31 on the even rows, the processor array 7 is equivalent to that of FIG. 1.

On the other hand, when the selection signal SE5 is determined so that the selector 47 may select either the search window register 10*b* or 11*b* on the right side in the element processors PG00, PG01, PG20 and PG21 on the odd rows and may select either the search window register 10*a* or 11*a* on the left side in the element processors PG10, PG11, PG30 and PG31 on the even rows, the processor array 7 is equivalent to that of FIG. 17.

When the selection signal SE5 is determined so that the selector 47 may select either the search window register 10*a* or 11*a* on the left side in the element processors PG00, PG01, PG10 and PG11 on (4y+1)-th, (4y+2)-th (y=0, 1, ...) rows and may select either the search window register 10*b* or 11*b* on the right side in the element processors PG20, PG21, PG30 and PG31 on (4y+3)-th, (4y+4)-th rows, the processor array 7 is equivalent to that of FIG. 19.

On the other hand, when the selection signal SE5 is determined so that the selector 47 may select either the search window register 10*b* or 11*b* on the right side in the element processors PG00, PG01, PG10 and PG11 on (4y+1)-th, (4y+2)th rows and may select either the search window register 10*a* or 11*a* on the left side in the element processors PG20, PG21, PG30 and PG31 on (4y+3)-th, (4y+4)-th rows, the processor array 7 is equivalent to that of FIG. 21.

Thus, the pixel values stored in either the group of search window registers 45 on the left side or 46 on the right side can be selected switchably as the search window data Y1 or Y2 to be used for the calculation of the absolute differential values DIF performed by the arithmetic unit 12. Therefore, a variety of skipping patterns can be produced switchably. Moreover, the selection of the skipping patterns can be made from a wider range than that of the fifth preferred embodiment.

Figure 38:
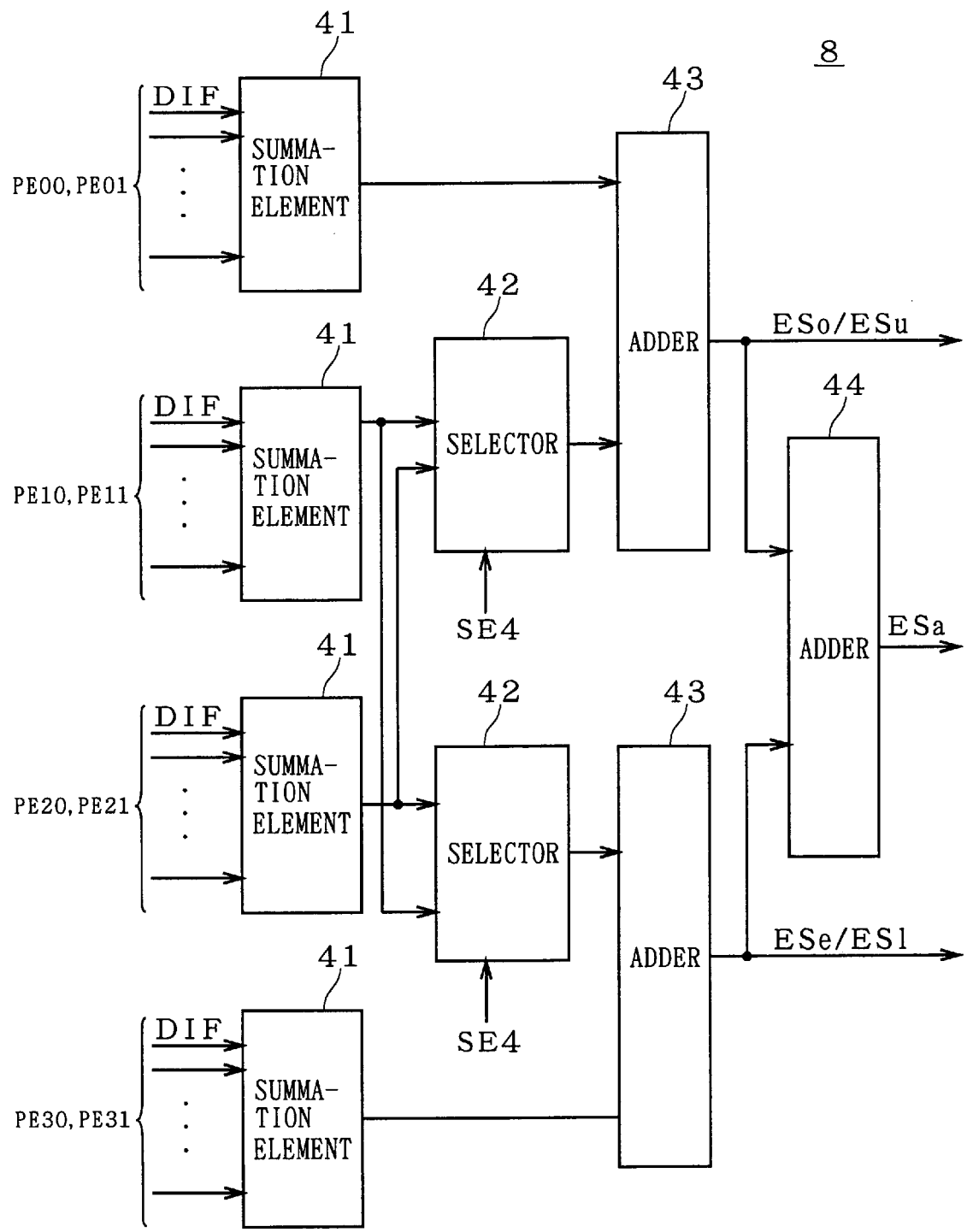
FIG. 38 is a block diagram of a summation unit array in accordance with the sixth preferred embodiment of the present invention.

FIG. 38 is a block diagram showing an internal constitution of the summation unit 8 in the device of the sixth preferred embodiment. The summation unit 8 has the same constitution of that of FIG. 35. Among the element processors PG00 to PG31 arranged in a matrix, the absolute differential values DIF outputted from the element processors PG00 and PG01 in the upper half on the odd row are inputted to the first summation element 41. Similarly, the absolute differential values DIF outputted from the element processors PG10 and PG11 in the upper half on the even row, those from the element processors PG20 and PG21 in the lower half on the odd row and those from the element processors PG30 and PG31 in the lower half on the even row are inputted to the second, third and fourth summation elements 41, respectively.

Therefore, when the first adder 43 calculates the sum of the outputs from the first and second summation elements 41 and the second adder 43 calculates the sum of the outputs from the third and fourth summation elements 41, the first adder 43 outputs the estimation value ESu on the upper sub-displacement block and the second adder 43 outputs the estimation value ESl on the lower sub-displacement block.

On the other hand, when the first adder 43 calculates the sum of the outputs from the first and third summation elements 41 and the second adder 43 calculates the sum of the outputs from the second and fourth summation elements 41, the first adder 43 outputs the estimation value ESo on the odd sub-displacement block and the second adder 43 outputs the estimation value ESe on the even sub-displacement block.

The adder 44 outputs the estimation value ESa on the displacement block regardless of the selection signal SE4. Therefore, when the summation unit 8 of FIG. 35 outputs the estimation values ESa, ESo and ESe, the comparison unit 3 outputs the motion vectors MVa, MVo and MVe, and on the other hand, when the summation unit 8 of FIG. 35 outputs the estimation values ESa, ESu and ESl, the comparison unit 3 outputs the motion vectors MVa, MVu and MVl.

Thus, the device of the sixth preferred embodiment can switchably select the skipping pattern in response to the selection signal SE5, and can switchably select one of the frame image and the field image as the current image PC and the reference image PR to be received in response to the selection signal SE4. Moreover, though the summation unit 8 has some complicate constitution as compared with the devices 101 and 102, there is no increase in hardware volume of other elements including the processor array 7. In short, the device of the sixth preferred embodiment switchably achieves both the functions of the devices 101 and 102 without remarkable increase in hardware volume.

Furthermore, as described above, the device of the sixth preferred embodiment can make a wider range of selection of the skipping patterns than the device of the fifth preferred embodiment. Moreover, the device of the sixth preferred embodiment has the same hardware volume as the device of the fifth preferred embodiment. In other words, the device of the sixth preferred embodiment has an advantage of achieving a wider range of selection of the skipping pattern with no increase in hardware volume.

7. The Seventh Preferred Embodiment

Figure 39:
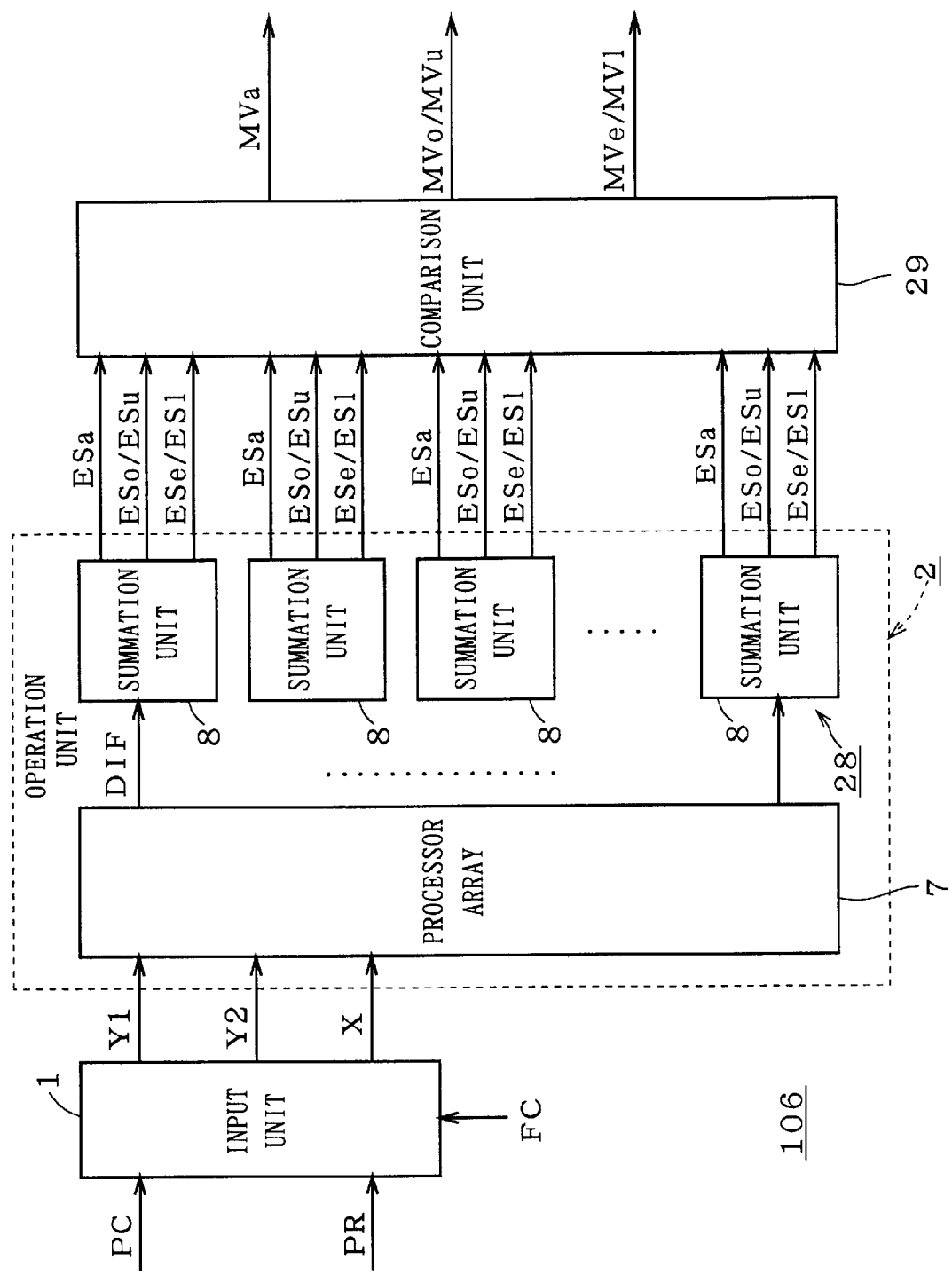
FIG. 39 is a block diagram of a device in accordance with a seventh preferred embodiment of the present invention.

FIG. 39 is a block diagram showing an overall constitution of a motion vector inspecting device of the seventh preferred embodiment. A device 106 of FIG. 39 can be also suitably used for both an image compression apparatus performing an inter-frame predictive coding and that performing an inter-field predictive coding.

The device 106 selectively outputs either the three kinds of motion vectors MVa, MVo and MVe or the three kinds of motion vectors MVa, MVu and MVl, like the device of the fifth preferred embodiment. The device 106 is, however, characteristically different from the device of the fifth preferred embodiment in that a simultaneous operation is performed on a plurality of template blocks TB1 to TBn by sharing the search window registers 10 and 11, like the devices of the third and fourth preferred embodiments.

Figure 40:
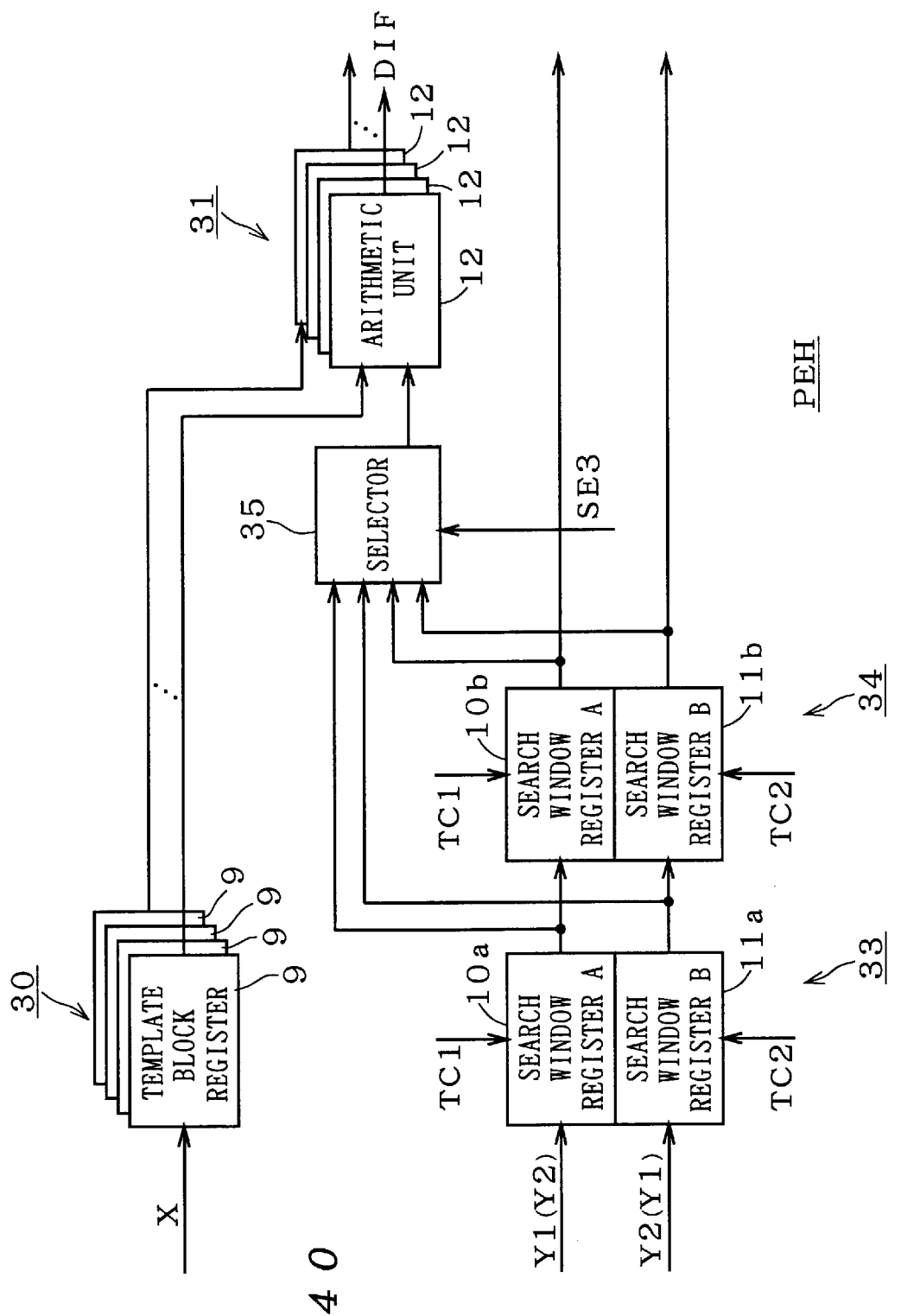
FIG. 40 is a block diagram of an element processor in accordance with the seventh preferred embodiment of the present invention.

In the device 106, the processor array 7 has a configuration shown in FIG. 34, for example. Each of the element processor PF00 to PF13 is replaced by the element processor PEH of FIG. 40. The element processor PEH of FIG. 40 comprises a group of template block registers 30 including n ($\geq 2$) template block registers 9 and a group of arithmetic units 31 including n arithmetic units 12 as well as the groups of search window registers 33 and 34 and the selector 35.

The outputs from the n template block registers 9 are inputted to the n arithmetic units 12, respectively. The output from the selector 35 is inputted in common to all the n arithmetic units 12. Specifically, each of the n arithmetic units 12 compares the template data X stored in one of the n template block registers 9 with the search window data Y1 or Y2 stored in one of the four search window registers 10a, 10b, 11a and 11b which is selected by the selector 35, to obtain the absolute differential value DIF.

Like in the element processor PEH of the fifth preferred embodiment (see FIG. 33), each of the n arithmetic units 12 can switchably select one of the ante-stage search window registers 10a and 11a and the post-stage search window registers 10b and 11b to be referred in response to the selection signal SE3. Therefore, the processor array 7 of the device 106 can switchably select the skipping pattern like the processor array 7 of the device 105.

With reference back to FIG. 39, the operation unit 2 comprises the group of summation units 28 as well as the processor array 7. The group of summation units 28 includes n summation units 8 shown in FIG. 35. The outputs from the n arithmetic units 12 are inputted to the n summation units 8, respectively. Each of the n summation units 8 selectively calculates the three kinds of estimation values ESa, ESo and ESe or the three kinds of estimation values ESa, ESu and ESl in response to the selection signal SE4 and outputs the calculated estimation values, like in the fifth preferred embodiment.

The n groups of estimation values ESa, ESo and ESe or the n groups of estimation values ESa, ESu and ESl outputted from the n summation units 8 are inputted to, the comparison unit 29. The comparison unit 29 has the same constitution of that of the third preferred embodiment (see FIG. 29). Therefore, the comparison unit 29 searches the motion vectors MVa, MVo and MVe or the motion vectors MVa, MVu and MVl based on the estimation values ESa, ESo and ESe or the estimation values ESa, ESu and ESl and outputs the searched motion vectors.

Thus, the device 106 can switchably select the skipping pattern in response to the selection signal SE3, and can switchably select one of the frame image and the field image as the current image PC and the reference image PR to be received in response to the selection signal SE4, like the device 105. Further, the device 106 can perform a simultaneous operation on a plurality of template blocks TB1 to TBn by sharing the search window registers 10a, 10b, 11a and 11b, like the devices 103 and 104, and therefore it is possible to cut the operation time.

In the device 106, though the summation unit 8 has some complicate constitution as compared with the devices 103 and 104, there is no increase in hardware volume of other elements including the processor array 7. In short, the device 106 achieves both the functions of the devices 103 and 104 without remarkable increase in hardware volume, and can be adapted with high degree of freedom to a wide variety of image compression apparatus.

8. The Eighth Preferred Embodiment

An overall constitution of a device of the eighth preferred embodiment is the same as that shown in FIG. 39. The device of the eighth preferred embodiment can be also suitably used for both an image compression apparatus performing an inter-frame predictive coding and that performing an inter-field predictive coding and can perform a simultaneous operation on a plurality of template blocks TB1 to TBn by sharing the search window registers 10 and 11.

Figure 41:
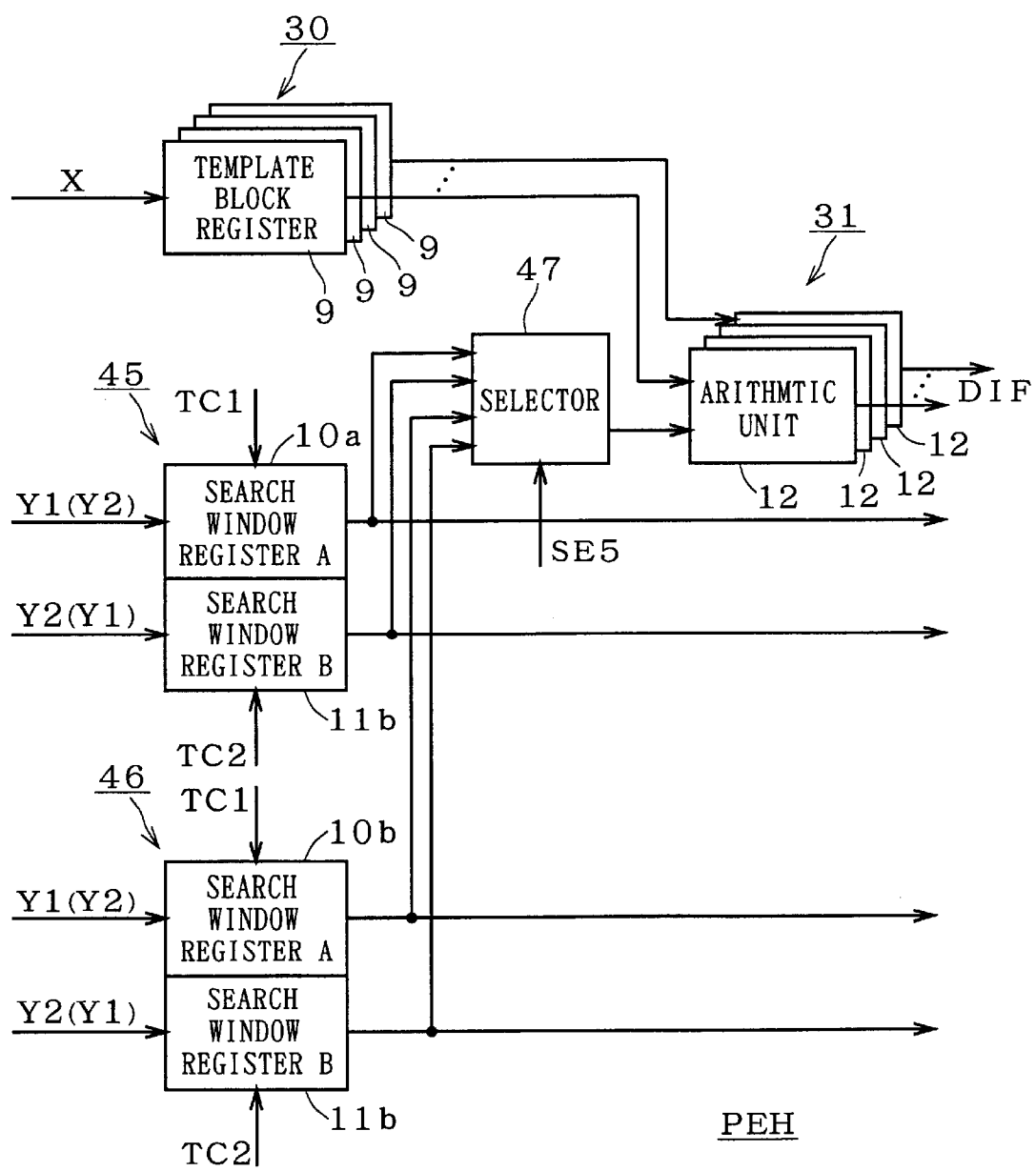
FIG. 41 is a block diagram of a element processor in accordance with an eighth preferred embodiment of the present invention.

In the device of the eighth preferred embodiment, the processor array 7 has a configuration shown in FIG. 37, for example. Each of the element processor PG00 to PG31 is replaced by the element processor PEH of FIG. 41. The element processor PEH of FIG. 41 comprises the group of template block registers 30 including n ($\geq 2$) template block registers 9 and the group of arithmetic units 31 including n arithmetic units 12 as well as the groups of search window register 45 and 46 and the selector 47.

The outputs from the n template block registers 9 are inputted to the n arithmetic units 12, respectively. The output from the selector 47 is inputted in common to all the n arithmetic units 12. Specifically, each of the n arithmetic units 12 compares the template data X stored in one of the n template block registers 9 with the search window data Y1 or Y2 stored in one of the four search window registers 10a, 10b, 11a and 11b which is selected by the selector 47, to obtain the absolute differential value DIF.

Like in the element processor PEH of the sixth preferred embodiment (see FIG. 36), each of the n arithmetic units 12 can switchably select one of the search window registers 10a and 11a included in the group of search window registers and the group of search window registers 10b and 11b included in the group of search window registers 46 to be referred in response to the selection signal SE3. Therefore, the processor array 7 of the device of the eighth preferred embodiment can switchably select the skipping pattern like the processor array 7 of the device 106.

Each of the n summation units 8 included in the group of summation units 28 of the eighth preferred embodiment has the same constitution as the summation unit 8 of FIG. 38. Each of the n summation units 8 selectively calculates the three kinds of estimation values ESa, ESo and ESe or the three kinds of estimation values ESa, ESu and ESl in response to the selection signal SE4, and outputs the calculated estimation values. As a result, the comparison unit 29 searches the motion vectors MVa, MVo and MVe or the motion vectors MVa, MVu and MVl based on the estimation values ESa, ESo and ESe or the estimation values ESa, ESu and ESl and outputs the searched motion vectors.

Thus, the device of the eighth preferred embodiment can switchably select the skipping pattern in response to the selection signal SE5, and can switchably select one of the frame image and the field image as the current image PC and the reference image PR to be received in response to the selection signal SE4, like the device 106. Further, the device of the eighth preferred embodiment can make a wider range of selection of the skipping patterns than the device of the seventh preferred embodiment. Further, the device of the eighth preferred embodiment can perform a simultaneous operation on a plurality of template blocks TB1 to TBn by sharing the search window registers 10a, 10b, 11a and 11b, like the devices 103 and 104, and therefore it is possible to cut the operation time.

In the device of the eighth preferred embodiment, though the summation unit 8 has some complicate constitution as compared with the devices 103 and 104, there is no increase in hardware volume of other elements including the processor array 7. In short, the device of the eighth preferred embodiment achieves both the functions of the devices 103 and 104 without remarkable increase in hardware volume, and can be adapted with high degree of freedom to a wide variety of image compression apparatus.

While the invention has been shown and described in detail, the foregoing description is in all aspects illustrative and not restrictive. It is therefore understood that numerous modifications and variations can be devised without departing from the scope of the invention.

We claim:

1. A motion vector detecting device for searching a predictive block included in a reference image, for which a predictive error is obtained by comparison with a template block included in a current image, and detecting a motion vector indicating a displacement between said template block and said predictive block, comprising:

an operation unit for calculating estimation values between said template block and a displacement block after skipping some of the corresponding pixels between said template block and said displacement block, said estimation values being calculated every time said displacement block is moved in a search window, said displacement block having the same size as said template block and included in said search window, and said search window being defined in said reference image as a region including a block corresponding to said template block;

a comparison unit for searching a minimum value among said estimation values on said template block and outputting said motion vector corresponding to a displacement block providing said minimum value, which is defined as said predictive block; and an input unit for supplying pixel values of said template block and pixel values of said search window to said operation unit, said input unit including a filter unit for performing filtering of said current image and said reference image independently of one another, said filtering including an arithmetic operation using a pixel value of an object pixel to be filtered and at least a pixel value of another pixel belonging to the same image as said object pixel.

2. The motion vector detecting device of claim 1, wherein said another pixel is a pixel adjacent to said object pixel.

3. The motion vector detecting device of claim 1, wherein said filter unit performs the filtering of said current image and said reference image in an on/off selectable manner in response to a control signal and supplying said pixel values of said template block and said pixel values of said search window to said operation unit.

4. The motion vector detecting device of claim 2, wherein said filter unit performs said filtering by converting a pixel value of said object pixel to be filtered into a weighted mean of pixel values of a plurality of consecutive pixels along a horizontal scanning-line direction within the same image including said object pixel and said another pixel, with a weight to be added to pixels outside a block including said object pixel set zero.

5. The motion vector detecting device of claim 4, wherein said input unit selects three pixels as said plurality of consecutive pixels, a pixel adjacent to said object pixel on the left hand, said object pixel and a pixel adjacent to said object pixel on the right hand, and sets a weighting rate in this order at 0:3:1 when said object pixel is located on a left end of said block including said object pixel, at 1:3:0 when said object pixel is located on a right end and at 1:2:1 when said object pixel is located neither on the left nor right end.

6. The motion vector detecting device of claim 1, wherein said operation unit performs said skipping of said pixels with a skipping rate of 1/2 along a horizontal scanning-line direction.

7. The motion vector detecting device of claim 1, wherein said operation unit comprises a template-block storing unit for storing pixel values of all pixels included in said template block after skipping;

a search-window storing unit for storing pixel values of all pixels included in said displacement block;

an estimation-component-value operation unit for calculating estimation component values for all said pixels included in said template block after skipping, each of said estimation component values indicating a similarity between said pixel values stored in said template-block storing unit and said pixel values stored in said search-window storing unit on a pixel-by-pixel basis;

a summation unit for synthesizing said estimation component values to calculate said estimation values, said search-window storing unit comprises search-window storing elements arranged in a matrix, said search-window storing elements being so cascaded and each storing a pixel value for one pixel as to move said displacement block in said search window by storing said pixel values of said search window in order, and said input unit supplies said pixel values of said template block to said template-block storing unit and supplies said pixel values of said search window to said search-window storing unit.

8. The motion vector detecting device of claim 7, wherein said estimation-component-value operation unit calculates absolute differential values of said pixel values as said estimation component values.

9. The motion vector detecting device of claim 7, wherein said summation unit comprises an adder unit for calculating sums of said estimation component values for all said pixels included in said template block after skipping as said estimation values.

10. The motion vector detecting device of claim 9, wherein said adder unit comprises a first adder unit for adding said estimation component values for all pixels included in an odd sub-template block consisting of odd-numbered horizontal scanning lines in said template block after skipping to calculate odd sub-block estimation values each indicating an overall similarity of pixel values between said odd sub-template block and an odd sub-displacement block consisting of odd-numbered horizontal scanning lines in said displacement block;

a second adder unit for adding said estimation component values for all pixels included in an even sub-template block consisting of even-numbered horizontal scanning lines in said template block after skipping to calculate even sub-block estimation values each indicating an overall similarity of pixel values between said even sub-template block and an even sub-displacement block consisting of even-numbered horizontal scanning lines in said displacement block; and a third adder unit for adding said odd sub-block estimation values and said even sub-block estimation values to calculate said estimation values, said comparison unit further searches a minimum value among said odd sub-block estimation values and outputs a vector indicating a displacement between an odd sub-displacement block providing said minimum value and said odd sub-template block as a motion vector on said odd sub-template block, and searches a minimum value among said even sub-block estimation values and outputs a vector indicating a displacement between an even sub-displacement block providing said minimum value and said even sub-template block as a motion vector on said even sub-template block.

11. The motion vector detecting device of claim 9, wherein said adder unit comprises a first adder unit for adding said estimation component values for all pixels included in an upper sub-template block which is the upper half of said template block after skipping to calculate upper sub-block estimation values each indicating an: overall similarity of pixel values between said upper sub-template block and an upper sub-displacement block which is the upper half of said displacement block;

a second adder unit for adding said estimation component values for all pixels included in a lower sub-template block which is the a lower half of said template block after skipping to calculate lower sub-block estimation values each indicating an overall similarity of pixel values between said lower sub-template block and a lower sub-displacement block which is a lower half of said displacement block;

a third adder unit for adding said upper sub-block estimation values and said lower sub-block estimation values to calculate said estimation values, said comparison unit further searches a minimum value among said upper sub-block estimation values and outputs a vector indicating a displacement between an upper sub-displacement block providing said minimum value and said upper sub-template block as a motion vector on said upper sub-template block, and searches a minimum value among said lower sub-block estimation values and outputs a vector indicating a displacement between a lower sub-displacement block providing said minimum value and said lower sub-template block as a motion vector on said lower sub-template block.

12. The motion vector detecting device of claim 7, wherein said template-block storing unit comprises a (n, m)-th template-block storing element for storing a pixel value for one pixel, where n=1 to N (N is an even number) and n=1 to M (M is an even number), said search-window storing unit comprises a (k, m)-th search-window storing element for storing a pixel value for one pixel, where k=1 to 2N and m=1 to M, in a plurality of columns of search-window storing elements, (1, m)-th to (2N, m)-th search window elements being cascaded in this order in any m-th column, said estimation-component-value operation unit comprises a (n, m)-th operation element for calculating an estimation component value for one pixel, where n=1 to N and n=1 to M, said operation unit further comprises a (n, m)-th selection element, where n=1 to N and n=1 to M, said (n, m)-th selection element selects a pixel value stored in either a (2n−1, m)-th or (2n, m)-th search-window storing element in response to selection signal, and said (n, m)-th operation element calculates an estimation component value for one pixel indicating a similarity between a pixel value stored in said (n, m)-th template-block storing element and a pixel value selected by said (n, m)-th selection element.

13. The motion vector detecting device of claim 12, wherein said summation unit comprises a first summation element for calculating sums of said estimation component values calculated by said (n, m)-th operation element, where n=1 to N/2 and m is an odd number;

a second summation element for calculating sums of said estimation component values calculated by said (n, m)-th operation element, where n=1 to N/2 and m is an even number;

a third summation element for calculating sums of said estimation component values calculated by said (n, m)-th operation element, where n=N/2+1 to N and m is an odd number;

a fourth summation element for calculating sums of said estimation component values calculated by said (n, m)-th operation element, where n=N/2+1 to N and m is an even number;

first and second selectors for switchably selecting one and the other of said sums calculated by said second and third summation elements, respectively, in response a indicating signal;

a first adder for calculating sums of said sums calculated by said first summation element and said sums selected by said first selector;

a second adder for calculating sum s of said sums calculated by said fourth summation element and said sums selected by said second selected selector; and a third adder for calculating sums of said sums calculated by said first and second adders, said comparison unit calculates said motion vector by defining said sums calculated by sa third adder as said estimation values an d outputs said motion vector, and further searches a minimum value among said sums calculated by said first adder and outputs a vector indicating a displacement between a sub-displacement block providing said minimum value and a sub-temp late block as another motion vector, and searches a minimum value among said sums calculated by said second adder and outputs a vector indicating a displacement between a sub-displacement block providing said minimum value and a sub-template block as still another motion vector.

14. The motion vector detecting device of claim 7, wherein said template-block storing unit comprises a (n, m)-th template-block storing element for storing a pixel value for one pixel, where n=1 to N (N is an even number) and n=1 to M (M is an even number), said search-window storing unit comprises a (n, k)-th search-window storing element for storing a pixel value for one pixel, where k=1 to N and m=1 to 2M, in a plurality of columns of search-window storing elements, (1, k)-th to (N, k)-th search window elements being cascaded in this order in any k-th column, said estimation-component-value operation unit comprises a (n, m)-th operation element for calculating an estimation component value for one pixel, where n=1 to N and n=1 to M, said operation unit further comprises a (n, m)-th selection element, where n=1 to N and n=1 to M, said (n, m)-th selection element selects a pixel value stored in either a (n, 2m−1)-th or, (n, 2m)-th search-window storing element in response to a selection signal, and said (n, m)-th operation element calculates an estimation component value for one pixel indicating a similarity between a pixel value stored in said (n, m)-th template-block storing element and a pixel value selected by said (n, m)-th selection element.

15. The motion vector detecting device of claim 14, wherein said summation unit comprises:

a first summation element for calculating sums of said estimation component values calculated by said (n, m)-th operation element, where n=1 to N/2, n is an odd number and n=1 to M;

a second summation element for calculating sums of said estimation component values calculated by said (n, m)-th operation element, where n=1 to N/2, n is an even number and n=1 to M;

a third summation element for calculating sums of said estimation component values calculated by said (n, m)-th operation element, where n =N/2 +1 to N, n is an odd number, and n=1 to M;

a fourth summation element for calculating sums of said estimation component values calculated by said (n, m)-th operation element, where n =N/2 +1 to N, n is an even number and n=1 to M;

first and second selectors for switchably selecting one and the other of said sums calculated by second and third summation elements, respectively, in response to a selection indicating signal;

a first adder for calculating sums of said sums calculated by said first summation element and said sums selected by said first selector;

a second adder for calculating sums of said sums calculated by said fourth summation element and said sums selected by said second selected selector; and a third adder for calculating sums of said sums calculated by said first and second adders, said comparison unit calculates said motion vector by defining said sums calculated by said third adder as said estimation values and outputs said motion vector, and further searches a minimum value among said sums calculated by said first adder and outputs a vector indicating a displacement between a sub-displacement block providing said minimum value and a sub-template block as another motion vector, and searches a minimum value among said sums calculated by said second adder and outputs a vector indicating a displacement between a sub-displacement block providing said minimum value and a sub-template block as still another motion vector.

16. The motion vector detecting device of claim 7, wherein said template-block storing unit is defined as a first template-block storing unit, said estimation-component-value operation unit is defined as a first estimation-component-value operation unit, said summation unit is defined as a first summation unit and said comparison unit is defined as a first comparison unit, said device further comprising:

second to j-th (j≧2) template-block storing units each having the same configuration as said first template-block storing unit;

second to j-th estimation-component-value operation units each having the same configuration as said first estimation-component-value operation unit;

second to j-th summation units each having the same configuration as said first summation unit; and second to j-th comparison units each having the same configuration as said first comparison unit, any j-th (j=1 to J) template-block storing unit storing pixel values of all pixels included in one template block after skipping, any j-th estimation-component-value operation unit calculates estimation component values for all said pixels included in said one template block after skipping, each of said estimation component values indicating a similarity between said pixel values stored in said j-th template-block storing unit and said pixel values stored in said search-window storing unit on a pixel-by-pixel basis, any j-th summation unit calculates said estimation values on said one template block whose pixel values are stored in said j-th template-block storing unit by synthesizing said estimation component values calculated by said j-th estimation-component-value operation unit, any j-th comparison unit searches a minimum value among said estimation values calculated by said j-th summation unit and outputs a vector indicating a displacement between a displacement block providing said minimum value and said one template block whose pixel values are stored in said j-th template-block storing unit as a motion vector on said one template block, and said input unit supplies pixel values of j template blocks which are different in position to said first to j-th template-block storing units, respectively, and defining a region including said j template blocks as said search window, supplies pixel values of said search window to said search-window storing unit.

* * * * *